US009407608B2

(12) United States Patent
Mullick et al.

(10) Patent No.: US 9,407,608 B2
(45) Date of Patent: Aug. 2, 2016

(54) SYSTEMS AND METHODS FOR ENHANCED CLIENT SIDE POLICY

(71) Applicant: Citrix Systems, Inc., Fort Lauderdale, FL (US)

(72) Inventors: Amarnath Mullick, Bangalore (IN); Charu Venkatraman, Bangalore (IN); Shashi Nanjundaswamy, Bangalore (IN); Junxiao He, Saratoga, CA (US); Ajay Soni, San Jose, CA (US); Nicholas Stavrakos, Los Altos, CA (US); Chris Koopmans, Pleasanton, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 14/448,298

(22) Filed: Jul. 31, 2014

(65) Prior Publication Data
US 2014/0344891 A1 Nov. 20, 2014

Related U.S. Application Data

(63) Continuation-in-part of application No. 13/760,898, filed on Feb. 6, 2013, now Pat. No. 8,904,475, which is
(Continued)

(51) Int. Cl.
*G06F 17/00* (2006.01)
*H04L 29/06* (2006.01)

(52) U.S. Cl.
CPC .......... *H04L 63/0272* (2013.01); *H04L 63/102* (2013.01); *H04L 63/105* (2013.01); *H04L 63/20* (2013.01); *G06F 17/00* (2013.01)

(58) Field of Classification Search
CPC ..... H04L 67/2823; H04L 67/02; H04L 69/08; H04L 29/08756; H04L 65/605; H04L 63/20; H04L 63/10; H04L 63/105; H04L 67/10; H04L 63/08; H04L 63/0281; H04L 63/101; G06F 17/00; G06F 19/00
See application file for complete search history.

(56) References Cited

U.S. PATENT DOCUMENTS 5,867,494 A 2/1999 Krishnaswamy et al.
5,905,492 A 5/1999 Straub et al.
(Continued)

FOREIGN PATENT DOCUMENTS

CN 1478348 A 2/2004
EP 1 422 907 A2 5/2004
(Continued)

OTHER PUBLICATIONS

US Office Action on U.S. Appl. No. 14/448,642 dated Jan. 26, 2016.
(Continued)

*Primary Examiner* — Fatoumata Traore
(74) *Attorney, Agent, or Firm* — Foley & Lardner LLP; Christopher J. McKenna; Shabbi S. Khan

(57) ABSTRACT

An appliance and method for authorizing a level of access of a client to a virtual private network connection, based on a client-side attribute includes the step of establishing, by an appliance, a control connection with a client upon receiving a client request to establish a virtual private network connection with a network. The appliance transmits, via the control connection, a request to the client to evaluate at least one clause of a security string, the at least one clause including an expression associated with a client-side attribute. The client transmits, via the control connection, a response to the appliance comprising a result of evaluating the at least one clause by the client. The appliance assigns the client to an authorization group based on the result of evaluation of the at least one clause.

14 Claims, 16 Drawing Sheets

Related U.S. Application Data a continuation of application No. 11/465,915, filed on Aug. 21, 2006, now Pat. No. 8,397,287, application No. 14/448,298, filed on Jul. 31, 2014, which is a continuation-in-part of application No. 14/077,119, filed on Nov. 11, 2013, now abandoned, which is a continuation of application No. 11/439,009, filed on May 22, 2006, now Pat. No. 8,583,827.

(60) Provisional application No. 60/685,260, filed on May 26, 2005.

(56) References Cited

U.S. PATENT DOCUMENTS

| | | |
|---|---|---|
| 5,909,559 A | 6/1999 | So |
| 5,999,525 A | 12/1999 | Krishnaswamy et al. |
| 6,011,537 A | 1/2000 | Slotznick |
| 6,022,315 A | 2/2000 | Iliff |
| 6,085,224 A | 7/2000 | Wagner |
| 6,130,726 A | 10/2000 | Darbee et al. |
| 6,141,699 A | 10/2000 | Luzzi et al. |
| 6,161,139 A | 12/2000 | Win et al. |
| 6,161,760 A | 12/2000 | Marrs et al. |
| 6,167,441 A | 12/2000 | Himmel |
| 6,182,139 B1 | 1/2001 | Brendel |
| 6,182,142 B1 | 1/2001 | Win et al. |
| 6,185,625 B1 | 2/2001 | Tso et al. |
| 6,206,829 B1 | 3/2001 | Iliff |
| 6,289,382 B1 | 9/2001 | Bowman-Amuah |
| 6,292,792 B1 | 9/2001 | Baffes et al. |
| 6,308,273 B1 | 10/2001 | Goertzel et al. |
| 6,314,094 B1 | 11/2001 | Boys |
| 6,321,235 B1 | 11/2001 | Bird |
| 6,332,163 B1 | 12/2001 | Bowman-Amuah |
| 6,335,927 B1 | 1/2002 | Elliott et al. |
| 6,339,832 B1 | 1/2002 | Bowman-Amuah |
| 6,424,979 B1 | 7/2002 | Livingston et al. |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,449,627 B1 | 9/2002 | Baer et al. |
| 6,449,658 B1 | 9/2002 | Lafe et al. |
| 6,473,794 B1 | 10/2002 | Guheen et al. |
| 6,477,580 B1 | 11/2002 | Bowman-Amuah |
| 6,477,665 B1 | 11/2002 | Bowman-Amuah |
| 6,482,156 B2 | 11/2002 | Iliff |
| 6,490,624 B1 | 12/2002 | Sampson et al. |
| 6,496,850 B1 | 12/2002 | Bowman-Amuah |
| 6,502,102 B1 | 12/2002 | Haswell et al. |
| 6,502,213 B1 | 12/2002 | Bowman-Amuah |
| 6,516,322 B1 | 2/2003 | Meredith |
| 6,519,571 B1 | 2/2003 | Guheen et al. |
| 6,523,027 B1 | 2/2003 | Underwood |
| 6,529,909 B1 | 3/2003 | Bowman-Amuah |
| 6,529,948 B1 | 3/2003 | Bowman-Amuah |
| 6,536,037 B1 | 3/2003 | Guheen et al. |
| 6,539,396 B1 | 3/2003 | Bowman-Amuah |
| 6,549,949 B1 | 4/2003 | Bowman-Amuah |
| 6,550,012 B1 | 4/2003 | Villa et al. |
| 6,550,057 B1 | 4/2003 | Bowman-Amuah |
| 6,563,517 B1 * | 5/2003 | Bhagwat ............ G06F 17/30905 375/E7.016 |
| 6,571,282 B1 | 5/2003 | Bowman-Amuah |
| 6,578,068 B1 | 6/2003 | Bowman-Amuah |
| 6,578,073 B1 | 6/2003 | Starnes et al. |
| 6,584,567 B1 | 6/2003 | Bellwood et al. |
| 6,584,569 B2 | 6/2003 | Reshef et al. |
| 6,587,880 B1 | 7/2003 | Saigo et al. |
| 6,591,266 B1 | 7/2003 | Li et al. |
| 6,601,192 B1 | 7/2003 | Bowman-Amuah |
| 6,601,233 B1 | 7/2003 | Underwood |
| 6,601,234 B1 | 7/2003 | Bowman-Amuah |
| 6,606,660 B1 | 8/2003 | Bowman-Amuah |
| 6,609,128 B1 | 8/2003 | Underwood |
| 6,611,840 B1 | 8/2003 | Baer et al. |
| 6,615,166 B1 | 9/2003 | Guheen et al. |
| 6,615,199 B1 | 9/2003 | Bowman-Amuah |
| 6,615,253 B1 | 9/2003 | Bowman-Amuah |
| 6,625,643 B1 | 9/2003 | Colby et al. |
| 6,633,878 B1 | 10/2003 | Underwood |
| 6,636,242 B2 | 10/2003 | Bowman-Amuah |
| 6,640,238 B1 | 10/2003 | Bowman-Amuah |
| 6,640,240 B1 | 10/2003 | Hoffman et al. |
| 6,640,244 B1 | 10/2003 | Bowman-Amuah |
| 6,640,249 B1 | 10/2003 | Bowman-Amuah |
| 6,658,464 B2 | 12/2003 | Reisman |
| 6,680,922 B1 | 1/2004 | Jorgensen |
| 6,691,301 B2 | 2/2004 | Bowen |
| 6,701,514 B1 | 3/2004 | Haswell et al. |
| 6,704,738 B1 | 3/2004 | De Vries et al. |
| 6,704,873 B1 | 3/2004 | Underwood |
| 6,715,145 B1 | 3/2004 | Bowman-Amuah |
| 6,718,535 B1 | 4/2004 | Underwood |
| 6,721,713 B1 | 4/2004 | Guheen et al. |
| 6,731,625 B1 | 5/2004 | Eastep et al. |
| 6,742,015 B1 | 5/2004 | Bowman-Amuah |
| 6,754,181 B1 | 6/2004 | Elliott et al. |
| 6,754,699 B2 | 6/2004 | Swildens et al. |
| 6,771,290 B1 | 8/2004 | Hoyle |
| 6,772,203 B1 | 8/2004 | Feiertag et al. |
| 6,792,458 B1 | 9/2004 | Muret et al. |
| 6,804,701 B2 | 10/2004 | Muret et al. |
| 6,807,277 B1 | 10/2004 | Doonan et al. |
| 6,816,872 B1 | 11/2004 | Squibb |
| 6,823,374 B2 | 11/2004 | Kausik et al. |
| 6,826,594 B1 | 11/2004 | Pettersen |
| 6,826,696 B1 | 11/2004 | Chawla et al. |
| 6,839,701 B1 | 1/2005 | Baer et al. |
| 6,842,906 B1 | 1/2005 | Bowman-Amuah |
| 6,847,983 B2 | 1/2005 | Somalwar et al. |
| 6,849,045 B2 | 2/2005 | Iliff |
| 6,859,879 B2 | 2/2005 | Henn et al. |
| 6,868,292 B2 | 3/2005 | Ficco et al. |
| 6,895,084 B1 | 5/2005 | Saylor et al. |
| 6,907,546 B1 | 6/2005 | Haswell et al. |
| 6,909,708 B1 | 6/2005 | Krishnaswamy et al. |
| 6,920,150 B1 * | 7/2005 | Pauls .................... H04L 1/0009 370/465 |
| 6,925,467 B2 | 8/2005 | Gu et al. |
| 6,956,858 B2 | 10/2005 | Hariguchi et al. |
| 6,957,186 B1 | 10/2005 | Guheen et al. |
| 6,963,981 B1 | 11/2005 | Bailey et al. |
| 6,976,090 B2 | 12/2005 | Ben-Shaul et al. |
| 6,980,962 B1 | 12/2005 | Arganbright et al. |
| 6,981,180 B1 | 12/2005 | Bailey et al. |
| 6,983,331 B1 | 1/2006 | Mitchell et al. |
| 6,986,102 B1 | 1/2006 | Baer et al. |
| 6,987,987 B1 | 1/2006 | Vacanti et al. |
| 6,993,004 B2 | 1/2006 | Boys |
| 7,007,034 B1 | 2/2006 | Hartman et al. |
| 7,007,064 B2 | 2/2006 | Faris |
| 7,034,691 B1 | 4/2006 | Rapaport et al. |
| 7,035,907 B1 | 4/2006 | Decasper et al. |
| 7,043,488 B1 | 5/2006 | Baer et al. |
| 7,047,281 B1 | 5/2006 | Kausik |
| 7,054,912 B2 | 5/2006 | Kanai et al. |
| 7,058,180 B2 | 6/2006 | Ferchichi et al. |
| 7,058,718 B2 | 6/2006 | Fontes et al. |
| 7,076,486 B2 | 7/2006 | Livshits |
| 7,076,494 B1 | 7/2006 | Baer et al. |
| 7,080,041 B2 | 7/2006 | Nagel |
| 7,085,834 B2 | 8/2006 | Delany et al. |
| 7,089,239 B1 | 8/2006 | Baer et al. |
| 7,092,370 B2 | 8/2006 | Jiang et al. |
| 7,093,018 B1 | 8/2006 | Sievers et al. |
| 7,096,495 B1 | 8/2006 | Warrier et al. |
| 7,100,195 B1 | 8/2006 | Underwood |
| 7,103,772 B2 | 9/2006 | Jorgensen et al. |
| 7,107,285 B2 | 9/2006 | Von Kaenel et al. |
| 7,107,309 B1 | 9/2006 | Geddes et al. |
| 7,117,504 B2 | 10/2006 | Smith et al. |
| 7,127,713 B2 | 10/2006 | Davis et al. |

(56) References Cited

U.S. PATENT DOCUMENTS

| | | |
|---|---|---|
| 7,145,898 B1 | 12/2006 | Elliott |
| 7,149,698 B2 | 12/2006 | Guheen et al. |
| 7,152,047 B1 | 12/2006 | Nagel |
| 7,165,041 B1 | 1/2007 | Guheen et al. |
| 7,174,563 B1 | 2/2007 | Brownlie et al. |
| 7,188,216 B1 | 3/2007 | Rajkumar et al. |
| 7,197,762 B2 | 3/2007 | Tarquini |
| 7,203,722 B2 | 4/2007 | Elnozahy |
| 7,209,466 B2 | 4/2007 | Cabana |
| 7,216,713 B2 | 5/2007 | Read, Jr. |
| 7,222,137 B2 | 5/2007 | Terazono et al. |
| 7,320,009 B1 | 1/2008 | Srivastava et al. |
| 7,353,225 B2 | 4/2008 | Dada |
| 7,359,956 B2 | 4/2008 | Kanai et al. |
| 7,360,025 B1 | 4/2008 | O'Connell et al. |
| 7,366,824 B2 | 4/2008 | Chiang |
| 7,389,540 B2 | 6/2008 | Radatti et al. |
| 7,392,260 B2 | 6/2008 | Ren et al. |
| 7,437,457 B1 | 10/2008 | Eisendrath et al. |
| 7,441,119 B2 | 10/2008 | Brabson et al. |
| 7,464,332 B2 | 12/2008 | Carter, II |
| 7,512,702 B1 | 3/2009 | Srivastava et al. |
| 7,529,779 B2 | 5/2009 | Herle et al. |
| 7,565,450 B2 | 7/2009 | Garcia-Luna-Aceves et al. |
| 7,577,749 B1 | 8/2009 | Long |
| 7,616,597 B2 | 11/2009 | Liu et al. |
| 7,634,800 B2 | 12/2009 | Ide et al. |
| 7,698,318 B2 | 4/2010 | Fries et al. |
| 7,698,416 B2 | 4/2010 | Potti et al. |
| 7,711,706 B2 | 5/2010 | Manapetty et al. |
| 7,730,031 B2 | 6/2010 | Forster |
| 7,743,063 B2 | 6/2010 | James et al. |
| 7,797,406 B2 | 9/2010 | Patel et al. |
| 7,881,995 B2 | 2/2011 | Grimberg |
| 7,890,464 B2 | 2/2011 | Reinsch |
| 7,890,634 B2 | 2/2011 | Jiang et al. |
| 7,941,410 B2 | 5/2011 | Sagar et al. |
| 7,970,806 B2 | 6/2011 | Park et al. |
| 8,024,778 B2* | 9/2011 | Cash ............... G06Q 20/4016 705/38 |
| 8,136,149 B2* | 3/2012 | Freund ............. H04L 63/0227 713/152 |
| 8,156,071 B2 | 4/2012 | Gu et al. |
| 8,234,699 B2 | 7/2012 | Pollutro et al. |
| 8,776,166 B1* | 7/2014 | Erickson ........... H04L 63/083 726/1 |
| 2001/0019630 A1 | 9/2001 | Johnson |
| 2002/0010855 A1 | 1/2002 | Reshef et al. |
| 2002/0042821 A1 | 4/2002 | Muret et al. |
| 2002/0049608 A1 | 4/2002 | Hartsell et al. |
| 2002/0049841 A1 | 4/2002 | Johnson et al. |
| 2002/0059274 A1 | 5/2002 | Hartsell et al. |
| 2002/0065864 A1 | 5/2002 | Hartsell et al. |
| 2002/0065911 A1 | 5/2002 | Von Klopp et al. |
| 2002/0083175 A1 | 6/2002 | Afek et al. |
| 2002/0116642 A1 | 8/2002 | Joshi et al. |
| 2002/0129271 A1 | 9/2002 | Stanaway et al. |
| 2002/0133723 A1 | 9/2002 | Tait |
| 2002/0138572 A1 | 9/2002 | Delany et al. |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0147927 A1 | 10/2002 | Tait |
| 2002/0161904 A1 | 10/2002 | Tredoux et al. |
| 2002/0165971 A1 | 11/2002 | Baron |
| 2002/0174227 A1 | 11/2002 | Hartsell et al. |
| 2002/0178211 A1 | 11/2002 | Singhal et al. |
| 2003/0014623 A1 | 1/2003 | Freed et al. |
| 2003/0014628 A1 | 1/2003 | Freed et al. |
| 2003/0037108 A1 | 2/2003 | Peiffer et al. |
| 2003/0041091 A1 | 2/2003 | Cheline et al. |
| 2003/0051142 A1 | 3/2003 | Hidalgo et al. |
| 2003/0056096 A1 | 3/2003 | Albert et al. |
| 2003/0065763 A1 | 4/2003 | Swildens et al. |
| 2003/0069803 A1 | 4/2003 | Pollitt |
| 2003/0105957 A1 | 6/2003 | Brabson et al. |
| 2003/0154239 A1 | 8/2003 | Davis et al. |
| 2003/0182423 A1 | 9/2003 | Shafir et al. |
| 2003/0212771 A1 | 11/2003 | Kwon et al. |
| 2003/0217149 A1 | 11/2003 | Crichton et al. |
| 2003/0233581 A1 | 12/2003 | Reshef et al. |
| 2004/0006643 A1 | 1/2004 | Dolson et al. |
| 2004/0006739 A1 | 1/2004 | Mulligan |
| 2004/0010621 A1 | 1/2004 | Afergan et al. |
| 2004/0031058 A1 | 2/2004 | Reisman |
| 2004/0039827 A1 | 2/2004 | Thomas et al. |
| 2004/0073701 A1 | 4/2004 | Huang et al. |
| 2004/0122951 A1 | 6/2004 | Beck et al. |
| 2004/0168083 A1 | 8/2004 | Gasparini et al. |
| 2004/0177247 A1 | 9/2004 | Peles |
| 2004/0249970 A1 | 12/2004 | Castro et al. |
| 2004/0255048 A1 | 12/2004 | Lev Ran et al. |
| 2005/0004954 A1 | 1/2005 | Soule, III |
| 2005/0015429 A1 | 1/2005 | Ashley et al. |
| 2005/0015594 A1 | 1/2005 | Ashley et al. |
| 2005/0033858 A1 | 2/2005 | Swildens et al. |
| 2005/0039190 A1 | 2/2005 | Rees et al. |
| 2005/0044089 A1 | 2/2005 | Wu et al. |
| 2005/0050053 A1 | 3/2005 | Thompson |
| 2005/0055577 A1 | 3/2005 | Wesemann et al. |
| 2005/0097598 A1 | 5/2005 | Pedlow et al. |
| 2005/0108710 A1 | 5/2005 | Patiejunas |
| 2005/0122980 A1 | 6/2005 | Anand et al. |
| 2005/0132030 A1 | 6/2005 | Hopen et al. |
| 2005/0132060 A1 | 6/2005 | Mo et al. |
| 2005/0165889 A1 | 7/2005 | Muret et al. |
| 2005/0198380 A1 | 9/2005 | Panasyuk et al. |
| 2005/0210263 A1 | 9/2005 | Levas et al. |
| 2005/0251856 A1 | 11/2005 | Araujo et al. |
| 2005/0273849 A1 | 12/2005 | Araujo et al. |
| 2005/0273850 A1 | 12/2005 | Freund |
| 2006/0020807 A1 | 1/2006 | Aura et al. |
| 2006/0041635 A1 | 2/2006 | Alexander et al. |
| 2006/0047974 A1 | 3/2006 | Alpern et al. |
| 2006/0068755 A1 | 3/2006 | Shraim et al. |
| 2006/0069926 A1 | 3/2006 | Ginter et al. |
| 2006/0075464 A1 | 4/2006 | Golan et al. |
| 2006/0080432 A1 | 4/2006 | Spataro et al. |
| 2006/0085850 A1 | 4/2006 | Mayfield et al. |
| 2006/0106888 A1 | 5/2006 | Iida et al. |
| 2006/0112174 A1 | 5/2006 | L'Heureux et al. |
| 2006/0130046 A1 | 6/2006 | O'Neill |
| 2006/0143702 A1* | 6/2006 | Hisada ............. H04L 12/4641 726/15 |
| 2006/0212706 A1 | 9/2006 | Jiang et al. |
| 2006/0271705 A1 | 11/2006 | Garcia-Luna-Aceves |
| 2007/0005777 A1 | 1/2007 | Fremantle et al. |
| 2007/0106681 A1 | 5/2007 | Haot et al. |
| 2007/0156852 A1 | 7/2007 | Sundarrajan et al. |
| 2007/0179955 A1 | 8/2007 | Croft et al. |
| 2007/0180088 A1 | 8/2007 | Zhao |
| 2007/0192853 A1 | 8/2007 | Shraim et al. |
| 2007/0245409 A1 | 10/2007 | Harris et al. |
| 2007/0253553 A1 | 11/2007 | Abdul Rahman et al. |
| 2007/0294762 A1 | 12/2007 | Shraim et al. |
| 2007/0299915 A1 | 12/2007 | Shraim et al. |
| 2008/0016233 A1 | 1/2008 | Schneider |
| 2008/0034416 A1 | 2/2008 | Kumar et al. |
| 2008/0034425 A1 | 2/2008 | Overcash et al. |
| 2008/0046616 A1 | 2/2008 | Verzunov et al. |
| 2008/0049786 A1 | 2/2008 | Ram et al. |
| 2008/0208752 A1* | 8/2008 | Gottlieb ............. G06Q 20/085 705/51 |
| 2008/0225720 A1 | 9/2008 | Khemani et al. |
| 2008/0225748 A1 | 9/2008 | Khemani et al. |
| 2008/0225753 A1 | 9/2008 | Khemani et al. |
| 2008/0229381 A1 | 9/2008 | Sikka et al. |
| 2010/0049850 A1 | 2/2010 | Nanduri et al. |
| 2011/0138179 A1 | 6/2011 | Jiang et al. |
| 2011/0202755 A1 | 8/2011 | Orsini et al. |
| 2012/0027024 A1 | 2/2012 | Liang |
| 2012/0036178 A1 | 2/2012 | Gavini et al. |

(56) References Cited

U.S. PATENT DOCUMENTS

| | | | |
|---|---|---|---|
| 2012/0331159 | A1 | 12/2012 | Srtom et al. |
| 2012/0331379 | A1 | 12/2012 | Carro et al. |
| 2013/0283343 | A1* | 10/2013 | Lim .................. G06F 21/62 726/1 |

FOREIGN PATENT DOCUMENTS

| | | |
|---|---|---|
| EP | 2 043 328 A2 | 4/2009 |
| WO | WO-99/64967 A1 | 12/1999 |
| WO | WO-00/51031 | 8/2000 |
| WO | WO-02/39261 A2 | 5/2002 |
| WO | WO-02/39264 A2 | 5/2002 |
| WO | WO-02/39275 A2 | 5/2002 |
| WO | WO-02/39666 A2 | 5/2002 |
| WO | WO-02/39693 A2 | 5/2002 |
| WO | WO-02/39695 A2 | 5/2002 |
| WO | WO-02/41575 A2 | 5/2002 |
| WO | WO-02/43364 A2 | 5/2002 |
| WO | WO-02/45370 A2 | 6/2002 |
| WO | WO-2005/029313 A1 | 3/2005 |
| WO | WO-2005/029363 A1 | 3/2005 |
| WO | WO-2006/012612 | 2/2006 |
| WO | WO-2006/061843 A2 | 6/2006 |
| WO | WO-2006/074072 A3 | 7/2006 |
| WO | WO-2007/024647 A2 | 3/2007 |
| WO | WO-2007/065146 A2 | 6/2007 |
| WO | WO-2008/112691 A2 | 9/2008 |
| WO | WO-2008/112692 A2 | 9/2008 |
| WO | WO-2008/112698 A2 | 9/2008 |

OTHER PUBLICATIONS

US Office Action on U.S. Appl. No. 14/594,963 DTD Mar. 15, 2016.
Advisory Action for U.S. Appl. No. 11/465,894 dated Mar. 10, 2010.
Advisory Action for U.S. Appl. No. 11/465,894 dated Mar. 15, 2011.
Advisory Action for U.S. Appl. No. 11/465,915 dated Mar. 10, 2010.
Australian Examination Report on 2007281083 dated Nov. 30, 2010.
Barrett, R. et al., "Intermediaries: New Places for Producing and Manipulating Web Content," Computer Networks and ISDN Systems, North Holland Publishing, Amsterdam, NL, vol. 30, No. 1-7, Apr. 1998 (14 pages).
Chinese Office Action for CN Application No. 200780036904.8 dated Apr. 12, 2012.
Chinese Office Action on 200780024871.5 dated Nov. 23, 2011.
Chinese Office Action on 200780036904.8 dated Oct. 10, 2011.
European Office Action issued on Dec. 21, 2012 in European Patent Application No. 07812481.5.
Indian First Exam Report for Indian Application No. 5104/KOLNP/2008 dated Apr. 27, 2015.
International Preliminary Report on Patentability for PCT/US2007/072490, dated Jan. 6, 2009, 8 pages.
International Preliminary Report on Patentability issued Jul. 11, 2013 in PCT Application No. PCT/US2011/067369.
International Preliminary Report on Patentability, PCT/US2007/075037, mailed on Feb. 3, 2009.
International Search Report for International Application No. PCT/US2007/075178, mailed on Jan. 28, 2008.
International Search Report for PCT Application No. PCT/US2007/072490. Date of mailing: Mar. 12, 2008. 2 pages.
International Search Report issued Jun. 26, 2012 in PCT Application No. PCT/US2011/067369.
Notice of Allowance for Application U.S. Appl. No. 11/462,267 dated Sep. 12, 2014.
Notice of Allowance for U.S. Appl. No. 11/465,894 dated Dec. 5, 2012.
Notice of Allowance for U.S. Appl. No. 11/465,915 dated Nov. 9, 2012.
Office Action for U.S. Appl. No. 11/465,894, dated May 18, 2010.
Office Action for U.S. Appl. No. 11/465,894 dated Dec. 29, 2009.
Office Action for U.S. Appl. No. 11/465,894 dated Mar. 9, 2012.
Office Action for U.S. Appl. No. 11/465,915 dated Jun. 29, 2010.
Office Action for U.S. Appl. No. 11/465,915 dated Dec. 31, 2009.
Park J S et al: "Secure cookies on the Web", IEEE Internet Computing, IEEE Service Center, New York, NY, US, Jul. 1, 2000, pp. 36-44, XP002190888.
U.S. Office Action, dated Aug. 3, 2009, in U.S. Appl. No. 11/465,915, 12 pages.
US Final Office Action for U.S. Appl. No. 11/462,308 dated Feb. 24, 2010.
US Final Office Action for U.S. Appl. No. 11/462,300 dated Jan. 29, 2010.
US Non-final Office Action for U.S. Appl. No. 11/462,267 dated May 27, 2010.
US Non-final Office Action for U.S. Appl. No. 11/462,308 dated Aug. 4, 2009.
US Non-final Office Action for U.S. Appl. No. 11/462,308 dated Nov. 12, 2010.
US Non-final Office Action in U.S. Appl. No. 11/462,300 dated Jul. 8, 2009.
US Notice of Allowance for U.S. Appl. No. 12/790,400 dated May 8, 2014.
US Notice of Allowance for U.S. Appl. No. 13/337,735 dated Jun. 11, 2014.
US Notice of Allowance for U.S. Appl. No. 13/760,898 dated Jun. 4, 2014.
US Notice of Allowance for U.S. Appl. No. 13/850,848 dated Apr. 24, 2014.
US Notice of Allowance for U.S. Appl. No. 11/462,308 dated Nov. 23, 2012.
US Office Action U.S. Appl. No. 14/594,963 DTD Sep. 9, 2015.
US Office Action dated Jul. 29, 2009 in U.S. Appl. No. 11/465,894.
US Office Action for U.S. Appl. No. 11/465,915 dated Dec. 3, 2010.
US Office Action for U.S. Appl. No. 11/462,267 dated Oct. 28, 2013.
US Office Action for U.S. Appl. No. 11/462,267 dated May 6, 2014.
US Office Action for U.S. Appl. No. 11/465,894 dated Oct. 27, 2010.
US Office Action for U.S. Appl. No. 11/465,894 dated Sep. 20, 2011.
US Office Action for U.S. Appl. No. 12/790,400 dated Jan. 23, 2013.
US Office Action for U.S. Appl. No. 12/790,400 dated Nov. 16, 2011.
US Office Action for U.S. Appl. No. 12/790,400 dated Dec. 16, 2013.
US Office Action for U.S. Appl. No. 12/790,400 dated May 31, 2011.
US Office Action for U.S. Appl. No. 12/790,400 dated Jul. 12, 2013.
US Office Action for U.S. Appl. No. 12/790,400 dated Aug. 2, 2012.
US Office Action for U.S. Appl. No. 13/337,735 dated Nov. 1, 2013.
US Office Action for U.S. Appl. No. 13/337,735 dated Feb. 11, 2013.
US Office Action for U.S. Appl. No. 13/850,848 dated Feb. 13, 2014.
US Office Action for U.S. Appl. No. 13/850,848 dated Aug. 1, 2013.
US Office Action for U.S. Appl. No. 13/370,989 dated Nov. 19, 2013.
US Office Action for U.S. Appl. No. 11/462,267 dated Nov. 10, 2010.
US Office Action for U.S. Appl. No. 11/462,267 dated Nov. 10, 2011.
US Office Action for U.S. Appl. No. 11/462,267 dated Mar. 7, 2012.
US Office Action for U.S. Appl. No. 11/462,267 dated May 11, 2011.
US Office Action for U.S. Appl. No. 11/462,300 dated Feb. 14, 2011.
US Office Action for U.S. Appl. No. 11/462,308 dated Nov. 12, 2011.
US Office Action for U.S. Appl. No. 11/462,308 dated May 10, 2011.
Written Opinion of the International Searching Authority for International Application No. PCT/US2007/075178, mailed on Jan. 28, 2008.
U.S. Appl. No. 11/439,003, filed May 22, 2006.
U.S. Appl. No. 14/448,642, filed Jul. 31. 2014.
U.S. Appl. No. 11/462,267, filed Aug. 3, 2006.
U.S. Appl. No. 14/594,963, filed Jan. 12, 2015.
U.S. Appl. No. 14/448,265, filed Jul. 31, 2014.
U.S. Appl. No. 11/428,058, filed Jun. 30, 2006.
U.S. Appl. No. 12/790,400, filed May 28, 2010.
U.S. Appl. No. 11/465,915, filed Aug. 21, 2006.
U.S. Appl. No. 13/760,898, filed Feb. 6, 2013.
U.S. Appl. No. 11/439,009, filed May 22, 2006.
U.S. Appl. No. 14/077,119, filed Nov. 11, 2013.

* cited by examiner

SYSTEMS AND METHODS FOR ENHANCED CLIENT SIDE POLICY

CROSS RELATED APPLICATIONS

The present application is a continuation-in-part of and claims priority to and the benefit of U.S. Non-provisional application Ser. No. 14/077,119, entitled "Dynamic Data Optimization in Data Network" and filed on Nov. 11, 2013, which is a continuation of and claims priority and the benefit of U.S. Non-provisional application Ser. No. 11/439,009, entitled "Dynamic Data Optimization In Data Network" and filed on May 22, 2006, and now issued as U.S. Pat. No. 8,583,827, which claims priority to and the benefit of U.S. Provisional Application No. 60/685,260, entitled "Advanced Data Optimization" and filed May 26, 2005; and the present application is also a continuation-in-part of and claims priority to and the benefit of U.S. Non-provisional application Ser. No. 13/760,898, entitled "Method And System For Authorizing A Level of Access of A Client To a Virtual Private Network Connection, Based On a Client-side Attribute" and filed on Feb. 6, 2013, which is a continuation of and claims priority to and the benefit of U.S. Non-provisional application Ser. No. 11/465,915, entitled "Method And System For Authorizing A Level of Access of A Client To a Virtual Private Network Connection, Based On a Client-side Attribute", filed on Aug. 21, 2006 and now issued as U.S. Pat. No. 8,397,287, all of which are incorporated herein by reference in their entirety for all purposes.

FIELD

The present invention generally relates to data communication networks. In particular, the present invention relates to a method and system for authorizing a level of access of a client to a virtual private network connection, based on a client-side attribute.

BACKGROUND

Internet access is becoming pervasive; wireless access is available anywhere one can use a mobile phone. However, user experience is far from uniform on these networks. The network topology and access type can greatly affect the user experience. Consider the following examples:

First, a user can connect to a corporate 100 Mbps LAN, and access Internet sites. How fast the connection "feels" to the user can be dominated by the corporate uplink to the backbone. For example, if it is a 1000 person company sharing a 384 Kbps DSL link, it will be very slow. However, if they have a 1 Mbps T1 link shared amongst 50 people, it can feel much faster.

Second, a user can setup a 11 Mbps WiFi network in their home and use a 2 Mbps cable modem to connect to the Internet. In this case, the user's experience will be dominated by the 2 Mbps cable modem that is actually shared by all the people on the block.

Finally, a user can use a 40 Kbps GPRS modem to connect to a mobile network, which has a T1 connection to the backbone. In this case, the T1 is shared amongst all of the connected users, but unless the network provider is over-provisioned, this link will be underutilized. Thus, the GPRS link will dominate the user experience.

The common thread in all of these scenarios is that disparate networks connect together to give a user access to the Internet, but the user experience is typically dominated by a single link in that topology.

Before an endpoint gains access to corporate enterprise network infrastructure and resources, it is increasingly becoming necessary to determine that the endpoint has undergone host security checks and audits to verify that it meets corporate information technology policies. Examples of such checks include, without limitation, verifying that the anti-virus software on the endpoint is up to date, that the latest operating system patches have been installed and that no malicious software is executing on the endpoint. Performing these checks minimizes the infection of other connected corporate assets by a compromised endpoint.

Conventional methods of access control typically require receipt and evaluation of authentication credentials from a client prior to granting access. The credentials are typically presented to an access infrastructure or other security gateway, which determines what types of access may be provided to the client. Methods for requesting and receiving these credentials typically generate additional administrative burdens. For example, if a user is entering the credentials into a user interface, the request for the required credentials must be translated into a format understandable the user, for example from the expression in which the policy was added to a request identifying the explicit credentials required for evaluation of the policy. When the credentials are received from the user, in some methods, a policy engine applies a policy to the credentials in making an access control decision. This typically requires transmission from a component receiving the credentials to the component making the access control decision, generating additional delay in situations where the components are remotely located from each other and from the client.

A method minimizing administrative burden in requesting user credentials by transmitting an expression of a policy to a client without modifying the format of the expression would be desirable. A method for evaluating such an expression by the client, minimizing the number of components required to reach an access control decision would also be desirable.

SUMMARY

In one aspect, a method for authorizing a level of access of a client to a virtual private network connection, based on a client-side attribute includes establishing, by an appliance, a control connection with a client upon receiving a client request to establish a virtual private network connection with a network. The appliance transmits, via the control connection, a request to the client to evaluate at least one clause of a security string, the at least one clause including an expression associated with a client-side attribute. The client transmits, via the control connection, a response to the appliance comprising a result of evaluating the at least one clause by the client. The appliance assigns the client to an authorization group based on the result of evaluation of the at least one clause.

In one embodiment, the appliance transmits the request to evaluate the at least one clause to a collection agent. In another embodiment, the client executes a script to evaluate the at least one clause. In still another embodiment, the client gathers information associated with the client-side attribute. In yet another embodiment, the client evaluates the at least one clause responsive to the gathered information.

In one embodiment, the client identifies a client-side attribute indicating a presence on the client of one of the following: a version of an operating system, a service pack of the operating system, a running service, a running process, and a file. In another embodiment, the client identifies a client-side attribute indicating a presence on the client of one of the following: antivirus software, personal firewall software, anti-spam software, and internet security software. In still another embodiment, the client identifies a client-side attribute identifying a version of one of the following: antivirus software, personal firewall software, anti-spam software, and internet security software.

In one embodiment, the appliance evaluates a second clause of the security string. In another embodiment, the client evaluates a clause of the security string comprising one or more logical operations. In still another embodiment, the appliance transmits the response comprising the result of the evaluation to a policy engine. In yet another embodiment, the appliance assigns the client to the authorization group responsive to an application of a policy by the policy engine to the result of the evaluation.

In one embodiment, the appliance determines that the client lacks a desired client-side attribute, responsive to the result of evaluation of the at least one clause. In another embodiment, the appliance assigns the client to an authorization group providing quarantined access to the network via the appliance. In still another embodiment, the appliance denies a login request from a client if the security string is not associated with an authorization group. In yet another embodiment, the appliance establishes a virtual private network connection with the client in accordance with the authorization group.

In another aspect, a system for authorizing a level of access of a client to a virtual private network connection based on a client-side attribute includes a means for transmitting a request, a request for evaluation of at least one clause of a security string, an evaluation component, a means for transmitting a response to the request, and a means for receiving an assignment to an authorization group. The system comprises a means for transmitting, by a client, a request to an application for a virtual private network connection to a network. The client receives a request, via a control connection between the client and the appliance, for evaluation of at least one clause of a security string, the at least one clause identifying an object for evaluation, an attribute of the object, and a pre-requisite associated with the attribute. An evaluation component on the client identifies the attribute and determines whether the attribute satisfies the pre-requisite, and evaluates the at least one clause. The system comprises a means for transmitting, by the client via the control connection, a response comprising a result of the evaluation of the at least one clause by the evaluation component. The system comprises a means for receiving, from the appliance, an assignment to an authorization group, the assignment determined based on the evaluation of the at least one clause.

In one embodiment, the request received by the client includes at least one clause of a security string, the at least one clause identifying the client as an object for evaluation. In another embodiment, the request received by the client includes at least one clause of a security string, the at least one clause identifying a presence of an application program on the client as an attribute of the object. In still another embodiment, the request received by the client includes at least one clause of a security string, the at least one clause identifying an absence of an application program on the client as an attribute of the object. In yet another embodiment, the request received by the client includes at least one clause of a security string, the at least one clause identifying a presence of a version of an application program on the client as an attribute of the object.

In one embodiment, the request received by the client includes at least one clause of a security string, the at least one clause identifying an absence of a version of an application program on the client as an attribute of the object. In another embodiment, the request received by the client includes at least one clause of a security string, the at least one clause identifying a presence of a required version of an application program on the client as a pre-requisite. In still another embodiment, the request received by the client includes at least one clause of a security string, the at least one clause identifying a presence of an application program on the client as a pre-requisite. In yet another embodiment, the request received by the client includes at least one clause of a security string, the at least one clause identifying an absence of an application program on the client as a pre-requisite.

In one embodiment, the evaluation component executes a script to evaluate the at least one clause. In another embodiment, the evaluation component further comprises a collection agent gathering information associated with the attribute. In still another embodiment, the evaluation component evaluates the at least one clause responsive to the gathered information. In yet another embodiment, the evaluation component is transmitted to the client from the appliance.

In one embodiment, the evaluation component identifies an attribute indicating a presence on the client of one of the following: a version of an operating system, a service pack of the operating system, a running service, a running process, and a file. In another embodiment, the evaluation component identifies an attribute indicating a presence on the client of one of the following: antivirus software, personal firewall software, anti-spam software, and internet security software. In still another embodiment, the evaluation component identifies an attribute identifying a version of one of the following: antivirus software, personal firewall software, anti-spam software, and internet security software. In yet another embodiment, the evaluation component determines that that the attribute satisfies the pre-requisite responsive to the identification of the attribute.

In one embodiment, the means for receiving an assignment further comprises a means for receiving an assignment made responsive to the result of evaluation of a second clause by the appliance. In another embodiment, the means for receiving an assignment further comprises a means for receiving an assignment made responsive to a determination by the appliance that the client lacks a desired attribute. In still another embodiment, the means for receiving an assignment further comprises a means for receiving an assignment to an authorization group providing quarantined access to the network via the appliance. In yet another embodiment, the means for receiving an assignment further comprises a means for receiving a denial, by the appliance, of the client request if the security string is not associated with an authorization group. In a further embodiment, the means for receiving an assignment further comprises a means for receiving an a denial, by the appliance, of the client request if a pre-requisite in the security string is not satisfied.

In some aspects, the present solution is directed to a method for adjusting tuning settings based on an attribute of a client. The method includes identifying, by a device intermediary to a client and a content server, a policy for evaluating the client responsive to a first request of the client to access the content server. The policy specifies an expression comprising a clause to be evaluated by the client to identify an attribute of the client. The method also includes transmitting, by the device to the client, a second request to the client to have the client evaluate the clause and receiving, by the device from the client, a response to the second request, the response comprising the attribute of the client. The method further includes receiving, by a server intermediary to at least the client and the content server, the attribute of the client from the device. The server is configured with tuning settings for improving performance of communications of response data from the content server to the client. The method also includes adjusting, by the server, the tuning settings based on the attribute of the client.

In some embodiments, the expression includes a plurality of clauses joined by one or more logical operators. Each clause of the plurality of clauses to be evaluated by the client to identify a different attribute of the client.

In some embodiments, the attribute identifies an application of the client and the server adjusting the tuning settings that correspond to the network data. In some embodiments, the attribute identifies network data and server adjusts the tuning settings that correspond to the network data. In some embodiments, the attribute identifies a characteristic of a network to which the client is connected and the server adjusts the tuning settings that correspond to the characteristic of the network.

In some embodiments, the method includes adjusting, by the server, the tuning settings based on user preferences. In some embodiments, the method includes manipulating, by the server, response data from the content server based on techniques corresponding to the adjusted tuning settings.

In some aspects, the present solution is directed to a system for adjusting tuning settings based on an attribute of a client. The system includes a device intermediary to a client and a content server. The device may be configured to identify a policy for evaluating the client responsive to a first request of the client to access the content server. The policy specifies an expression comprising a clause to be evaluated by the client to identify an attribute of the client. The system may also include a server intermediary to at least the client and the content server. The server may include one or more tuning settings for improving performance of communications of response data from the content server to the client. The device may be configured to transmit a second request to the client to have the client evaluate the clause and receive from the client, a response to the second request, the response comprising the attribute of the client. The server may be configured to receive the attribute of the client from the device and adjust the tuning settings based on the attribute of the client.

In some embodiments, the expression includes a plurality of clauses joined by one or more logical operators with each clause of the plurality of clauses to be evaluated by the client to identify a different attribute of the client.

In some embodiments, the attribute identifies an application of the client and the server is configured to adjust the tuning settings that correspond to the network data. In some embodiments, the attribute identifies network data and the server is configured to adjust the tuning settings that correspond to the network data. In some embodiments, the attribute identifies a characteristic of a network to which the client is connected and the server is configured to adjust the tuning settings that correspond to the characteristic of the network.

In some embodiments, the server is configured to adjust the tuning settings based on user preferences. In some embodiments, the server is configured to manipulate response data from the content server based on techniques corresponding to the adjusted tuning settings.

BRIEF DESCRIPTION OF THE DRAWINGS

The foregoing and other objects, aspects, features, and advantages of the invention will become more apparent and better understood by referring to the following description taken in conjunction with the accompanying drawings, in which.

Figure 1:
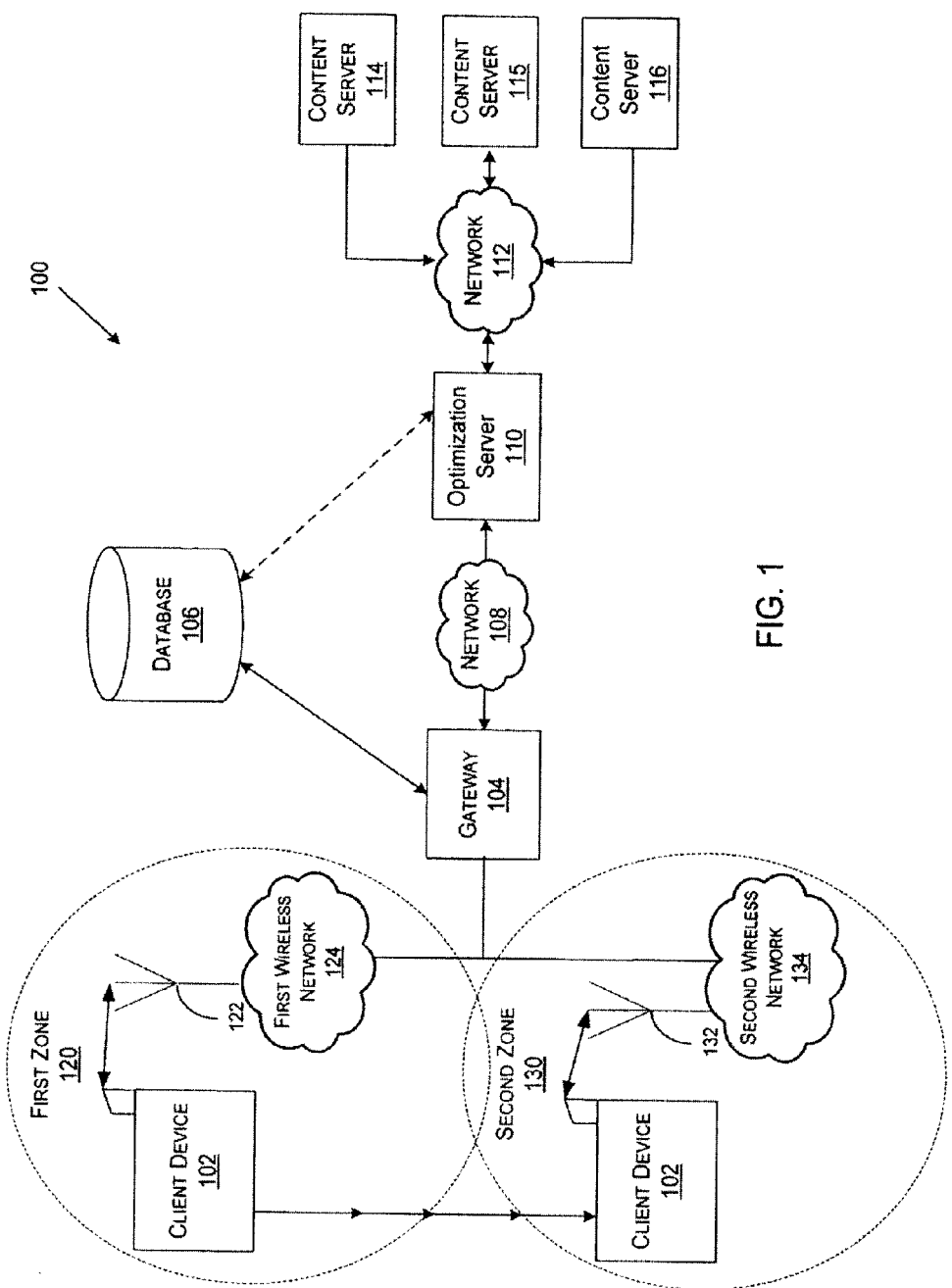
FIG. 1 is a block diagram of an exemplary system.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Reference will now be made in detail to the exemplary embodiments implemented according to the present solution, the examples of which are illustrated in the accompanying drawings. Wherever possible, the same reference numbers will be used throughout the drawings to refer to the same or like parts.

FIG. 1 is a block diagram of an exemplary system 100, which can be any type of system that transmits data over a network. For example, the exemplary system can include a user agent accessing a web page from content servers through the Internet. The exemplary system can include, among other things, a client device 102, a gateway 104, a database 106, one or more networks 108, 112, an optimization server 110, one or more content servers 114-116, a first zone 120 including a first wireless transmission station (WTS) 122 and a first wireless network 124, and a second zone 130 including a second WTS 132 and a second wireless network 134.

Client device 102 is a device that can access remote services through wireless means. For example, client device 102 can be any type of device that has wireless communication capabilities, such as a computer, a laptop, a PDA, a cell phone, a portable game machine, or any device accessing the Internet. In some embodiments, client device 102 stores a user's preferences, such as whether a user prefers a faster downloadable webpage or a better webpage image, and network preference (e.g., AT&T v. Alltel). Additionally, the client device can include a user agent that acts as a client device application used with a network protocol. For example, the user agent could be a web browser, a search engine crawler, a screen reader, or a Braille browser, and the user agent could be used to access the Internet. The user agent can be a software program that transmits request data (e.g. an HTTP/HTTPS/WAP request, etc.) to a web server and receives a corresponding web page in response to the HTTP request. For example, client device 102 could be the Bytemobile Optimization Client Gateway 104 is a device that converts formatted data provided in one type of network to a particular format required for another type of network. Gateway 104, for example, may be a server, a router, a firewall server, a host, or a proxy server. The gateway 104 has the ability to transform the signals received from wireless networks 124, 134 into data packets that network 108 can understand and vice versa. For example, gateway 104 can be a Gateway GPRS Support Node (GGSN) or a Packet Data Support Node (PDSN).

Database 106 is a remote data storage device that stores information relating to the identification of a user and/or client device. For example, database 106 can store information, such as phone number of the client device, cell site of mobile phone, the charging plan for the phone, user's name, user password, user preferences, etc. The database receives authentication requests, authenticates the user and the client device based on the data within the authentication requests, and grants the client device the ability to connect when the database authenticates the client device. In some embodiments, database 106 receives these authentication requests from gateway 104. In some embodiments, database 106 receives these authentication requests from optimization server 110.

Networks 108 and 112 can include any combination of wide area networks (WANs), local area networks (LANs), or wireless networks suitable for networking communication such as Internet communication.

Optimization server (OS) 110 is a server that provides communications between gateway 104 and content servers 114-116. For example, OS 110 could be a Bytemobile Optimization Services Node. OS 110 can provide optimized response data to client device 102 based on received network data. OS can store tuning settings that are based on the network characteristics of the wireless network that client device 102 is connected to. In some embodiments, OS 110 stores a user's preferences. OS 110 can include optimization techniques, which are further described below. Further, in some embodiments, OS 110 can include or be communicatively coupled with a control filter node that would determine whether any of the information received from the content servers needs to be filtered based on the user's preferences stored at the client device. In some embodiments, the user's preferences can be stored at OS 110 instead of the client device.

Content servers 114-116 are servers that receive the request data from user agent 102 and/or OS 110, process the request data accordingly, and return the response data back to user agent 102. For example, content servers 114-116 can be a web server, an enterprise server, or any other type of server. Content servers 114-116 can be a computer or a computer program that is responsible for accepting HTIP requests from the user agent and serving the user agents with web pages.

Wireless networks 124, 134 are telephone or computer networks that can use radio signals as their carrier or physical layer. A wireless network supports devices that communicate using wireless technology. Wireless networks 124, 134 can be any type of wireless network, such as a cellular network or a CDMA network using a 2G or 3G telecommunication standard. A wireless network hub or router (not shown) can be used to bridge the wireless network to traditional Ethernet or home phone line networks, or provide a shared internet connection.

As shown in FIG. 1, client device 102 may communicate with a wireless network by communicating data to a wireless telecommunication station (WTS), for example WTSs 122, 132. WTSs 122, 132 are radio transmitter/receivers, such as antennas, base stations etc., that have the ability to maintain communications with client device 102 within a given range. For example, once a client device is detected to be out of the range of first zone 120, the first WTS 122 may pass the information to the second WTS 132 of a second zone 130 so the second WTS 132 can maintain communications with the client device.

Figure 2:
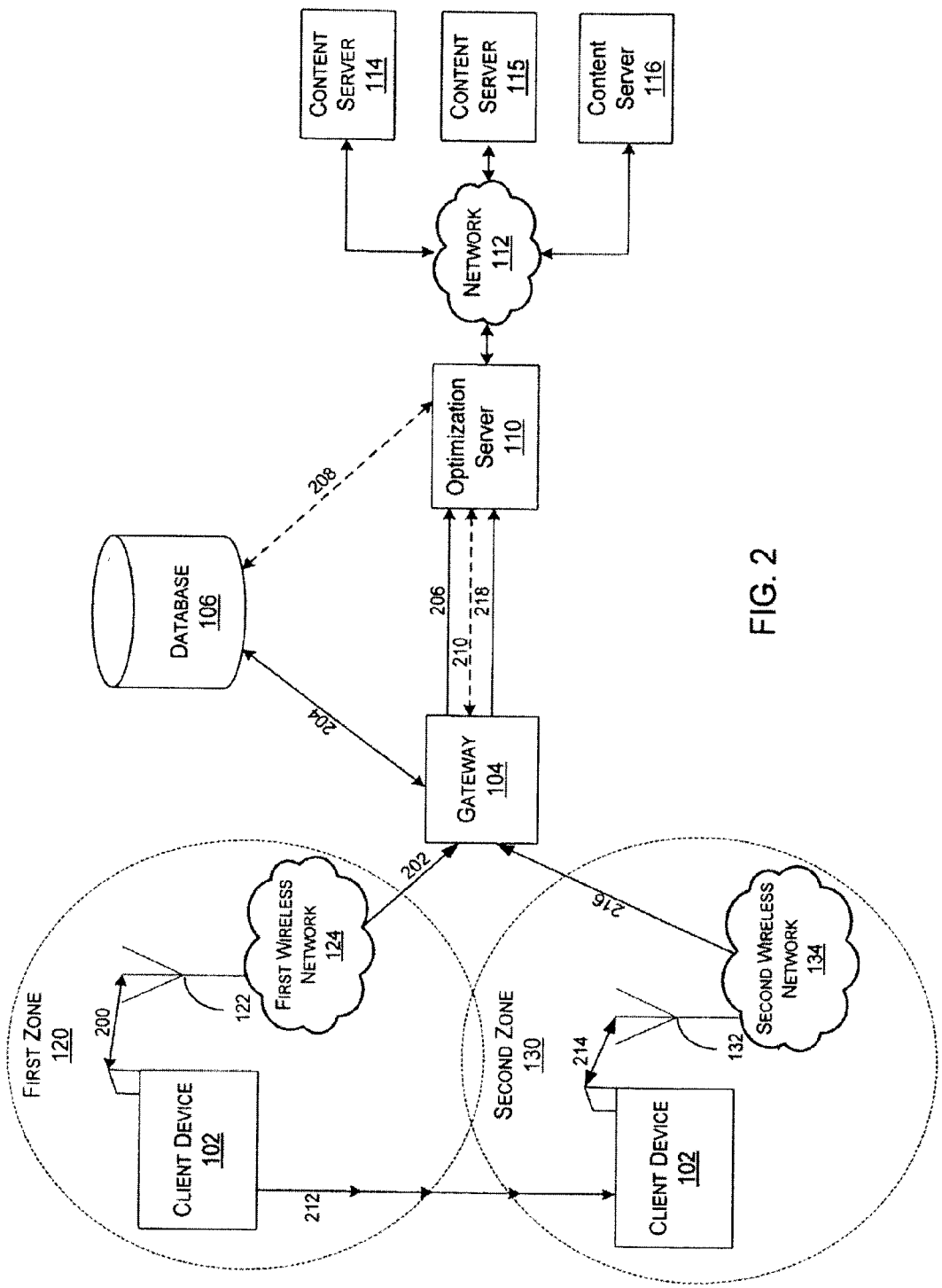
FIG. 2 is a block diagram illustrating an exemplary embodiment for providing network data updates to the optimization server.

FIG. 2 is a block diagram illustrating an exemplary embodiment for providing network data updates to the OS. In this exemplary embodiment, it is assumed that first zone 120 includes a first WTS 122 that has the ability to receive communications from a client device and connect the client device to the first wireless network 124. Further, second zone 130 includes a second WTS 132 that has the ability to receive communications from client device and connects the client device to the second wireless network 134. For this particular embodiment, first wireless network 124 is different than second wireless network 134. For example, first wireless network 124 is a 2.5G standard, while second wireless network 134 is a 3G standard. In some embodiments, wireless networks 124, 134 can be the same or similar to each other, but they may have different network properties. For example, first wireless network 124 may have less traffic than second wireless network 134. As described below, OS 110 can provide optimized response data to client device 102 based on the characteristics (e.g., type and/or properties) of the wireless network that the client device 102 is connected to. Client device 102, which is located in first zone 120, establishes (200) communications with first wireless network 124 through first WTS 122.

After first wireless network 124 receives the communications, first wireless network 124 routes (202) the signal corresponding to the communication to gateway 104. Gateway 104 converts the signal into IP based data packets so that network 108 and/or database 106 can process the data accordingly. Gateway 104 can then query (204) database 106 by providing an authentication request in exchange for an authentication response. Once database 106 has received the authentication request, database 106 can authenticate the request by identifying the client device 102 and/or the user on client device 102. For example, database 106 identifies the user by determining whether the phone number from client device 102 along with the user's name and password, match the information stored at database. Based on the authentication, database 106 transmits an authentication response to gateway 104. If the authentication response is valid, gateway 104 can connect the user to the rest of the network. If the authentication response is invalid, gateway 104 has the ability to prevent the connection. In this exemplary embodiment, the authentication information is assumed to be valid. It will be readily appreciated that in some embodiments, instead of gateway 104 querying the database 106, OS 110 can query database 106 and authenticate the client device 102.

After gateway 104 has authenticated the user, gateway 104 forwards (206) the data packets to OS 110. For example, gateway 104 can transmit the data packets to the OS 110 using a Remote Authentication Dial In User Service (RADIUS) protocol. In some embodiments, gateway 104 can provide network data to any necessary nodes, such as database 106 and/or OS 110, the type of network the client device is using or if the client device has switched networks. The network data can be any type of data that describes the network, such as the type of network that the user is connected to (e.g., 2G, 2.5G, 3G, WLAN, etc.), the cell tower the user is using, the IP address allocated to the user, the phone number of the user, etc. When gateway 104 is notified of a network switch, gateway 104 uses the RADIUS protocol to "push" the network data to OS 110. In some embodiments, gateway pushes this network data to database 106, which then pushes the network data to OS 110. Once OS 110 receives the network data, OS 110 can adjust its tuning settings based on the network data and provide optimized response data to the client device based on these settings. For example, OS 110 can use the network data to adjust the tuning settings and provide advanced optimization techniques, such as among other things, determining whether it would be more beneficial to send a higher quality image to the client device or if the image can have a lesser quality as long as the image gets to the client device faster. When the OS 110 receives response data from a content server 114, the OS 110 can manipulate the response data based on the optimization techniques and transmit the manipulated optimized response data to the client device 102.

In some embodiments, instead of gateway 104 providing the network data, OS 110 can "pull" (208) the network data from any device on the network, such as database 106. OS 110 can request the network data from database 106 via a lightweight directory access protocol (LDAP) interface. In response, database 106 can transmit a response that provides network data to OS 110 and hence, the OS 110 "pulls:—the network data from database 106. Once again, the OS can adjust its tuning settings based on the network data and provide optimized response data to the client device based on these settings.

In some embodiments, OS 110 can sample (210) the network characteristics of the connection to client device 102 and receive network data that assists the OS 110 in determining the type of wireless network that client device 102 is connected to and/or whether the client device 102 has switched networks. OS 110 can use various feedback mechanisms within the protocol to determine this network data. Such feedback mechanisms can include tracking estimated bandwidth and round trip times in the TCP stack. Based on the feedback, OS 110 can determine which network a particular TCP connection is routed through. Other feedback mechanisms can include, among other things, determining the packet loss, instantaneous packet loss, average packet loss, trends in packet loss (whether 5 data packets have been lost in the last 100, which 5 data packets were they—the first five, the last five), instantaneous latency, jitter (changing latency), average latency, instantaneous bandwidth, average bandwidth over a period, and how the bandwidth changes over time. In addition, these feedback mechanisms may be triggered periodically or based on the input received from the other nodes to determine the network associated with the client device 102. For example, OS 110 could pull data from the database periodically or if OS 110 detects a change in latency, OS 110 could sample the network to determine which wireless network that client device 102 is connected to. For the best results, OS 110 can be provided with network data by using all three embodiments of "pushing", "pulling", and sampling the network data.

OS 110 can use the network data to optimize performance for a user of client device 102. There are a number of ways to invoke a specific set of optimization and tuning settings based on the network. These preset tuning settings and configurations can be stored at OS 110 for each set of network characteristics or network types so that OS 110 can provide optimal performance to client device 102. These stored tuning settings may be predetermined and stored in advance for each type of wireless network. For example, when OS 110 detects that client device 102 is using a 2G wireless network, OS 110 can adjust its tuning settings by accessing the stored tuning settings that correspond to the 2G network so that it can provide optimal, efficient optimized response data to client device 102. OS 110 can also take into consideration the characteristics of the wireless network to configure or reconfigure the tuning settings. For example, after OS 110 provides the 2G tuning settings, OS can further adjust its tuning settings by receiving subsequent network data, such as the speed of request/response traffic at the 2G wireless network, and inputting the network data into algorithms that are designed to modify the tuning settings to further optimize performance. Or OS 110, without determining the type of network, adjusts the tunings based on the feedback mechanisms which describe the network's characteristics. Furthermore, OS 110 has the ability to adjust the tuning settings based on the user's preferences, such as the downloading time for a web page is more important to a user than the webpage's appearance or blocking all non-text content when using a small-screen, limited-bandwidth client device.

Because different situations need different optimization algorithms, optimization technology first classifies the type of network being used and the types of data it carries. For instance, low-speed networks benefit mainly from data reduction techniques, whereas high-speed networks benefit mostly from protocol acceleration techniques. OS 110 can determine the right mix of algorithms that are used for each instance. These optimization algorithms can include lossless compression (GZIP, DEFLATE, etc.) per the HTTP RFC, lossy compression of images (GIF, JPEG, PNG, etc.), and the optimization techniques described in "Method and System for Dynamic Interleaving" (U.S. application Ser. No. 10/871, 905), "Method for Delta Compression" (U.S. Application No. 11/439,068), "Method and System for Object Prediction" (U.S. Application No. 11,439,003), and "Method for Multipart Encoding" (U.S. Application No. 11/439,330), all of which are hereby incorporated by reference. Further, OS 110 selects appropriate algorithms at the beginning of each session and modifies them as needed, in real time, as the session progresses.

By vastly reducing the amount of data being transmitted across the network, OS 110 minimizes transfer times and bandwidth needs. It also minimizes the amount of infrastructure required to support higher and richer traffic volumes. To do this, OS 110 incorporates these optimized techniques of format reduction, data compression, and caching. System administrators—as well as end users who are running the user agents—can also select the desired level of optimization. OS 110 incorporates advanced format reduction techniques, restructuring data to achieve optimal compression levels. Format reduction includes techniques that improve the efficiency of HTML, JavaScript, and CSS code prior to individual compression. Both generic and specific techniques can be used to compress data. Regular text may require only generic compression, whereas images, multimedia, and certain document types may require specific compression techniques.

At some point after OS 110 has received network data, client device 102 moves (212) from first zone 120 to second zone 130. Client device 102, which is now located in second zone 130, establishes (214) communications with second wireless network 134 through second WTS 132.

After second wireless network 134 receives the communications, second wireless network 134 routes (216) the request data to gateway 104. Gateway 104 converts the request data into IP based data packets so that network 108 and/or database 106 can process the data accordingly. Gateway 104 can send an authentication request to database 106 for authenticating, as described above in step 204. If the database returns authentication information that the authentication data was valid, gateway 104 connects the user to the rest of the network. Otherwise if the database returns authentication information that the authentication request was invalid, gateway 104 will not connect the user. In this exemplary embodiment, the authentication request is valid.

After gateway 104 has authenticated the user, gateway 104 forwards (218) the data packets to OS 110. As stated above, OS 110 can be provided with network data by using all three embodiments of "pushing", "pulling", and/or sampling the network data. OS 110 can use this network data to adjust its tuning settings based on the characteristics of the second wireless network 134. Once the OS 110 has adjusted its tuning settings, OS 110 can form optimized response data by manipulating any received response data based on the tunings settings that correspond to the second wireless network. The OS 110 can then transmit the optimized response data to the client device 102. As a result, OS 110 can provide a seamless transaction by optimizing the performance of the transmission, which was described above, of optimized response data (e.g. HTTP content data) to client device 102.

Figure 3:
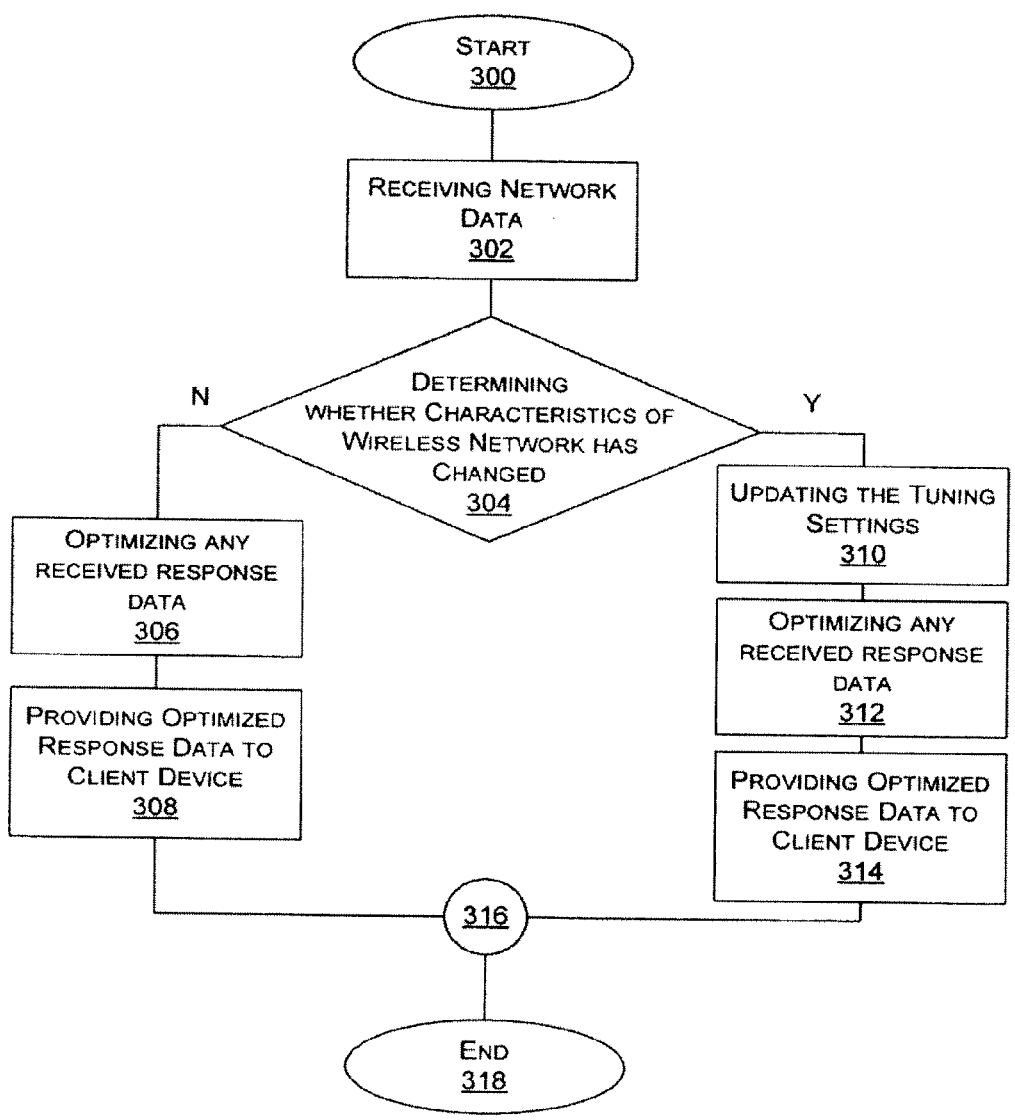
FIG. 3 is a flowchart representing an exemplary method for providing network data updates to the optimization server.

FIG. 3 is a flowchart representing an exemplary method for providing network data updates to the optimization server. It will be readily appreciated by one of ordinary skill in the art that the illustrated procedure can be altered to delete steps or further include additional steps. After initial start step 300, an OS receives (302) network data. As shown above, the OS can receive the network data by "pulling" the network data from a database, by receiving "pushed" network data from a gateway or a database, by sampling the network, or by any combination of the three.

After the OS has received the network data, the OS can determine (304) whether the characteristics of the wireless network has changed based on the received network data. For example, the characteristics can include the network's type, speed, packet loss, instantaneous packet loss, average packet loss, instantaneous latency, jitter, average latency, instantaneous bandwidth, average bandwidth, changes in bandwidth, etc. Further, the characteristics can include the usage patterns of the client device. For example, if the client device is attempting to download more data than the slow wireless link can provide, then it the OS may increase the compression ratio such that the data would get to the client device faster, even though the client is on a "fast" network. If the network has not changed, the OS can optimize (306) any received response data by manipulating the response data based on the current tuning settings. These tuning settings correspond to the current wireless network that provided the network data. The OS can then provide (308) optimized response data to the client device based on maintained tuning settings at the OS and the method can proceed to connector 316.

On the other hand, if the characteristics of the network that the client device is connected to has changed, the OS can update (310) the tuning settings based on the characteristic of the new wireless network, which allows OS to provide optimized communications from one or more web content servers to the client device. Then, the OS can optimize (312) any received response data by manipulating the response data based on the updated tuning settings. The OS can then provide (314) optimized response data to the client device based on the updated tuning settings. In some embodiments, the tuning settings are further updated based on user preferences. The method can proceed to connector 316 and then end (318).

For example, when a client device connects to the Internet and requests to download a web page, the client device has the ability to transmit request data packets through a gateway to the content servers. These data packets may relate to the requested web page and/or the URL associated with the web page. The content server receives these data packets and transmits response data that corresponds to the requested data packets. The OS receives the response data and optimizes the response data based on the tuning settings that correspond to the network characteristics of the wireless network that the client device is connected to. If the network characteristics change based on the movement of the client device or the traffic at the wireless network, the tuning settings can be readjusted.

Figure 4A:
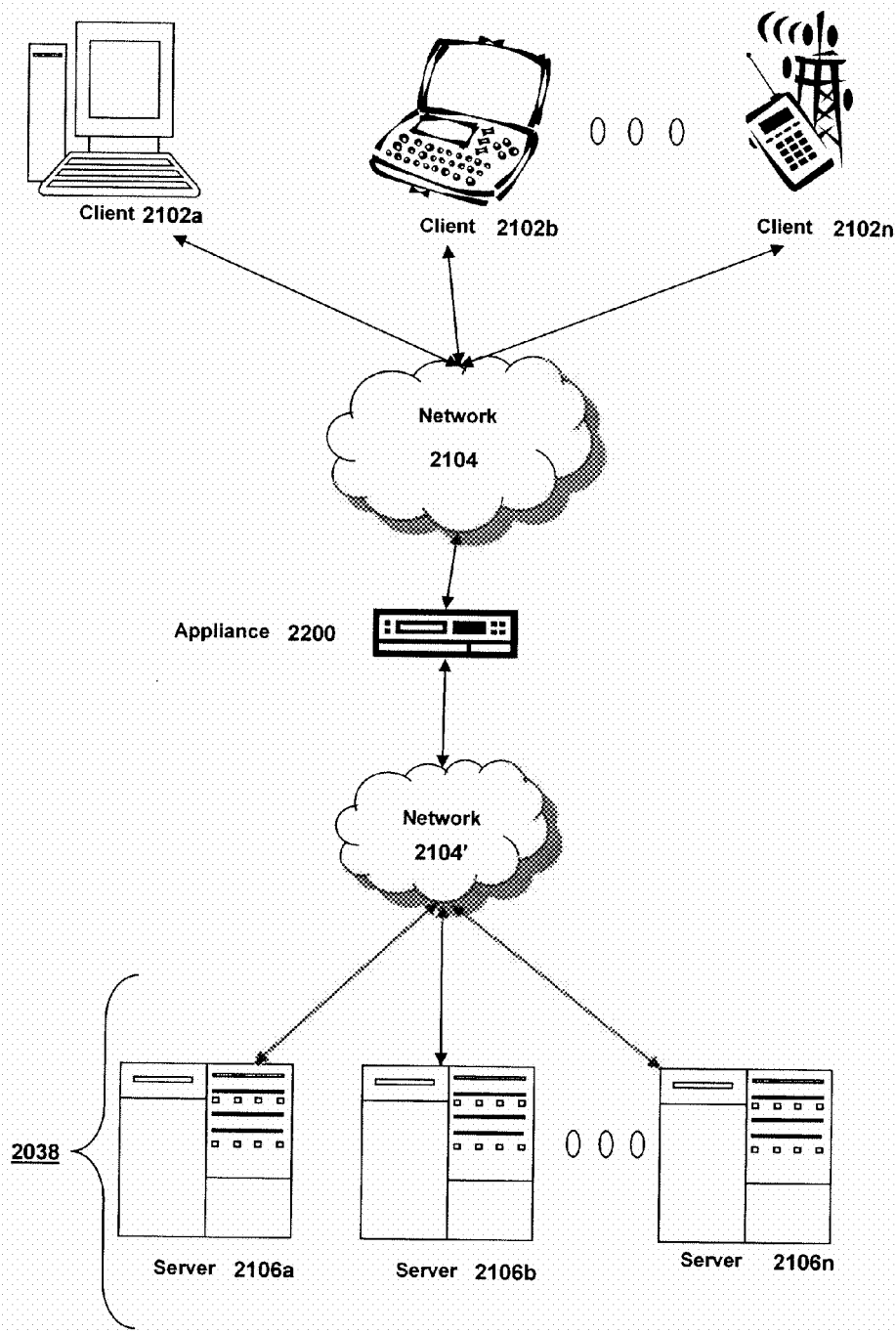
FIG. 4A is a block diagram of an embodiment of a network environment for a client to access a server via an appliance.

Prior to discussing the specifics of embodiments of the systems and methods of an appliance and/or client, it may be helpful to discuss the network and computing environments in which such embodiments may be deployed. Referring now to FIG. 4A, an embodiment of a network environment is depicted. In brief overview, the network environment comprises one or more clients 2102a-2102n (also generally referred to as local machine(s) 2102, or client(s) 2102) in communication with one or more servers 2106a-2106n (also generally referred to as server(s) 2106, or remote machine(s) 2106) via one or more networks 2104, 2104' (generally referred to as network 2104). In some embodiments, a client 2102 communicates with a server 2106 via an appliance 2200.

Although FIG. 4A shows a network 2104 and a network 2104' between the clients 2102 and the servers 2106, the clients 2102 and the servers 2106 may be on the same network 2104. The networks 2104 and 2104' can be the same type of network or different types of networks. The network 2104 and/or the network 2104' can be a local-area network (LAN), such as a company Intranet, a metropolitan area network (MAN), or a wide area network (WAN), such as the Internet or the World Wide Web. In one embodiment, network 2104' may be a private network and network 2104 may be a public network. In some embodiments, network 2104 may be a private network and network 2104' a public network. In another embodiment, networks 2104 and 2104' may both be private networks. In some embodiments, clients 2102 may be located at a branch office of a corporate enterprise communicating via a WAN connection over the network 2104 to the servers 2106 located at a corporate data center.

The network 2104 and/or 2104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 2104 may comprise a wireless link, such as an infrared channel or satellite band. The topology of the network 2104 and/or 2104' may be a bus, star, or ring network topology. The network 2104 and/or 2104' and network topology may be of any such network or network topology as known to those ordinarily skilled in the art capable of supporting the operations described herein.

As shown in FIG. 4A, the appliance 2200, which also may be referred to as an interface unit 2200 or gateway 2200, is shown between the networks 2104 and 2104'. In some embodiments, the appliance 2200 may be located on network 2104. For example, a branch office of a corporate enterprise may deploy an appliance 2200 at the branch office. In other embodiments, the appliance 2200 may be located on network 2104'. For example, an appliance 2200 may be located at a corporate data center. In yet another embodiment, a plurality of appliances 2200 may be deployed on network 2104. In some embodiments, a plurality of appliances 2200 may be deployed on network 2104'. In one embodiment, a first appliance 2200 communicates with a second appliance 2200'. In other embodiments, the appliance 2200 could be a part of any client 2102 or server 2106 on the same or different network 2104, 2104' as the client 2102. One or more appliances 2200 may be located at any point in the network or network communications path between a client 2102 and a server 2106.

In one embodiment, the system may include multiple, logically-grouped servers 2106. In these embodiments, the logical group of servers may be referred to as a server farm 2038. In some of these embodiments, the serves 2106 may be geographically dispersed. In some cases, a farm 2038 may be administered as a single entity. In other embodiments, the server farm 2038 comprises a plurality of server farms 2038. In one embodiment, the server farm executes one or more applications on behalf of one or more clients 2102.

The servers 2106 within each farm 2038 can be heterogeneous. One or more of the servers 2106 can operate according to one type of operating system platform (e.g., WINDOWS NT, manufactured by Microsoft Corp. of Redmond, Wash.), while one or more of the other servers 2106 can operate on according to another type of operating system platform (e.g., Unix or Linux). The servers 2106 of each farm 2038 do not need to be physically proximate to another server 2106 in the same farm 2038. Thus, the group of servers 2106 logically grouped as a farm 2038 may be interconnected using a wide-area network (WAN) connection or medium-area network (MAN) connection. For example, a farm 2038 may include servers 2106 physically located in different continents or different regions of a continent, country, state, city, campus, or room. Data transmission speeds between servers 2106 in the farm 2038 can be increased if the servers 2106 are connected using a local-area network (LAN) connection or some form of direct connection.

Servers 2106 may be referred to as a file server, application server, web server, proxy server, or gateway server. In some embodiments, a server 2106 may have the capacity to function as either an application server or as a master application server. In one embodiment, a server 2106 may include an Active Directory. The clients 2102 may also be referred to as client nodes or endpoints. In some embodiments, a client 2102 has the capacity to function as both a client node seeking access to applications on a server and as an application server providing access to hosted applications for other clients 2102a-2102n.

In some embodiments, a client 2102 communicates with a server 2106. In one embodiment, the client 2102 communicates directly with one of the servers 2106 in a farm 2038. In another embodiment, the client 2102 executes a program neighborhood application to communicate with a server 2106 in a farm 2038. In still another embodiment, the server 2106 provides the functionality of a master node. In some embodiments, the client 2102 communicates with the server 2106 in the farm 2038 through a network 2104. Over the network 2104, the client 2102 can, for example, request execution of various applications hosted by the servers 2106a-2106n in the farm 2038 and receive output of the results of the application execution for display. In some embodiments, only the master node provides the functionality required to identify and provide address information associated with a server 2106' hosting a requested application.

In one embodiment, the server 2106 provides functionality of a web server. In another embodiment, the server 2106a receives requests from the client 2102, forwards the requests to a second server 2106b and responds to the request by the client 2102 with a response to the request from the server 2106b. In still another embodiment, the server 2106 acquires an enumeration of applications available to the client 2102 and address information associated with a server 2106 hosting an application identified by the enumeration of applications. In yet another embodiment, the server 2106 presents the response to the request to the client 2102 using a web interface. In one embodiment, the client 2102 communicates directly with the server 2106 to access the identified application. In another embodiment, the client 2102 receives application output data, such as display data, generated by an execution of the identified application on the server 2106.

Figure 4B:
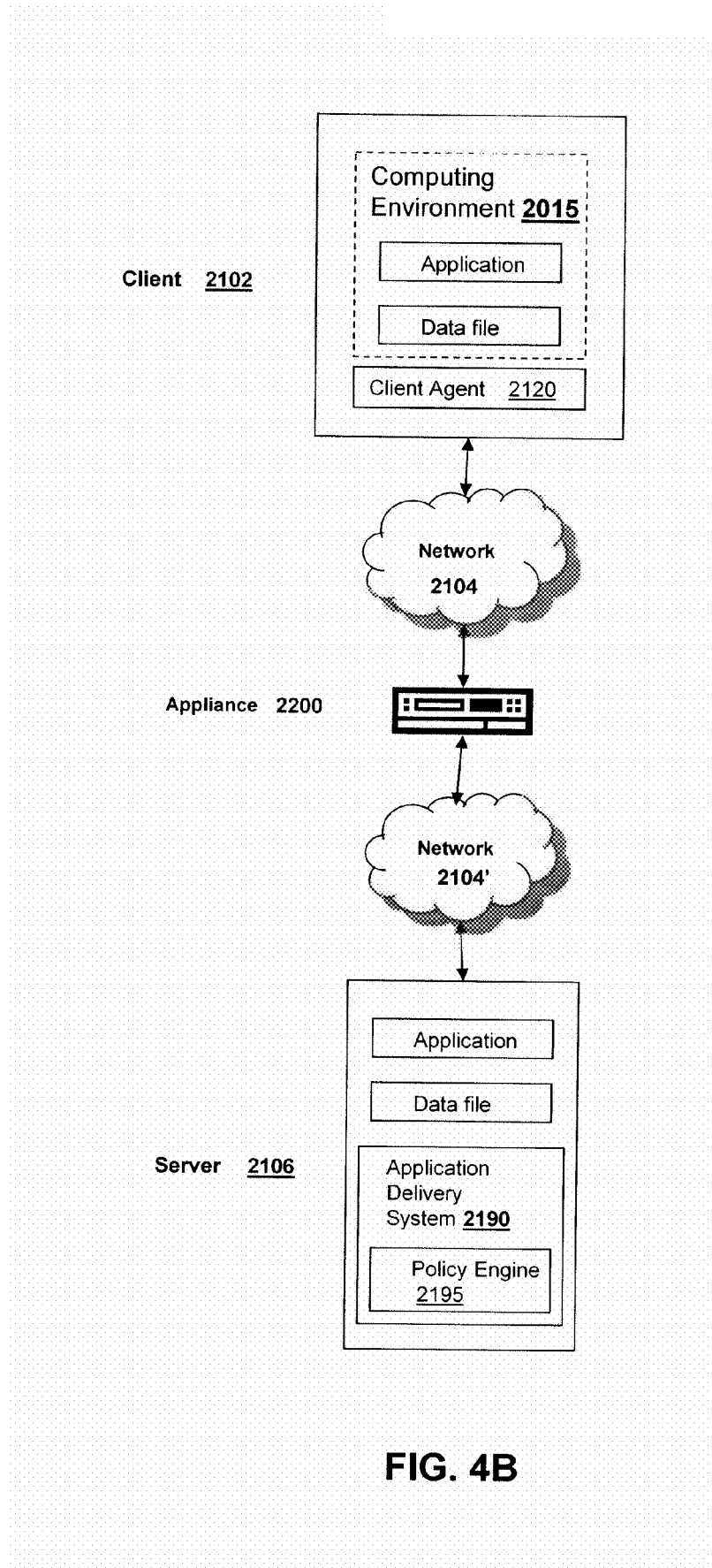
FIG. 4B is a block diagram of an embodiment of an environment for delivering a computing environment from a server to a client via an appliance.

Referring now to FIG. 4B, a network environment for delivering and/or operating a computing environment on a client 2102 is depicted. In some embodiments, a server 2106 includes an application delivery system 2190 for delivering a computing environment or an application and/or data file to one or more clients 2102. In brief overview, a client 10 is in communication with a server 2106 via network 2104, 2104' and appliance 2200. For example, the client 2102 may reside in a remote office of a company, e.g., a branch office, and the server 2106 may reside at a corporate data center. The client 2102 comprises a client agent 2120, and a computing environment 2015. The computing environment 2015 may execute or operate an application that accesses, processes or uses a data file. The computing environment 2015, application and/or data file may be delivered via the appliance 2200 and/or the server 2106.

In some embodiments, the appliance 2200 accelerates delivery of a computing environment 2015, or any portion thereof, to a client 2102. In one embodiment, the appliance 2200 accelerates the delivery of the computing environment 2015 by the application delivery system 2190. For example, the embodiments described herein may be used to accelerate delivery of a streaming application and data file processable by the application from a central corporate data center to a remote user location, such as a branch office of the company. In another embodiment, the appliance 2200 accelerates transport layer traffic between a client 2102 and a server 2106. The appliance 2200 may provide acceleration techniques for accelerating any transport layer payload from a server 2106 to a client 2102, such as: 1) transport layer connection pooling, 2) transport layer connection multiplexing, 3) transport control protocol buffering, 4) compression and 5) caching. In some embodiments, the appliance 2200 provides load balancing of servers 2106 in responding to requests from clients 2102. In other embodiments, the appliance 2200 acts as a proxy or access server to provide access to the one or more servers 2106. In another embodiment, the appliance 2200 provides a secure virtual private network connection from a first network 2104 of the client 2102 to the second network 2104' of the server 2106, such as an SSL VPN connection. It yet other embodiments, the appliance 2200 provides application firewall security, control and management of the connection and communications between a client 2102 and a server 2106.

The appliance 2200 may be or include any implementations of the optimization server 110 or gateway 104 described in connection with at least FIGS. 1-3. The appliance 2200 may perform the functionality of any implementations of the optimization server 110.

In some embodiments, the application delivery management system 2190 provides application delivery techniques to deliver a computing environment to a desktop of a user, remote or otherwise, based on a plurality of execution methods and based on any authentication and authorization policies applied via a policy engine 2195. With these techniques, a remote user may obtain a computing environment and access to server stored applications and data files from any network connected device 2100. In one embodiment, the application delivery system 2190 may reside or execute on a server 2106. In another embodiment, the application delivery system 2190 may reside or execute on a plurality of servers 2106a-2106n. In some embodiments, the application delivery system 2190 may execute in a server farm 2038. In one embodiment, the server 2106 executing the application delivery system 2190 may also store or provide the application and data file. In another embodiment, a first set of one or more servers 2106 may execute the application delivery system 2190, and a different server 2106n may store or provide the application and data file. In some embodiments, each of the application delivery system 2190, the application, and data file may reside or be located on different servers. In yet another embodiment, any portion of the application delivery system 2190 may reside, execute or be stored on or distributed to the appliance 2200, or a plurality of appliances.

The client 2102 may include a computing environment 2015 for executing an application that uses or processes a data file. The client 2102 via networks 2104, 2104' and appliance 2200 may request an application and data file from the server 2106. In one embodiment, the appliance 2200 may forward a request from the client 2102 to the server 2106. For example, the client 2102 may not have the application and data file stored or accessible locally. In response to the request, the application delivery system 2190 and/or server 2106 may deliver the application and data file to the client 2102. For example, in one embodiment, the server 2106 may transmit the application as an application stream to operate in computing environment 2015 on client 2102.

In some embodiments, the application delivery system 2190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In one embodiment, the application delivery system 2190 may deliver one or more applications to clients 2102 or users via a remote-display protocol or otherwise via remote-based or server-based computing. In another embodiment, the application delivery system 2190 may deliver one or more applications to clients or users via steaming of the application.

In one embodiment, the application delivery system 2190 includes a policy engine 2195 for controlling and managing the access to, selection of application execution methods and the delivery of applications. In some embodiments, the policy engine 2195 determines the one or more applications a user or client 2102 may access. In another embodiment, the policy engine 2195 determines how the application should be delivered to the user or client 2102, e.g., the method of execution. In some embodiments, the application delivery system 2190 provides a plurality of delivery techniques from which to select a method of application execution, such as a server-based computing, streaming or delivering the application locally to the client 2120 for local execution.

In one embodiment, a client 2102 requests execution of an application program and the application delivery system 2190 comprising a server 2106 selects a method of executing the application program. In some embodiments, the server 2106 receives credentials from the client 2102. In another embodiment, the server 2106 receives a request for an enumeration of available applications from the client 2102. In one embodiment, in response to the request or receipt of credentials, the application delivery system 2190 enumerates a plurality of application programs available to the client 2102. The application delivery system 2190 receives a request to execute an enumerated application. The application delivery system 2190 selects one of a predetermined number of methods for executing the enumerated application, for example, responsive to a policy of a policy engine. The application delivery system 2190 may select a method of execution of the application enabling the client 2102 to receive application-output data generated by execution of the application program on a server 2106. The application delivery system 2190 may select a method of execution of the application enabling the client 2102 to execute the application program locally after retrieving a plurality of application files comprising the application. In yet another embodiment, the application delivery system 2190 may select a method of execution of the application to stream the application via the network 2104 to the client 2102.

A client 2102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 2102. In some embodiments, the application may be a server-based or a remote-based application executed on behalf of the client 2102 on a server 2106. In one embodiments the server 2106 may display output to the client 2102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio. The client 2102 may be or include any implementations of the client device 102 described at least in connections with FIGS. 1-3.

The server 2106 may be or include any implementations of the servers 114, 115 or 116 and/or gateway 104 described in connection with at least FIGS. 1-3 In some embodiments, the server 2106 or a server farm 2038 may be running one or more applications, such as an application providing a thin-client computing or remote display presentation application. In one embodiment, the server 2106 or server farm 2038 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In one embodiment, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 2106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, Calif., WebEx™ provided by WebEx, Inc. of Santa Clara, Calif., or Microsoft Office Live Meeting provided by Microsoft Corporation of Redmond, Wash.

Figure 4C:
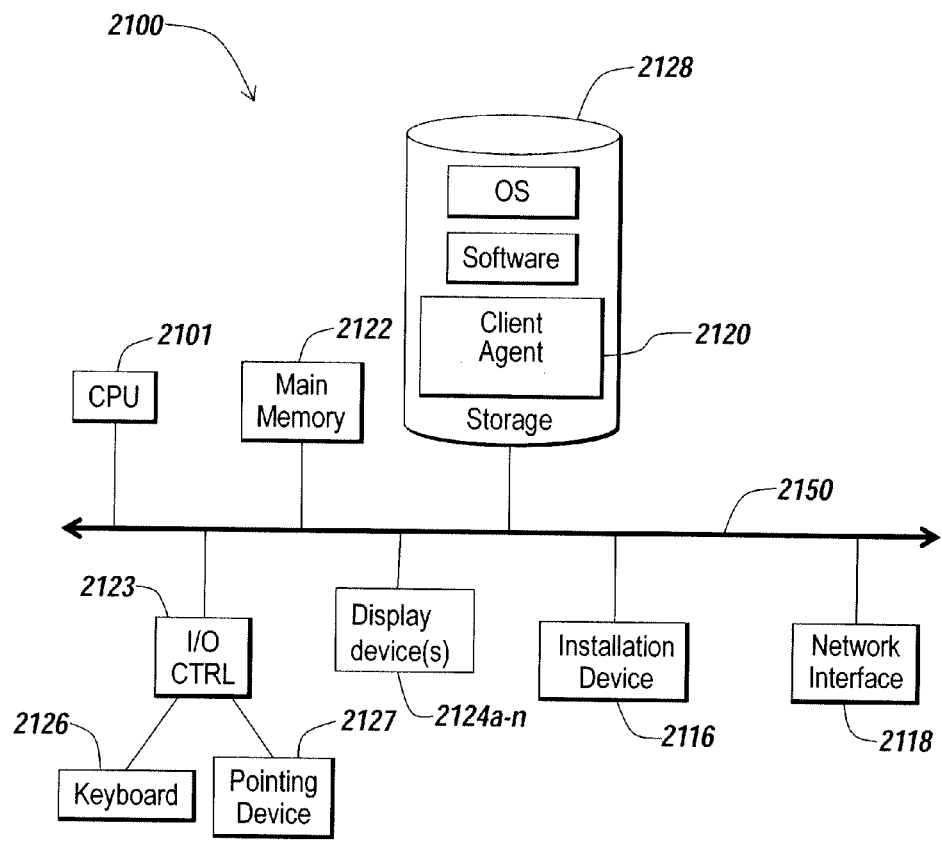
FIGS. 4C and 4D are block diagrams of embodiments of a computing device.
Figure 4D:
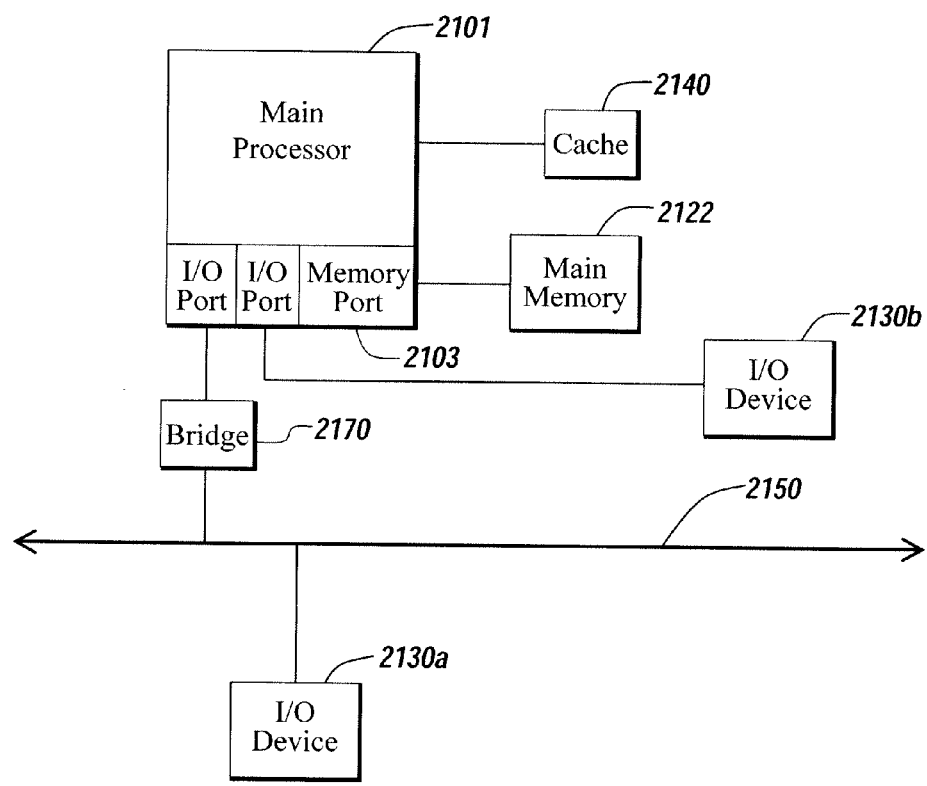

The client 2102, server 2106, and appliance 2200 may be deployed as and/or executed on any type and form of computing device, such as a computer, network device or appliance capable of communicating on any type and form of network and performing the operations described herein. FIGS. 4C and 4D depict block diagrams of a computing device 2100 useful for practicing an embodiment of the client 2102, server 2106 or appliance 2200. As shown in FIGS. 4C and 4D, each computing device 2100 includes a central processing unit 2121, and a main memory unit 2122. As shown in FIG. 4C, a computing device 2100 may include a visual display device 2124, a keyboard 2126 and/or a pointing device 2127, such as a mouse. Each computing device 2100 may also include additional optional elements, such as one or more input/output devices 2130a-2130b (generally referred to using reference numeral 2130), and a cache memory 2140 in communication with the central processing unit 2121.

The central processing unit 2121 is any logic circuitry that responds to and processes instructions fetched from the main memory unit 2122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 2100 may be based on any of these processors, or any other processor capable of operating as described herein.

Main memory unit 2122 may be one or more memory chips capable of storing data and allowing any storage location to be directly accessed by the microprocessor 2121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 2122 may be based on any of the above described memory chips, or any other available memory chips capable of operating as described herein. In the embodiment shown in FIG. 4C, the processor 2121 communicates with main memory 2122 via a system bus 2150 (described in more detail below). FIG. 4C depicts an embodiment of a computing device 2100 in which the processor communicates directly with main memory 2122 via a memory port 2103. For example, in FIG. 4D the main memory 2122 may be DRDRAM.

FIG. 4D depicts an embodiment in which the main processor 2121 communicates directly with cache memory 2140 via a secondary bus, sometimes referred to as a backside bus. In other embodiments, the main processor 2121 communicates with cache memory 2140 using the system bus 2150. Cache memory 2140 typically has a faster response time than main memory 2122 and is typically provided by SRAM, BSRAM, or EDRAM. In the embodiment shown in FIG. 4C, the processor 2121 communicates with various I/O devices 2130 via a local system bus 2150. Various busses may be used to connect the central processing unit 2121 to any of the I/O devices 2130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 2124, the processor 2121 may use an Advanced Graphics Port (AGP) to communicate with the display 2124. FIG. 4D depicts an embodiment of a computer 2100 in which the main processor 2121 communicates directly with I/O device 2130b via HyperTransport, Rapid I/O, or InfiniBand. FIG. 4D also depicts an embodiment in which local busses and direct communication are mixed: the processor 2121 communicates with I/O device 2130a using a local interconnect bus while communicating with I/O device 2130b directly.

The computing device 2100 may support any suitable installation device 2116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 2120, or portion thereof. The computing device 2100 may further comprise a storage device 2128, such as one or more hard disk drives or redundant arrays of independent disks, for storing an operating system and other related software, and for storing application software programs such as any program related to the client agent 2120. Optionally, any of the installation devices 2116 could also be used as the storage device 2128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 2100 may include a network interface 2118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 2118 may comprise a built-in network adapter, network interface card, PCMCIA network card, card bus network adapter, wireless network adapter, USB network adapter, modem or any other device suitable for interfacing the computing device 2100 to any type of network capable of communication and performing the operations described herein.

A wide variety of I/O devices 21106a-21106n may be present in the computing device 2100. Input devices include keyboards, mice, trackpads, trackballs, microphones, and drawing tablets. Output devices include video displays, speakers, inkjet printers, laser printers, and dye-sublimation printers. The I/O devices may be controlled by an I/O controller 2123 as shown in FIG. 4C. The I/O controller may control one or more I/O devices such as a keyboard 2126 and a pointing device 2127, e.g., a mouse or optical pen. Furthermore, an I/O device may also provide storage 2128 and/or an installation medium 2116 for the computing device 2100. In still other embodiments, the computing device 2100 may provide USB connections to receive handheld USB storage devices such as the USB Flash Drive line of devices manufactured by Twintech Industry, Inc. of Los Alamitos, Calif.

In some embodiments, the computing device 2100 may comprise or be connected to multiple display devices 2124a-2124n, which each may be of the same or different type and/or form. As such, any of the I/O devices 2130a-2130n and/or the I/O controller 2123 may comprise any type and/or form of suitable hardware, software, or combination of hardware and software to support, enable or provide for the connection and use of multiple display devices 2124a-2124n by the computing device 2100. For example, the computing device 2100 may include any type and/or form of video adapter, video card, driver, and/or library to interface, communicate, connect or otherwise use the display devices 2124a-2124n. In one embodiment, a video adapter may comprise multiple connectors to interface to multiple display devices 2124a-2124n. In other embodiments, the computing device 2100 may include multiple video adapters, with each video adapter connected to one or more of the display devices 2124a-2124n. In some embodiments, any portion of the operating system of the computing device 2100 may be configured for using multiple displays 2124a-2124n. In other embodiments, one or more of the display devices 2124a-2124n may be provided by one or more other computing devices, such as computing devices 2100a and 2100b connected to the computing device 2100, for example, via a network. These embodiments may include any type of software designed and constructed to use another computer's display device as a second display device 2124a for the computing device 2100. One ordinarily skilled in the art will recognize and appreciate the various ways and embodiments that a computing device 2100 may be configured to have multiple display devices 2124a-2124n.

In further embodiments, an I/O device 2130 may be a bridge 2170 between the system bus 2150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 2100 of the sort depicted in FIGS. 4C and 4D typically operate under the control of operating systems, which control scheduling of tasks and access to system resources. The computing device 2100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 2100 may have different processors, operating systems, and input devices consistent with the device. For example, in one embodiment the computer 2100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 2100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 5A:
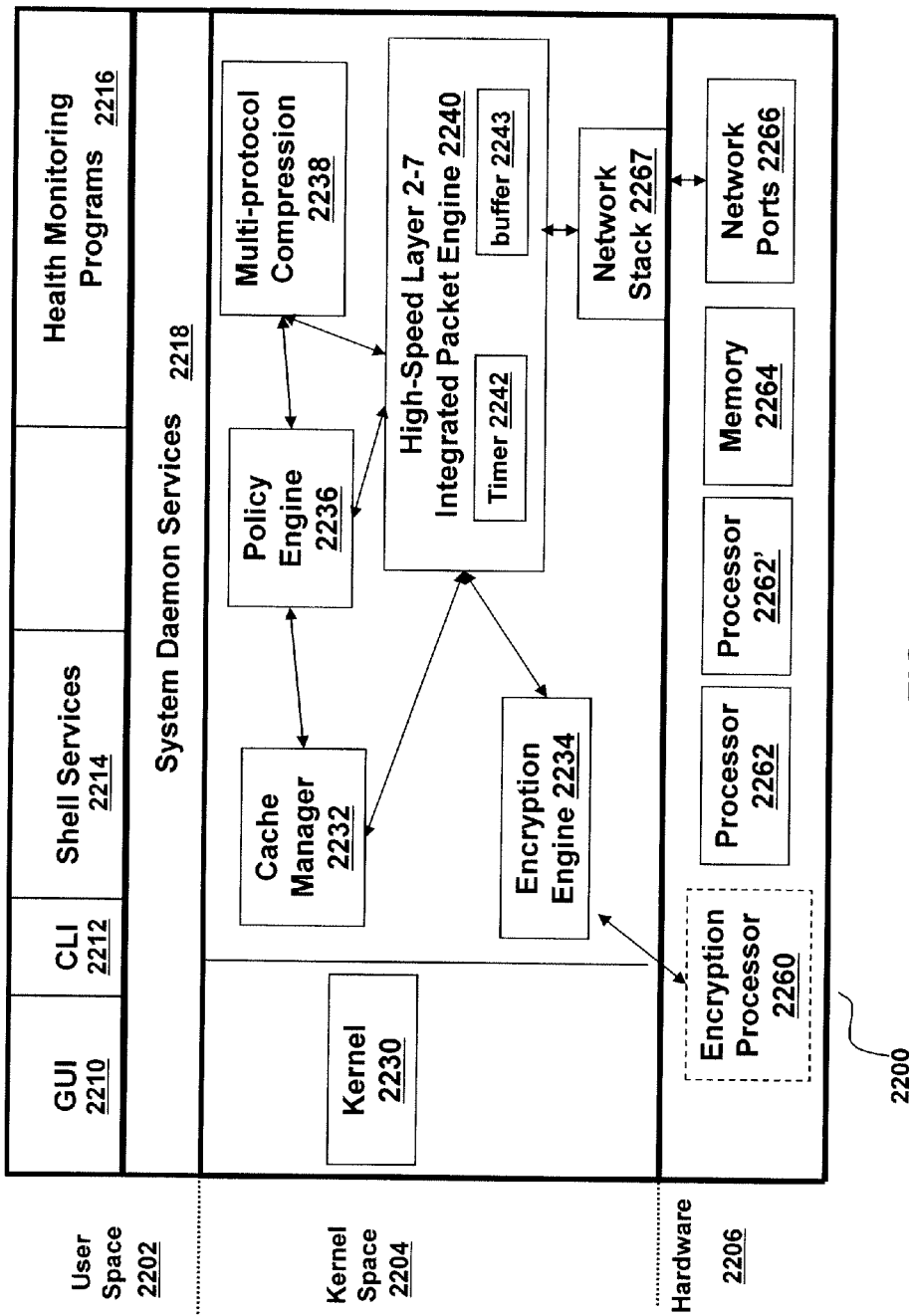
FIG. 5A is a block diagram of an embodiment of an appliance for processing communications between a client and a server.

FIG. 5A is a block diagram depicting one embodiment of an appliance 2200. The architecture of the appliance 2200 in FIG. 5A is provided by way of illustration only and is not intended to be limiting. As shown in FIG. 5A, appliance 2200 comprises a hardware layer 2206 and a software layer divided into a user space 2202 and a kernel space 2204.

Hardware layer 2206 provides the hardware elements upon which programs and services within kernel space 2204 and user space 2202 are executed. Hardware layer 2206 also provides the structures and elements which allow programs and services within kernel space 2204 and user space 2202 to communicate data both internally and externally with respect to appliance 2200. As shown in FIG. 5A, the hardware layer 2206 includes a processing unit 2262 for executing software programs and services, a memory 2264 for storing software and data, network ports 2266 for transmitting and receiving data over a network, and an encryption processor 2260 for performing functions related to Secure Sockets Layer processing of data transmitted and received over the network. In some embodiments, the central processing unit 2262 may perform the functions of the encryption processor 2260 in a single processor. Additionally, the hardware layer 2206 may comprise multiple processors for each of the processing unit 2262 and the encryption processor 2260. The processor 2262 may include any of the processors 2121 described above in connection with FIGS. 4C and 4D. In some embodiments, the central processing unit 2262 may perform the functions of the encryption processor 2260 in a single processor. Additionally, the hardware layer 2206 may comprise multiple processors for each of the processing unit 2262 and the encryption processor 2260. For example, in one embodiment, the appliance 2200 comprises a first processor 2262 and a second processor 2262'. In other embodiments, the processor 2262 or 2262' comprises a multi-core processor.

Although the hardware layer 2206 of appliance 2200 is generally illustrated with an encryption processor 2260, processor 2260 may be a processor for performing functions related to any encryption protocol, such as the Secure Socket Layer (SSL) or Transport Layer Security (TLS) protocol. In some embodiments, the processor 2260 may be a general purpose processor (GPP), and in further embodiments, may be have executable instructions for performing processing of any security related protocol.

Although the hardware layer 2206 of appliance 2200 is illustrated with certain elements in FIG. 5A, the hardware portions or components of appliance 2200 may comprise any type and form of elements, hardware or software, of a computing device, such as the computing device 2100 illustrated and discussed herein in conjunction with FIGS. 4C and 4D. In some embodiments, the appliance 2200 may comprise a server, gateway, router, switch, bridge or other type of computing or network device, and have any hardware and/or software elements associated therewith.

The operating system of appliance 2200 allocates, manages, or otherwise segregates the available system memory into kernel space 2204 and user space 2204. In example software architecture 2200, the operating system may be any type and/or form of Unix operating system although the invention is not so limited. As such, the appliance 2200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 2200 and performing the operations described herein.

The kernel space 2204 is reserved for running the kernel 2230, including any device drivers, kernel extensions or other kernel related software. As known to those skilled in the art, the kernel 2230 is the core of the operating system, and provides access, control, and management of resources and hardware-related elements of the appliance 2200. In accordance with an embodiment of the appliance 2200, the kernel space 2204 also includes a number of network services or processes working in conjunction with a cache manager 2232, sometimes also referred to as the integrated cache, the benefits of which are described in detail further herein. Additionally, the embodiment of the kernel 2230 will depend on the embodiment of the operating system installed, configured, or otherwise used by the device 2200.

In one embodiment, the device 2200 comprises one network stack 2267, such as a TCP/IP based stack, for communicating with the client 2102 and/or the server 2106. In one embodiment, the network stack 2267 is used to communicate with a first network, such as network 2104, and with a second network 2104'. In some embodiments, the appliance 2200 terminates a first transport layer connection, such as a TCP connection of a client 2102, and establishes a second transport layer connection to a server 2106 for use by the client 2102, e.g., the second transport layer connection is terminated at the appliance 2200 and the server 2106. The first and second transport layer connections may be established via a single network stack 2267. In other embodiments, the appliance 2200 may comprise multiple network stacks, for example 2267 and 2267', and the first transport layer connection may be established or terminated at one network stack 2267, and the second transport layer connection on the second network stack 2267'. For example, one network stack may be for receiving and transmitting network packet on a first network, and another network stack for receiving and transmitting network packets on a second network. In one embodiment, the network stack 2267 comprises a buffer 2243 for queuing one or more network packets for transmission by the appliance 2200.

As shown in FIG. 5A, the kernel space 2204 includes the cache manager 2232, a high-speed layer 2-7 integrated packet engine 2240, an encryption engine 2234, a policy engine 2236 and multi-protocol compression logic 2238. Running these components or processes 2232, 2240, 2234, 2236 and 2238 in kernel space 2204 or kernel mode instead of the user space 2202 improves the performance of each of these components, alone and in combination. Kernel operation means that these components or processes 2232, 2240, 2234, 2236 and 2238 run in the core address space of the operating system of the appliance 2200. For example, running the encryption engine 2234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 2232, 2240, 2235, 2236 and 2238 can be performed more efficiently in the kernel space 2204.

In some embodiments, any portion of the components 2232, 2240, 2234, 2236 and 2238 may run or operate in the kernel space 2204, while other portions of these components 2232, 2240, 2234, 2236 and 2238 may run or operate in user space 2202. In one embodiment, the appliance 2200 uses a kernel-level data structure providing access to any portion of one or more network packets, for example, a network packet comprising a request from a client 2102 or a response from a server 2106. In some embodiments, the kernel-level data structure may be obtained by the packet engine 2240 via a transport layer driver interface or filter to the network stack 2267. The kernel-level data structure may comprise any interface and/or data accessible via the kernel space 2204 related to the network stack 2267, network traffic or packets received or transmitted by the network stack 2267. In other embodiments, the kernel-level data structure may be used by any of the components or processes 2232, 2240, 2234, 2236 and 2238 to perform the desired operation of the component or process. In one embodiment, a component 2232, 2240, 2234, 2236 and 2238 is running in kernel mode 2204 when using the kernel-level data structure, while in another embodiment, the component 2232, 2240, 2234, 2236 and 2238 is running in user mode when using the kernel-level data structure. In some embodiments, the kernel-level data structure may be copied or passed to a second kernel-level data structure, or any desired user-level data structure.

The cache manager 2232 may comprise software, hardware or any combination of software and hardware to provide cache access, control and management of any type and form of content, such as objects or dynamically generated objects served by the originating servers 2106. The data, objects or content processed and stored by the cache manager 2232 may comprise data in any format, such as a markup language, or communicated via any protocol. In some embodiments, the cache manager 2232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element nat comprise a data object in memory 2264 of appliance 2200. In other embodiments, the cache memory element may comprise memory having a faster access time than memory 2264. In another embodiment, the cache memory element may comprise any type and form of storage element of the appliance 2200, such as a portion of a hard disk. In some embodiments, the processing unit 2262 may provide cache memory for use by the cache manager 2232. In yet further embodiments, the cache manager 2232 may use any portion and combination of memory, storage, or the processing unit for caching data, objects, and other content.

Furthermore, the cache manager 2232 includes any logic, functions, rules, or operations to perform any embodiments of the techniques of the appliance 2200 described herein. For example, the cache manager 2232 includes logic or functionality to invalidate objects based on the expiration of an invalidation time period or upon receipt of an invalidation command from a client 2102 or server 2106. In some embodiments, the cache manager 2232 may operate as a program, service, process or task executing in the kernel space 2204, and in other embodiments, in the user space 2202. In one embodiment, a first portion of the cache manager 2232 executes in the user space 2202 while a second portion executes in the kernel space 2204. In some embodiments, the cache manager 2232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 2236 may include, for example, an intelligent statistical engine or other programmable application(s). In one embodiment, the policy engine 2236 provides a configuration mechanism to allow a user to identifying, specify, define or configure a caching policy. Policy engine 2236, in some embodiments, also has access to memory to support data structures such as lookup tables or hash tables to enable user-selected caching policy decisions. In other embodiments, the policy engine 2236 may comprise any logic, rules, functions or operations to determine and provide access, control and management of objects, data or content being cached by the appliance 2200 in addition to access, control and management of security, network traffic, network access, compression or any other function or operation performed by the appliance 2200. Further examples of specific caching policies are further described herein.

The encryption engine 2234 comprises any logic, business rules, functions or operations for handling the processing of any security related protocol, such as SSL or TLS, or any function related thereto. For example, the encryption engine 2234 encrypts and decrypts network packets, or any portion thereof, communicated via the appliance 2200. The encryption engine 2234 may also setup or establish SSL or TLS connections on behalf of the client 2102a-2102n, server 2106a-2106n, or appliance 2200. As such, the encryption engine 2234 provides offloading and acceleration of SSL processing. In one embodiment, the encryption engine 2234 uses a tunneling protocol to provide a virtual private network between a client 2102a-2102n and a server 2106a-2106n. In some embodiments, the encryption engine 2234 is in communication with the encryption processor 2260. In other embodiments, the encryption engine 2234 comprises executable instructions running on the encryption processor 2260.

The multi-protocol compression engine 2238 comprises any logic, business rules, function or operations for compressing one or more protocols of a network packet, such as any of the protocols used by the network stack 2267 of the device 2200. In one embodiment, multi-protocol compression engine 2238 compresses bi-directionally between clients 2102a-2102n and servers 2106a-2106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 2238 provides compression of Hypertext Markup Language (HTML) based protocols and in some embodiments, provides compression of any markup languages, such as the Extensible Markup Language (XML). In one embodiment, the multi-protocol compression engine 2238 provides compression of any high-performance protocol, such as any protocol designed for appliance 2200 to appliance 2200 communications. In another embodiment, the multi-protocol compression engine 2238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 2238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 2238 by executing in the kernel mode 2204 and integrating with packet processing engine 2240 accessing the network stack 2267 is able to compress any of the protocols carried by the TCP/IP protocol, such as any application layer protocol.

High speed layer 2-7 integrated packet engine 2240, also generally referred to as a packet processing engine or packet engine, is responsible for managing the kernel-level processing of packets received and transmitted by appliance 2200 via network ports 2266. The high speed layer 2-7 integrated packet engine 2240 may comprise a buffer for queuing one or more network packets during processing, such as for receipt of a network packet or transmission of a network packer. Additionally, the high speed layer 2-7 integrated packet engine 2240 is in communication with one or more network stacks 2267 to send and receive network packets via network ports 2266. The high speed layer 2-7 integrated packet engine 2240 works in conjunction with encryption engine 2234, cache manager 2232, policy engine 2236 and multi-protocol compression logic 2238. In particular, encryption engine 2234 is configured to perform SSL processing of packets, policy engine 2236 is configured to perform functions related to traffic management such as request-level content switching and request-level cache redirection, and multi-protocol compression logic 2238 is configured to perform functions related to compression and decompression of data.

The high speed layer 2-7 integrated packet engine 2240 includes a packet processing timer 2242. In one embodiment, the packet processing timer 2242 provides one or more time intervals to trigger the processing of incoming, i.e., received, or outgoing, i.e., transmitted, network packets. In some embodiments, the high speed layer 2-7 integrated packet engine 2240 processes network packets responsive to the timer 2242. The packet processing timer 2242 provides any type and form of signal to the packet engine 2240 to notify, trigger, or communicate a time related event, interval or occurrence. In many embodiments, the packet processing timer 2242 operates in the order of milliseconds, such as for example 100 ms, 50 ms or 25 ms. For example, in some embodiments, the packet processing timer 2242 provides time intervals or otherwise causes a network packet to be processed by the high speed layer 2-7 integrated packet engine 2240 at a 10 ms time interval, while in other embodiments, at a 5 ms time interval, and still yet in further embodiments, as short as a 3, 2, or 1 ms time interval. The high speed layer 2-7 integrated packet engine 2240 may be interfaced, integrated or in communication with the encryption engine 2234, cache manager 2232, policy engine 2236 and multi-protocol compression engine 2238 during operation. As such, any of the logic, functions, or operations of the encryption engine 2234, cache manager 2232, policy engine 2236 and multi-protocol compression logic 2238 may be performed responsive to the packet processing timer 2242 and/or the packet engine 2240. Therefore, any of the logic, functions, or operations of the encryption engine 2234, cache manager 2232, policy engine 2236 and multi-protocol compression logic 2238 may be performed at the granularity of time intervals provided via the packet processing timer 2242, for example, at a time interval of less than or equal to 10 ms. For example, in one embodiment, the cache manager 2232 may perform invalidation of any cached objects responsive to the high speed layer 2-7 integrated packet engine 2240 and/or the packet processing timer 2242. In another embodiment, the expiry or invalidation time of a cached object can be set to the same order of granularity as the time interval of the packet processing timer 2242, such as at every 10 ms.

In contrast to kernel space 2204, user space 2202 is the memory area or portion of the operating system used by user mode applications or programs otherwise running in user mode. A user mode application may not access kernel space 2204 directly and uses service calls in order to access kernel services. As shown in FIG. 5A, user space 2202 of appliance 2200 includes a graphical user interface (GUI) 2210, a command line interface (CLI) 2212, shell services 2214, health monitoring program 2216, and daemon services 2218. GUI 2210 and CLI 2212 provide a means by which a system administrator or other user can interact with and control the operation of appliance 2200, such as via the operating system of the appliance 2200 and either is user space 2202 or kernel space 2204. The GUI 2210 may be any type and form of graphical user interface and may be presented via text, graphical or otherwise, by any type of program or application, such as a browser. The CLI 2212 may be any type and form of command line or text-based interface, such as a command line provided by the operating system. For example, the CLI 2212 may comprise a shell, which is a tool to enable users to interact with the operating system. In some embodiments, the CLI 2212 may be provided via a bash, csh, tcsh, or ksh type shell. The shell services 2214 comprises the programs, services, tasks, processes or executable instructions to support interaction with the appliance 2200 or operating system by a user via the GUI 2210 and/or CLI 2212.

Health monitoring program 2216 is used to monitor, check, report and ensure that network systems are functioning properly and that users are receiving requested content over a network. Health monitoring program 2216 comprises one or more programs, services, tasks, processes or executable instructions to provide logic, rules, functions or operations for monitoring any activity of the appliance 2200. In some embodiments, the health monitoring program 2216 intercepts and inspects any network traffic passed via the appliance 2200. In other embodiments, the health monitoring program 2216 interfaces by any suitable means and/or mechanisms with one or more of the following: the encryption engine 2234, cache manager 2232, policy engine 2236, multi-protocol compression logic 2238, packet engine 2240, daemon services 2218, and shell services 2214. As such, the health monitoring program 2216 may call any application programming interface (API) to determine a state, status, or health of any portion of the appliance 2200. For example, the health monitoring program 2216 may ping or send a status inquiry on a periodic basis to check if a program, process, service or task is active and currently running. In another example, the health monitoring program 2216 may check any status, error or history logs provided by any program, process, service or task to determine any condition, status or error with any portion of the appliance 2200.

Daemon services 2218 are programs that run continuously or in the background and handle periodic service requests received by appliance 2200. In some embodiments, a daemon service may forward the requests to other programs or processes, such as another daemon service 2218 as appropriate. As known to those skilled in the art, a daemon service 2218 may run unattended to perform continuous or periodic system wide functions, such as network control, or to perform any desired task. In some embodiments, one or more daemon services 2218 run in the user space 2202, while in other embodiments, one or more daemon services 2218 run in the kernel space.

Figure 5B:
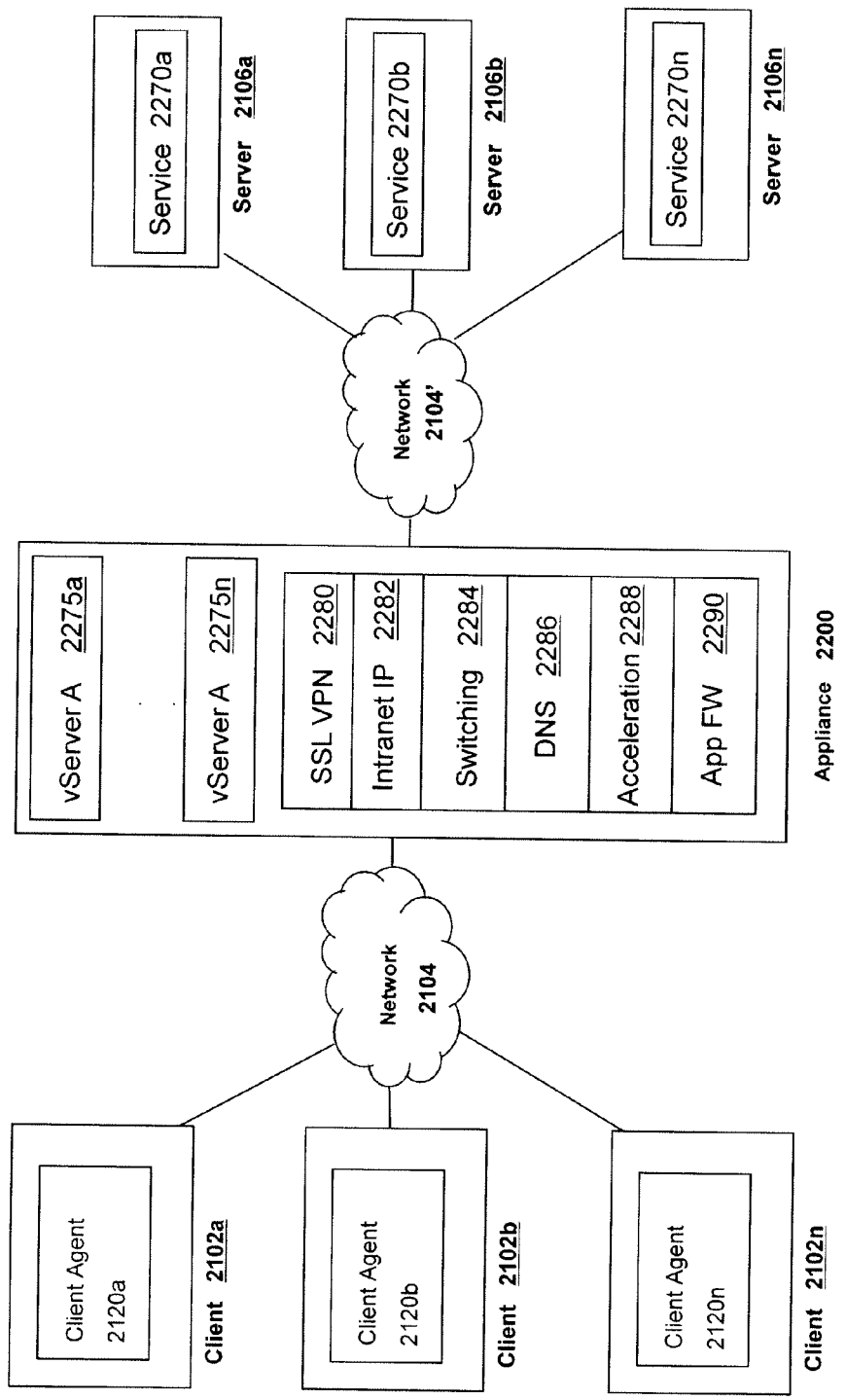
FIG. 5B is a block diagram of another embodiment of an appliance for optimizing, accelerating, load-balancing and routing communications between a client and a server.

Referring now to FIG. 5B, a block diagram depicts another embodiment of the appliance 2200. In brief overview, the appliance 2200 provides one or more of the following services, functionality or operations: SSL VPN connectivity 2280, switching/load balancing 2284, Domain Name Service resolution 2286, acceleration 2288 and an application firewall 2290 for communications between one or more clients 2102 and one or more servers 2106. In one embodiment, the appliance 2200 comprises any of the network devices manufactured by Citrix Systems, Inc. of Ft. Lauderdale Fla., referred to as Citrix NetScaler devices. Each of the servers 2106 may provide one or more network related services $2270a$-$2270n$ (referred to as services 2270). For example, a server 2106 may provide an http service 2270. The appliance 2200 comprises one or more virtual servers or virtual internet protocol servers, referred to as a vServer, VIP server, or just VIP $2275a$-$2275n$ (also referred to herein as vServer 2275). The vServer 2275 receives, intercepts or otherwise processes communications between a client 2102 and a server 2106 in accordance with the configuration and operations of the appliance 2200.

The vServer 2275 may comprise software, hardware or any combination of software and hardware. The vServer 2275 may comprise any type and form of program, service, task, process or executable instructions operating in user mode 2202, kernel mode 2204 or any combination thereof in the appliance 2200. The vServer 2275 includes any logic, functions, rules, or operations to perform any embodiments of the techniques described herein, such as SSL VPN 2280, switching/load balancing 2284, Domain Name Service resolution 2286, acceleration 2288 and an application firewall 2290. In some embodiments, the vServer 2275 establishes a connection to a service 2270 of a server 2106. The service 2275 may comprise any program, application, process, task or set of executable instructions capable of connecting to and communicating to the appliance 2200, client 2102 or vServer 2275. For example, the service 2270 may comprise a web server, http server, ftp, email or database server. In some embodiments, the service 2270 is a daemon process or network driver for listening, receiving and/or sending communications for an application, such as email, database or an enterprise application. In some embodiments, the service 2270 may communicate on a specific IP address, or IP address and port.

In some embodiments, the vServer 2275 applies one or more policies of the policy engine 2236 to network communications between the client 2102 and server 2106. In one embodiment, the policies are associated with a VServer 2275. In another embodiment, the policies are based on a user, or a group of users. In yet another embodiment, a policy is global and applies to one or more vServers $2275a$-$2275n$, and any user or group of users communicating via the appliance 2200.

In some embodiments, the policies of the policy engine have conditions upon which the policy is applied based on any content of the communication, such as internet protocol address, port, protocol type, header or fields in a packet, or the context of the communication, such as user, group of the user, vServer 2275, transport layer connection, and/or identification or attributes of the client 2102 or server 2106.

In other embodiments, the appliance 2200 communicates or interfaces with the policy engine 2236 to determine authentication and/or authorization of a remote user or a remote client 2102 to access the computing environment 2015, application, and/or data file from a server 2106. In another embodiment, the appliance 2200 communicates or interfaces with the policy engine 2236 to determine authentication and/or authorization of a remote user or a remote client 2102 to have the application delivery system 2190 deliver one or more of the computing environment 2015, application, and/or data file. In yet another embodiment, the appliance 2200 establishes a VPN or SSL VPN connection based on the policy engine's 2236 authentication and/or authorization of a remote user or a remote client 2102. In one embodiment, the appliance 2200 controls the flow of network traffic and communication sessions based on policies of the policy engine 2236. For example, the appliance 2200 may control the access to a computing environment 2015, application or data file based on the policy engine 2236.

In some embodiments, the vServer 2275 establishes a transport layer connection, such as a TCP or UDP connection with a client 2102 via the client agent 2120. In one embodiment, the vServer 2275 listens for and receives communications from the client 2102. In other embodiments, the vServer 2275 establishes a transport layer connection, such as a TCP or UDP connection with a server 2106. In one embodiment, the vServer 2275 establishes the transport layer connection to an internet protocol address and port of a server 2270 running on the server 2106. In another embodiment, the vServer 2275 associates a first transport layer connection to a client 2102 with a second transport layer connection to the server 2106. In some embodiments, a vServer 2275 establishes a pool of transport layer connections to a server 2106 and multiplexes client requests via the pooled transport layer connections.

In some embodiments, the appliance 2200 provides an SSL VPN connection 2280 between a client 2102 and a server 2106. For example, a client 2102 on a first network 2104 requests to establish a connection to a server 2106 on a second network 2104'. In some embodiments, the second network 2104' is not routable from the first network 2104. In other embodiments, the client 2102 is on a public network 2104 and the server 2106 is on a private network 2104', such as a corporate network. In one embodiment, the client agent 2120 intercepts communications of the client 2102 on the first network 2104, encrypts the communications, and transmits the communications via a first transport layer connection to the appliance 2200. The appliance 2200 associates the first transport layer connection on the first network 2104 to a second transport layer connection to the server 2106 on the second network 2104. The appliance 2200 receives the intercepted communication from the client agent 2102, decrypts the communications, and transmits the communication to the server 2106 on the second network 2104 via the second transport layer connection. The second transport layer connection may be a pooled transport layer connection. As such, the appliance 2200 provides an end-to-end secure transport layer connection for the client 2102 between the two networks 2104, 2104'.

In one embodiment, the appliance 2200 hosts an intranet internet protocol, or intranetIP, 2282 address of the client 2102 on the virtual private network 2104. The client 2102 has a local network identifier, such as an internet protocol (IP) address and/or host name on the first network 2104. When connected to the second network 2104' via the appliance 2200, the appliance 2200 establishes, assigns or otherwise provides an IntranetIP, which is a network identifier, such as IP address and/or host name, for the client 2102 on the second network 2104'. The appliance 2200 listens for and receives on the second or private network 2104' any communications directed towards the client 2102 using the client's established IntranetIP 2282. In one embodiment, the appliance 2200 acts as or on behalf of the client 2102 on the second private network 2104. For example, in another embodiment, a vServer 2275 listens for and responds to communications to the IntranetIP 2282 of the client 2102. In some embodiments, if a computing device 2100 on the second network 2104' transmits a request, the appliance 2200 processes the request as if it were the client 2102. For example, the appliance 2200 may respond to a ping to the client's IntranetIP 2282. In another example, the appliance may establish a connection, such as a TCP or UDP connection, with computing device 2100 on the second network 2104 requesting a connection with the client's IntranetIP 2282.

In some embodiments, the appliance 2200 provides one or more of the following acceleration techniques 2288 to communications between the client 2102 and server 2106: 1) compression; 2) decompression; 3) Transmission Control Protocol pooling; 4) Transmission Control Protocol multiplexing; 5) Transmission Control Protocol buffering; and 6) caching. In one embodiment, the appliance 2200 relieves servers 2106 of much of the processing load caused by repeatedly opening and closing transport layers connections to clients 2102 by opening one or more transport layer connections with each server 2106 and maintaining these connections to allow repeated data accesses by clients via the Internet. This technique is referred to herein as "connection pooling".

In some embodiments, in order to seamlessly splice communications from a client 2102 to a server 2106 via a pooled transport layer connection, the appliance 2200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 2102), the source network address of the packet is changed to that of an output port of appliance 2200, and the destination network address is changed to that of the intended server. In the case of an outbound packet (that is, one received from a server 2106), the source network address is changed from that of the server 2106 to that of an output port of appliance 2200 and the destination address is changed from that of appliance 2200 to that of the requesting client 2102. The sequence numbers and acknowledgment numbers of the packet are also translated to sequence numbers and acknowledgement expected by the client 2102 on the appliance's 2200 transport layer connection to the client 2102. In some embodiments, the packet checksum of the transport layer protocol is recalculated to account for these translations.

In another embodiment, the appliance 2200 provides switching or load-balancing functionality 2284 for communications between the client 2102 and server 2106. In some embodiments, the appliance 2200 distributes traffic and directs client requests to a server 2106 based on layer 4 or application-layer request data. In one embodiment, although the network layer or layer 2 of the network packet identifies a destination server 2106, the appliance 2200 determines the server 2106 to distribute the network packet by application information and data carried as payload of the transport layer packet. In one embodiment, the health monitoring programs 2216 of the appliance 2200 monitor the health of servers to determine the server 2106 for which to distribute a client's request. In some embodiments, if the appliance 2200 detects a server 2106 is not available or has a load over a predetermined threshold, the appliance 2200 can direct or distribute client requests to another server 2106.

In some embodiments, the appliance 2200 acts as a Domain Name Service (DNS) resolver or otherwise provides resolution of a DNS request from clients 2102. In some embodiments, the appliance intercepts' a DNS request transmitted by the client 2102. In one embodiment, the appliance 2200 responds to a client's DNS request with an IP address of or hosted by the appliance 2200. In this embodiment, the client 2102 transmits network communication for the domain name to the appliance 2200. In another embodiment, the appliance 2200 responds to a client's DNS request with an IP address of or hosted by a second appliance 2200'. In some embodiments, the appliance 2200 responds to a client's DNS request with an IP address of a server 2106 determined by the appliance 2200.

In yet another embodiment, the appliance 2200 provides application firewall functionality 2290 for communications between the client 2102 and server 2106. In one embodiment, the policy engine 2236 provides rules for detecting and blocking illegitimate requests. In some embodiments, the application firewall 2290 protects against denial of service (DoS) attacks. In other embodiments, the appliance inspects the content of intercepted requests to identify and block application-based attacks. In some embodiments, the rules/policy engine 2236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 2290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 2290 ensures cookies are not modified. In other embodiments, the application firewall 2290 protects against forceful browsing by enforcing legal URLs.

In still yet other embodiments, the application firewall 2290 protects any confidential information contained in the network communication. The application firewall 2290 may inspect or analyze any network communication in accordance with the rules or polices of the engine 2236 to identify any confidential information in any field of the network packet. In some embodiments, the application firewall 2290 identifies in the network communication one or more occurrences of a credit card number, password, social security number, name, patient code, contact information, and age. The encoded portion of the network communication may comprise these occurrences or the confidential information. Based on these occurrences, in one embodiment, the application firewall 2290 may take a policy action on the network communication, such as prevent transmission of the network communication. In another embodiment, the application firewall 2290 may rewrite, remove or otherwise mask such identified occurrence or confidential information.

Figure 6:
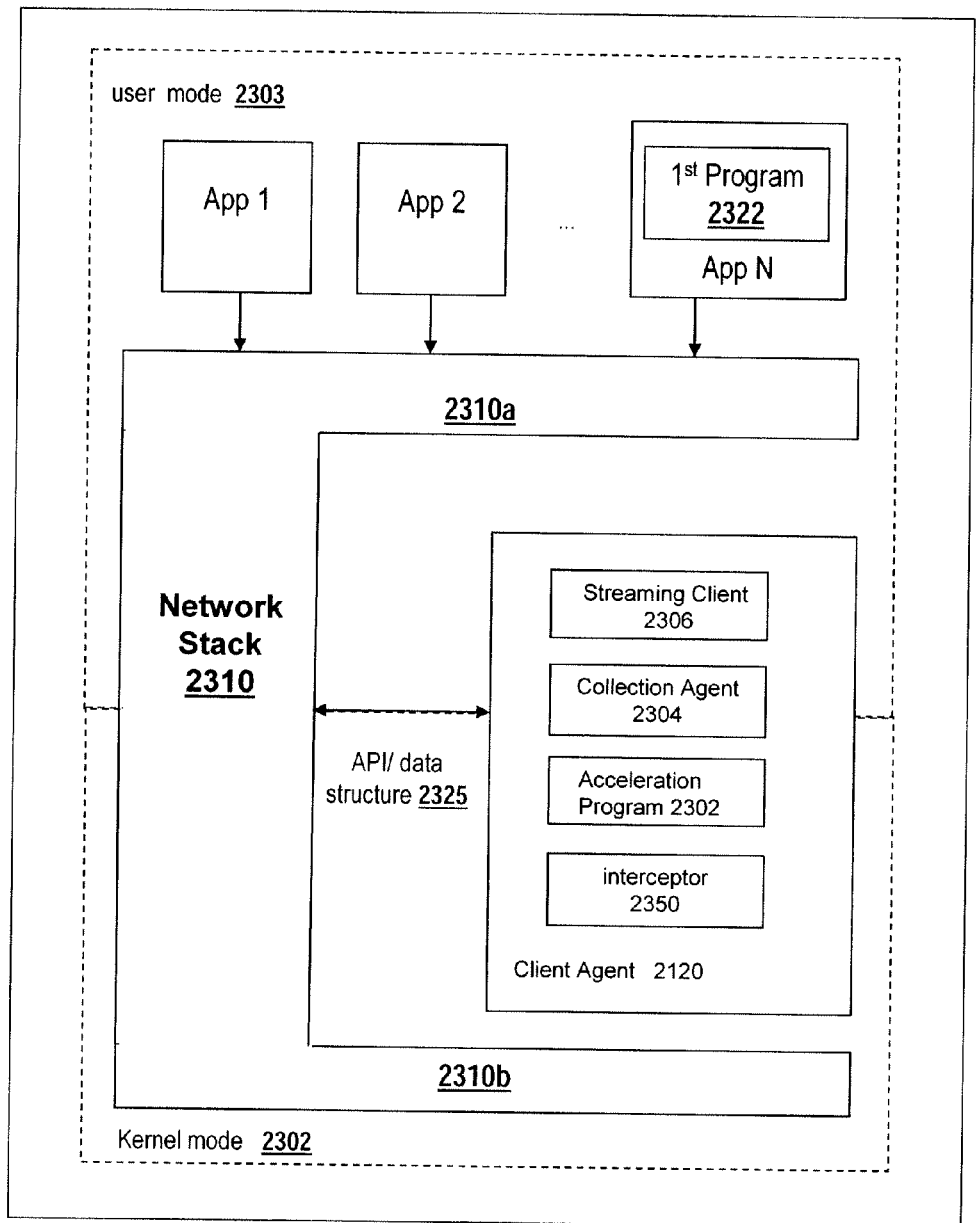
FIG. 6 is a block diagram of an embodiment of a client for communicating with a server via the appliance.

Referring now to FIG. 6, an embodiment of the client agent 2120 is depicted. The client 2102 includes a client agent 2120 for establishing and exchanging communications with the appliance 2200 and/or server 2106 via a network 2104. In brief overview, the client 2102 operates on computing device 2100 having an operating system with a kernel mode 2302 and a user mode 2303, and a network stack 2310 with one or more layers 2310*a*-2310*b*. The client 2102 may have installed and/or execute one or more applications. In some embodiments, one or more applications may communicate via the network stack 2310 to a network 2104. One of the applications, such as a web browser, may also include a first program 2322. For example, the first program 2322 may be used in some embodiments to install and/or execute the client agent 2120, or any portion thereof. The client agent 2120 includes an interception mechanism, or interceptor 2350, for intercepting network communications from the network stack 2310 from the one or more applications.

The network stack 2310 of the client 2102 may comprise any type and form of software, or hardware, or any combinations thereof, for providing connectivity to and communications with a network. In one embodiment, the network stack 2310 comprises a software implementation for a network protocol suite. The network stack 2310 may comprise one or more network layers, such as any networks layers of the Open Systems Interconnection (OSI) communications model as those skilled in the art recognize and appreciate. As such, the network stack 2310 may comprise any type and form of protocols for any of the following layers of the OSI model: 1) physical link layer, 2) data link layer, 3) network layer, 4) transport layer, 5) session layer, 6) presentation layer, and 7) application layer. In one embodiment, the network stack 2310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 2310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 2310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 2310, such as for voice communications or real-time data communications.

Furthermore, the network stack 2310 may include one or more network drivers supporting the one or more layers, such as a TCP driver or a network layer driver. The network drivers may be included as part of the operating system of the computing device 2100 or as part of any network interface cards or other network access components of the computing device 2100. In some embodiments, any of the network drivers of the network stack 2310 may be customized, modified or adapted to provide a custom or modified portion of the network stack 2310 in support of any of the techniques described herein. In other embodiments, the acceleration program 2120 is designed and constructed to operate with or work in conjunction with the network stack 2310 installed or otherwise provided by the operating system of the client 2102.

The network stack 2310 comprises any type and form of interfaces for receiving, obtaining, providing or otherwise accessing any information and data related to network communications of the client 2102. In one embodiment, an interface to the network stack 2310 comprises an application programming interface (API). The interface may also comprise any function call, hooking or filtering mechanism, event or call back mechanism, or any type of interfacing technique. The network stack 2310 via the interface may receive or provide any type and form of data structure, such as an object, related to functionality or operation of the network stack 2310. For example, the data structure may comprise information and data related to a network packet or one or more network packets. In some embodiments, the data structure comprises a portion of the network packet processed at a protocol layer of the network stack 2310, such as a network packet of the transport layer. In some embodiments, the data structure 2325 comprises a kernel-level data structure, while in other embodiments, the data structure 2325 comprises a user-mode data structure. A kernel-level data structure may comprise a data structure obtained or related to a portion of the network stack 2310 operating in kernel-mode 2302, or a network driver or other software running in kernel-mode 2302, or any data structure obtained or received by a service, process, task, thread or other executable instructions running or operating in kernel-mode of the operating system.

Additionally, some portions of the network stack 2310 may execute or operate in kernel-mode 2302, for example, the data link or network layer, while other portions execute or operate in user-mode 2303, such as an application layer of the network stack 2310. For example, a first portion 2310a of the network stack may provide user-mode access to the network stack 2310 to an application while a second portion 2310a of the network stack 2310 provides access to a network. In some embodiments, a first portion 2310a of the network stack may comprise one or more upper layers of the network stack 2310, such as any of layers 5-7. In other embodiments, a second portion 2310b of the network stack 2310 comprises one or more lower layers, such as any of layers 1-4. Each of the first portion 2310a and second portion 2310b of the network stack 2310 may comprise any portion of the network stack 2310, at any one or more network layers, in user-mode 2203, kernel-mode, 2202, or combinations thereof, or at any portion of a network layer or interface point to a network layer or any portion of or interface point to the user-mode 2203 and kernel-mode 2203.

The interceptor 2350 may comprise software, hardware, or any combination of software and hardware. In one embodiment, the interceptor 2350 intercept a network communication at any point in the network stack 2310, and redirects or transmits the network communication to a destination desired, managed or controlled by the interceptor 2350 or client agent 2120. For example, the interceptor 2350 may intercept a network communication of a network stack 2310 of a first network and transmit the network communication to the appliance 2200 for transmission on a second network 2104. In some embodiments, the interceptor 2350 comprises any type interceptor 2350 comprises a driver, such as a network driver constructed and designed to interface and work with the network stack 2310. In some embodiments, the client agent 2120 and/or interceptor 2350 operates at one or more layers of the network stack 2310, such as at the transport layer. In one embodiment, the interceptor 2350 comprises a filter driver, hooking mechanism, or any form and type of suitable network driver interface that interfaces to the transport layer of the network stack, such as via the transport driver interface (TDI). In some embodiments, the interceptor 2350 interfaces to a first protocol layer, such as the transport layer and another protocol layer, such as any layer above the transport protocol layer, for example, an application protocol layer. In one embodiment, the interceptor 2350 may comprise a driver complying with the Network Driver Interface Specification (NDIS), or a NDIS driver. In another embodiment, the interceptor 2350 may comprise a mini-filter or a mini-port driver. In one embodiment, the interceptor 2350, or portion thereof, operates in kernel-mode 2202. In another embodiment, the interceptor 2350, or portion thereof, operates in user-mode 2203. In some embodiments, a portion of the interceptor 2350 operates in kernel-mode 2202 while another portion of the interceptor 2350 operates in user-mode 2203. In other embodiments, the client agent 2120 operates in user-mode 2203 but interfaces via the interceptor 2350 to a kernel-mode driver, process, service, task or portion of the operating system, such as to obtain a kernel-level data structure 2225. In further embodiments, the interceptor 2350 is a user-mode application or program, such as application.

In one embodiment, the interceptor 2350 intercepts any transport layer connection requests. In these embodiments, the interceptor 2350 execute transport layer application programming interface (API) calls to set the destination information, such as destination IP address and/or port to a desired location for the location. In this manner, the interceptor 2350 intercepts and redirects the transport layer connection to a IP address and port controlled or managed by the interceptor 2350 or client agent 2120. In one embodiment, the interceptor 2350 sets the destination information for the connection to a local IP address and port of the client 2102 on which the client agent 2120 is listening. For example, the client agent 2120 may comprise a proxy service listening on a local IP address and port for redirected transport layer communications. In some embodiments, the client agent 2120 then communicates the redirected transport layer communication to the appliance 2200.

In some embodiments, the interceptor 2350 intercepts a Domain Name Service (DNS) request. In one embodiment, the client agent 2120 and/or interceptor 2350 resolves the DNS request. In another embodiment, the interceptor transmits the intercepted DNS request to the appliance 2200 for DNS resolution. In one embodiment, the appliance 2200 resolves the DNS request and communicates the DNS response to the client agent 2120. In some embodiments, the appliance 2200 resolves the DNS request via another appliance 2200' or a DNS server 2106.

In yet another embodiment, the client agent 2120 may comprise two agents 2120 and 2120'. In one embodiment, a first agent 2120 may comprise an interceptor 2350 operating at the network layer of the network stack 2310. In some embodiments, the first agent 2120 intercepts network layer requests such as Internet Control Message Protocol (ICMP) requests (e.g., ping and traceroute). In other embodiments, the second agent 2120' may operate at the transport layer and intercept transport layer communications. In some embodiments, the first agent 2120 intercepts communications at one layer of the network stack 2210 and interfaces with or communicates the intercepted communication to the second agent 2120'.

The client agent 2120 and/or interceptor 2350 may operate at or interface with a protocol layer in a manner transparent to any other protocol layer of the network stack 2310. For example, in one embodiment, the interceptor 2350 operates or interfaces with the transport layer of the network stack 2310 transparently to any protocol layer below the transport layer, such as the network layer, and any protocol layer above the transport layer, such as the session, presentation or application layer protocols. This allows the other protocol layers of the network stack 2310 to operate as desired and without modification for using the interceptor 2350. As such, the client agent 2120 and/or interceptor 2350 can interface with the transport layer to secure, optimize, accelerate, route or load-balance any communications provided via any protocol carried by the transport layer, such as any application layer protocol over TCP/IP.

Furthermore, the client agent 2120 and/or interceptor may operate at or interface with the network stack 2310 in a manner transparent to any application, a user of the client 2102, and any other computing device, such as a server, in communications with the client 2102. The client agent 2120 and/or interceptor 2350 may be installed and/or executed on the client 2102 in a manner without modification of an application. In some embodiments, the user of the client 2102 or a computing device in communications with the client 2102 are not aware of the existence, execution or operation of the client agent 2120 and/or interceptor 2350. As such, in some embodiments, the client agent 2120 and/or interceptor 2350 is installed, executed, and/or operated transparently to an application, user of the client 2102, another computing device, such as a server, or any of the protocol layers above and/or below the protocol layer interfaced to by the interceptor 2350.

The client agent 2120 includes an acceleration program 2302, a streaming client 2306, and/or a collection agent 2304. In one embodiment, the client agent 2120 comprises an Independent Computing Architecture (ICA) client, or any portion thereof, developed by Citrix Systems, Inc. of Fort Lauderdale, Fla., and is also referred to as an ICA client. Other embodiments of the application client include a Remote Display Protocol (RDP) client, developed by Microsoft Corporation of Redmond, Wash., an X-Windows client, a client-side player, interpreter or simulator capable of executing multimedia applications, email, Java, or .NET code. Moreover, in one embodiment the output of an application executing on the server 2106 can be displayed at the client 2102 via the ICA client.

In some embodiments, the client 2120 comprises an application streaming client 2306 for streaming an application from a server 2106 to a client 2102. In some embodiments, the client agent 2120 comprises an acceleration program 2302 for accelerating communications between client 2102 and server 2106. In another embodiment, the client agent 2120 includes a collection agent 2304 for performing end-point detection/scanning and collecting end-point information for the appliance 2200 and/or server 2106.

In some embodiments, the acceleration program 2302 comprises a client-side acceleration program for performing one or more acceleration techniques to accelerate, enhance or otherwise improve a client's communications with and/or access to a server 2106, such as accessing an application provided by a server 2106. The logic, functions, and/or operations of the executable instructions of the acceleration program 2302 may perform one or more of the following acceleration techniques: 1) multi-protocol compression, 2) transport control protocol pooling, 3) transport control protocol multiplexing, 4) transport control protocol buffering, and 5) caching via a cache manager Additionally, the acceleration program 2302 may perform encryption and/or decryption of any communications received and/or transmitted by the client 2102. In some embodiments, the acceleration program 2302 performs one or more of the acceleration techniques in an integrated manner or fashion. Additionally, the acceleration program 2302 can perform compression on any of the protocols, or multiple-protocols, carried as payload of network packet of the transport layer protocol The streaming client 2306 comprises an application, program, process, service, task or executable instructions for receiving and executing a streamed application from a server 2106. A server 2106 may stream one or more application data files to the streaming client 2306 for playing, executing or otherwise causing to be executed the application on the client 2102. In some embodiments, the server 2106 transmits a set of compressed or packaged application data files to the streaming client 2306. In some embodiments, the plurality of application files are compressed and stored on a file server within an archive file such as a CAB, ZIP, SIT, TAR, JAR or other archive. In one embodiment, the server 2106 decompresses, unpackages or unarchives the application files and transmits the files to the client 2102. In another embodiment, the client 2102 decompresses, unpackages or unarchives the application files. The streaming client 2306 dynamically installs the application, or portion thereof, and executes the application. In one embodiment, the streaming client 2306 may be an executable program. In some embodiments, the streaming client 2306 may be able to launch another executable program.

The collection agent 2304 comprises an application, program, process, service, task or executable instructions for identifying, obtaining and/or collecting information about the client 2102. In some embodiments, the appliance 2200 transmits the collection agent 2304 to the client 2102 or client agent 2120. The collection agent 2304 may be configured according to one or more policies of the policy engine 2236 of the appliance. In other embodiments, the collection agent 2304 transmits collected information on the client 2102 to the appliance 2200. In one embodiment, the policy engine 2236 of the appliance 2200 uses the collected information to determine and provide access, authentication and authorization control of the client's connection to a network 2104.

In one embodiment, the collection agent 2304 comprises an end-point detection and scanning mechanism, which identifies and determines one or more attributes or characteristics of the client. For example, the collection agent 2304 may identify and determine any one or more of the following client-side attributes: 1) the operating system an/or a version of an operating system, 2) a service pack of the operating system, 3) a running service, 4) a running process, and 5) a file. The collection agent 2304 may also identify and determine the presence or versions of any one or more of the following on the client: 1) antivirus software, 2) personal firewall software, 3) anti-spam software, and 4) internet security software. The policy engine 2236 may have one or more policies based on any one or more of the attributes or characteristics of the client or client-side attributes.

In some embodiments and still referring to FIG. 6, a first program 2322 may be used to install and/or execute the client agent 2120, or portion thereof, such as the interceptor 2350, automatically, silently, transparently, or otherwise. In one embodiment, the first program 2322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 2322 comprises a set of executable instructions loaded into and run by the application, such as a browser. In one embodiment, the first program 2322 comprises a designed and constructed program to install the client agent 2120. In some embodiments, the first program 2322 obtains, downloads, or receives the client agent 2120 via the network from another computing device. In another embodiment, the first program 2322 is an installer program or a plug and play manager for installing programs, such as network drivers, on the operating system of the client 2102.

Communication between a program neighborhood-enabled client 2102 and a server 2106 or appliance 2200 may occur over a dedicated virtual channel that is established on top of an ICA virtual channel. In some embodiments, the communication occurs using an XML service. In other embodiments, the client 2102 runs a client-side dialog that acquires the credentials of a user of the client 2102. In still other embodiments, a user management subsystem on a server 2106 receiving the credentials of the user may return a set of distinguished names representing the list of accounts to which the user belongs. Upon authentication, the server 2106 may establish a program neighborhood virtual channel, a control channel, or other communications channel. In yet other embodiments, an acceleration program 2302 may also be transmitted to the client 2102 in response to a client 2102 request.

In some embodiments, a client 2102 may use the client agent 2120 to browse farm 2038, servers 2106 and applications in the farm 2038. In one embodiment, each server 2106 includes an ICA browsing subsystem to provide the client 2102 with browsing capability. After the client 2102 establishes a connection with the ICA browser subsystem of any of the servers 2106, that browser subsystem supports a variety of client 2102 requests. Such requests include: (1) enumerating names of servers in the farm, (2) enumerating names of applications published in the farm, (3) resolving a server name and/or application name to a server address that is useful to the client 2102. The ICA browser subsystem also supports requests made by clients 2102 running a program neighborhood application that provides the client 2102, upon request, with a view of those applications within the farm 2038 for which the user is authorized. The ICA browser subsystem forwards all of the above-mentioned client requests to the appropriate subsystem in the server 2106.

In one embodiment, a user of the client 2102 selects an application for execution from a received enumeration of available applications. In another embodiment, the user selects an application for execution independent of the received enumeration. In some embodiments, the user selects an application for execution by selecting a graphical representation of the application presented on the client 2102 by a client agent 2120. In other embodiments, the user selects an application for execution by selecting a graphical representation of the application presented to the user on a web server or other server 2106. In some embodiments, an appliance 2200 or acceleration program 2302 accelerates delivery of the graphical representation. In some embodiments, an appliance 2200 caches or stores the graphical representation. In some embodiments an appliance 2200 may cache or store any and all of the associated applications or portions of the associated applications.

In some embodiments, when a client 2102 connects to the network 2104, the user of the client 2102 provides user credentials. User credentials may include the username of a user of the client 2102, the password of the user, and the domain name for which the user is authorized. Alternatively, the user credentials may be obtained from smart cards, time-based tokens, social security numbers, user passwords, personal identification (PIN) numbers, digital certificates based on symmetric key or elliptic curve cryptography, biometric characteristics of the user, or any other means by which the identification of the user of the client 2102 can be obtained and submitted for authentication. The server 2106 or appliance 2200 responding to the client 2102 can authenticate the user based on the user credentials.

In some embodiments, the client 2102 provides credentials upon making a request for execution of an application to a server 2106, directly or through an appliance 2200. In one of these embodiments, the client 2102 requests access to an application residing on a server 2106. In another of these embodiments, the client 2102 requests access to a network on which a desired resource resides. In other embodiments, the client 2102 provides credentials upon making a request for a connection to an appliance 2200. In one of these embodiments, the client 2102 requests access to a virtual private network. In another of these embodiments, the client 2102 requests a network address on the virtual private network. In still another of these embodiments, the client 2102 initiates a connection to the appliance 2200.

In some embodiments, the user provides credentials to the server 2106 or appliance 2200 via a graphical user interface presented to the client 2102 by the server 2106 or appliance 2200. In other embodiments, a server 2106 or appliance 2200 having the functionality of a web server provides the graphical user interface to the client 2102. In still other embodiments, a collection agent transmitted to the client 2102 by the server 2106 or appliance 2200 gathers the credentials from the client 2102.

In one embodiment, a credential refers to a username and password. In another embodiment, a credential is not limited to a username and password but includes, without limitation, a machine ID of the client 2102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 2106 or appliance 2200, date or time of access request including adjustments for varying time zones, and authorization credentials.

In some embodiments, a credential associated with a client 2102 is associated with a user of the client 2102. In one of these embodiments, the credential is information possessed by the user. In another of these embodiments, the credential is user authentication information. In other embodiments, a credential associated with a client is associated with a network. In one of these embodiments, the credential is information associated with a network to which the client may connect. In another of these embodiments, the credential is information associated with a network collecting information about the client. In still other embodiments, a credential associated with a client is a characteristic of the client.

In some embodiments, the user authentication performed by the server 2106 or appliance 2200 may suffice to authorize the use of each hosted application program presented to the client 2102, although such applications may reside at another server 2106'. Accordingly, when the client 2102 launches (i.e., initiates execution of) one of the hosted applications, additional input of user credentials by the client 2102 may be unnecessary to authenticate use of that application. Thus, a single entry of the user credentials may serve to determine the available applications and to authorize the launching of such applications without an additional, manual log-on authentication process by the user.

In one embodiment, an appliance 2200 receives a request for access to a resource from a client 2102. In another embodiment, the appliance 2200 receives a request for access to a virtual private network. In still another embodiment, the appliance 2200 makes a determination as to whether to grant access and what level of access to grant. In yet another embodiment, the appliance 2200 makes a determination as to what type of connection to establish when providing the client with access to the application.

In some embodiments, decisions regarding whether and how to grant a user access to a requested resource are made responsive to determinations by a policy engine regarding whether and how a client 2102 may access an application. In one of these embodiments, a decision regarding a level of access is made responsive to a policy engine determination. In another of these embodiments, a decision regarding a type of access is made responsive to a policy engine determination. In still another of these embodiments, a decision regarding a type of connection is made responsive to a policy engine determination. The policy engine may collect information about the client 2102 prior to making the determination. In some embodiments, the policy engine resides on the appliance 2200. In other embodiments, the appliance 2200 is in communication with a police engine residing on a server 2106.

Figure 7A:
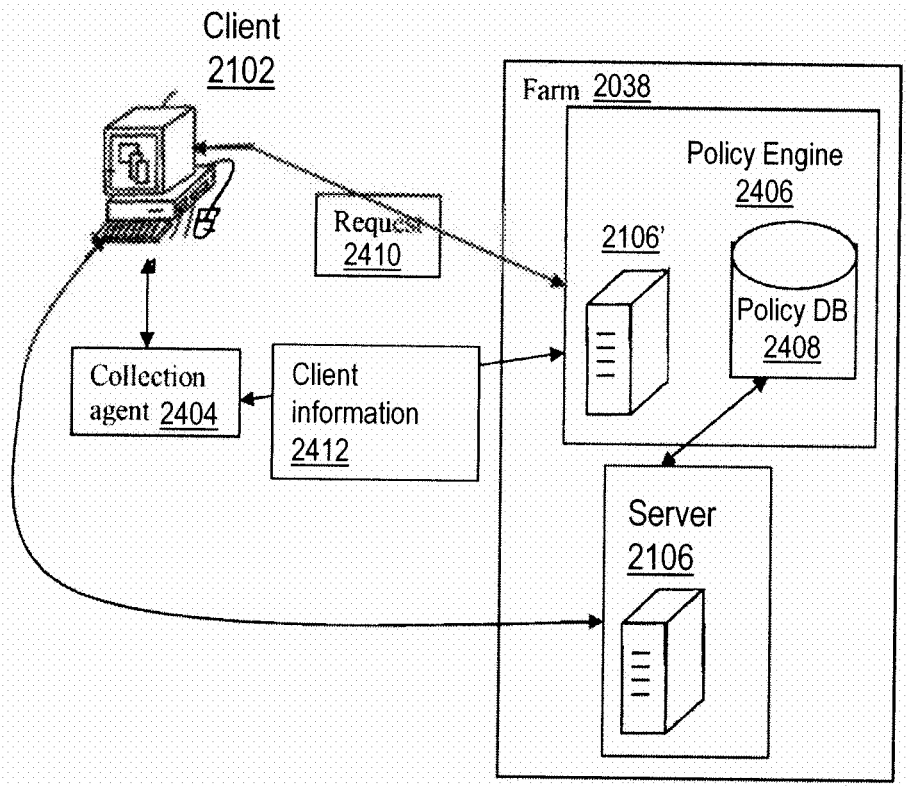
FIG. 7A is a block diagram of a network environment providing policy-based access to application programs for a local machine.

Referring now to FIG. 7A, one embodiment of a computer network is depicted, which includes a client 2102, a collection agent 2404, a policy engine 2406, a policy database 2408, a farm 2038, and an application server 2106'. In one embodiment, the policy engine 2406 is a server 2106. Although only one client 2102, collection agent 2404, policy engine 2406, farm 2038, and application server 2106' are depicted in the embodiment shown in FIG. 7A, it should be understood that the system may provide multiple ones of any or each of those components.

In brief overview, when the client 2102 transmits a request 2410 to the policy engine 2406 for access to an application, the collection agent 2404 communicates with client 2102, retrieving information about the client 2102, and transmits the client information 2412 to the policy engine 2406. The policy engine 2406 makes an access control decision by applying a policy from the policy database 2408 to the received information 2412.

In more detail, the client 2102 transmits a request 2410 for a resource to the policy engine 2406. In one embodiment, the policy engine 2406 resides on an application server 2106'. In another embodiment, the policy engine 2406 is a server 2106. In still another embodiment, the policy engine 2406 resides on an appliance 2200. In yet another embodiment, an application server 2106' or an appliance 2200 receives the request 2410 from the client 2102 and transmits the request 2410 to the policy engine 2406. In a further embodiment, the client 2102 transmits a request 2410 for a resource to a server 2106", which transmits the request 2410 to the policy engine 2406.

Upon receiving the request, the policy engine 2406 initiates information gathering by the collection agent 2404. The collection agent 2404 gathers information regarding the client 2102 and transmits the information 2412 to the policy engine 2406.

In some embodiments, the collection agent 2404 gathers and transmits the information 2412 over a network connection. In some embodiments, the collection agent 2404 comprises bytecode, such as an application written in the bytecode programming language JAVA. In some embodiments, the collection agent 2404 comprises at least one script. In those embodiments, the collection agent 2404 gathers information by running at least one script on the client 2102. In some embodiments, the collection agent comprises an Active X control on the client 2102. An Active X control is a specialized Component Object Model (COM) object that implements a set of interfaces that enable it to look and act like a control.

In one embodiment, the policy engine 2406 transmits the collection agent 2404 to the client 2102. In another embodiment, an appliance 2200 may store or cache the collection agent 2404. The appliance 2200 may then transmit the collection agent to a client 2102. In other embodiments, an appliance 2200 may intercept the transmission of a collection agent 2404. In still another embodiment, an appliance 2200 may accelerate the delivery of a collection agent 2404. In one embodiment, the policy engine 2406 requires a second execution of the collection agent 2404 after the collection agent 2404 has transmitted information 2412 to the policy engine 2406. In this embodiment, the policy engine 2406 may have insufficient information 2412 to determine whether the client 2102 satisfies a particular condition. In other embodiments, the policy engine 2406 requires a plurality of executions of the collection agent 2404 in response to received information 2412.

In some embodiments, the policy engine 2406 transmits instructions to the collection agent 2404 determining the type of information the collection agent 2404 gathers. In those embodiments, a system administrator may configure the instructions transmitted to the collection agent 2404 from the policy engine 2406. This provides greater control over the type of information collected. This also expands the types of access control decisions that the policy engine 2406 can make, due to the greater control over the type of information collected. The collection agent 2404 gathers information 2412 including, without limitation, machine ID of the client 2102, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information such as internet protocol address or range of addresses, machine ID of the server 2106, date or time of access request including adjustments for varying time zones, and authorization credentials. In some embodiments, a collection agent gathers information to determine whether an application can be accelerated on the client using an acceleration program 2302.

In some embodiments, the device type is a personal digital assistant. In other embodiments, the device type is a cellular telephone. In other embodiments, the device type is a laptop computer. In other embodiments, the device type is a desktop computer. In other embodiments, the device type is an Internet kiosk.

In some embodiments, the digital watermark includes data embedding. In some embodiments, the watermark comprises a pattern of data inserted into a file to provide source information about the file. In other embodiments, the watermark comprises data hashing files to provide tamper detection. In other embodiments, the watermark provides copyright information about the file.

In some embodiments, the network connection information pertains to bandwidth capabilities. In other embodiments, the network connection information pertains to Internet Protocol address. In still other embodiments, the network connection information consists of an Internet Protocol address. In one embodiment, the network connection information comprises a network zone identifying the logon agent to which the client 2102 provided authentication credentials.

In some embodiments, the authorization credentials include a number of types of authentication information, including without limitation, user names, client names, client addresses, passwords, PINs, voice samples, one-time passcodes, biometric data, digital certificates, tickets, etc. and combinations thereof. After receiving the gathered information 2412, the policy engine 2406 makes an access control decision based on the received information 2412.

Figure 7B:
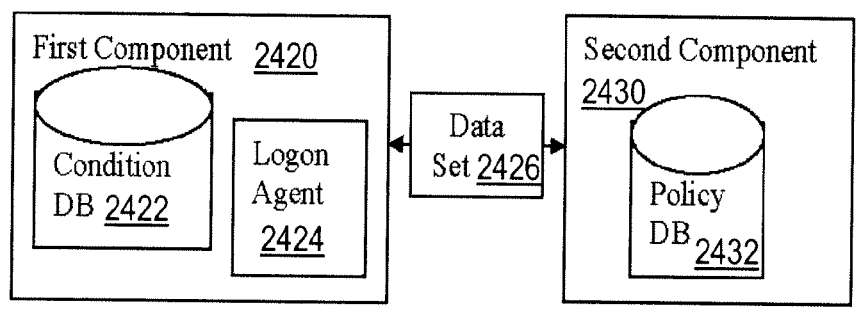
FIG. 7B is a block diagram depicting a more detailed embodiment of a policy engine.

Referring now to FIG. 7B, a block diagram depicts one embodiment of a policy engine 2406, including a first component 2420 comprising a condition database 2422 and a logon agent 2424, and including a second component 2430 comprising a policy database 2432. The first component 2420 applies a condition from the condition database 2422 to information received about client 2102 and determines whether the received information satisfies the condition.

In some embodiments, a condition may require that the client 2102 execute a particular operating system to satisfy the condition. In some embodiments, a condition may require that the client 2102 execute a particular operating system patch to satisfy the condition. In still other embodiments, a condition may require that the client 2102 provide a MAC address for each installed network card to satisfy the condition. In some embodiments, a condition may require that the client 2102 indicate membership in a particular Active Directory to satisfy the condition. In another embodiment, a condition may require that the client 2102 execute a virus scanner to satisfy the condition. In other embodiments, a condition may require that the client 2102 execute a personal firewall to satisfy the condition. In some embodiments, a condition may require that the client 2102 comprise a particular device type to satisfy the condition. In other embodiments, a condition may require that the client 2102 establish a particular type of network connection to satisfy the condition.

If the received information satisfies a condition, the first component 2420 stores an identifier for that condition in a data set 2426. In one embodiment, the received information satisfies a condition if the information makes the condition true. For example, a condition may require that a particular operating system be installed. If the client 2102 has that operating system, the condition is true and satisfied. In another embodiment, the received information satisfies a condition if the information makes the condition false. For example, a condition may address whether spyware exists on the client 2102. If the client 2102 does not contain spyware, the condition is false and satisfied.

In some embodiments, the logon agent 2424 resides outside of the policy engine 2406. In other embodiments, the logon agent 2424 resides on the policy engine 2406. In one embodiment, the first component 2420 includes a logon agent 2424, which initiates the information gathering about client 2102. In some embodiments, the logon agent 2424 further comprises a data store. In these embodiments, the data store includes the conditions for which the collection agent may gather information. This data store is distinct from the condition database 2422.

In some embodiments, the logon agent 2424 initiates information gathering by executing the collection agent 2404. In other embodiments, the logon agent 2424 initiates information gathering by transmitting the collection agent 2404 to the client 2102 for execution on the client 2102. In still other embodiments, the logon agent 2424 initiates additional information gathering after receiving information 2412. In one embodiment, the logon agent 2424 also receives the information 2412. In this embodiment, the logon agent 2424 generates the data set 2426 based upon the received information 2412. In some embodiments, the logon agent 2424 generates the data set 2426 by applying a condition from the database 2422 to the information received from the collection agent 2404.

In another embodiment, the first component 2420 includes a plurality of logon agents 2424. In this embodiment, at least one of the plurality of logon agents 2424 resides on each network domain from which a client 2102 may transmit a resource request. In this embodiment, the client 2102 transmits the resource request to a particular logon agent 2424. In some embodiments, the logon agent 2424 transmits to the policy engine 2406 the network domain from which the client 2102 accessed the logon agent 2424. In one embodiment, the network domain from which the client 2102 accesses a logon agent 2424 is referred to as the network zone of the client 2102.

The condition database 2422 stores the conditions that the first component 2420 applies to received information. The policy database 2432 stores the policies that the second component 2430 applies to the received data set 2426. In some embodiments, the condition database 2422 and the policy database 2432 store data in an ODBC-compliant database. For example, the condition database 2422 and the policy database 2432 may be provided as an ORACLE database, manufactured by Oracle Corporation of Redwood Shores, Calif. In other embodiments, the condition database 2422 and the policy database 2432 can be a Microsoft ACCESS database or a Microsoft SQL server database, manufactured by Microsoft Corporation of Redmond, Wash.

After the first component 2420 applies the received information to each condition in the condition database 2422, the first component transmits the data set 2426 to second component 2430. In one embodiment, the first component 2420 transmits only the data set 2426 to the second component 2430. Therefore, in this embodiment, the second component 2430 does not receive information 2412, only identifiers for satisfied conditions. The second component 2430 receives the data set 2426 and makes an access control decision by applying a policy from the policy database 2432 based upon the conditions identified within data set 2426.

In one embodiment, policy database 2432 stores the policies applied to the received information 2412. In one embodiment, the policies stored in the policy database 2432 are specified at least in part by the system administrator. In another embodiment, a user specifies at least some of the policies stored in the policy database 2432. The user-specified policy or policies are stored as preferences. The policy database 2432 can be stored in volatile or non-volatile memory or, for example, distributed through multiple servers.

In one embodiment, a policy allows access to a resource only if one or more conditions are satisfied. In another embodiment, a policy allows access to a resource but prohibits transmission of the resource to the client 2102. Another policy might make connection contingent on the client 2102 that requests access being within a secure network. In some embodiments, the resource is an application program and the client 2102 has requested execution of the application program. In one of these embodiments, a policy may allow execution of the application program on the client 2102. In another of these embodiments, a policy may enable the client 2102 to receive a stream of files comprising the application program. In this embodiment, the stream of files may be stored and executed in an isolation environment. In still another of these embodiments, a policy may allow only execution of the application program on a server 2106, such as an application server, and require the server 2106 to transmit application-output data to the client 2102.

Figure 7C:
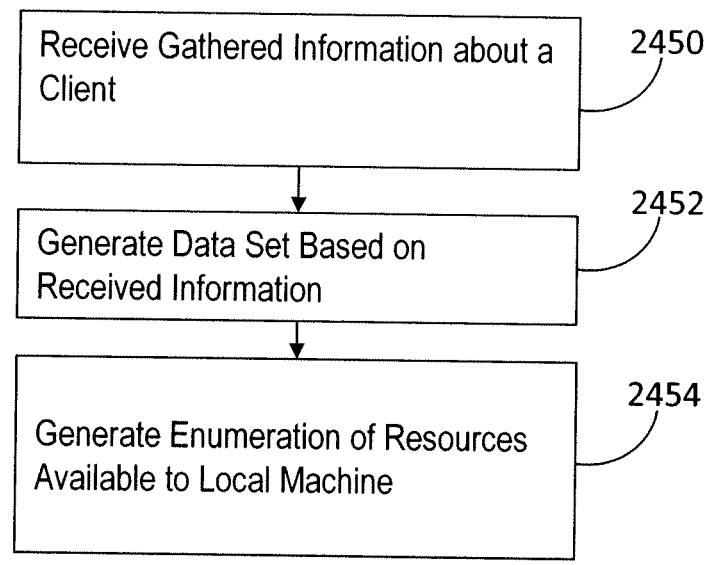
FIG. 7C a flow diagram depicting one embodiment of the steps taken by a policy engine to make an access control decision based upon information received about a client.

Referring now to FIG. 7C, a flow diagram depicts one embodiment of the steps taken by the policy engine 2406 to make an access control decision based upon information received about a client 2102. Upon receiving gathered information about the client 2102 (Step 2450), the policy engine 2406 generates a data set based upon the information (Step 2452). The data set 2426 contains identifiers for each condition satisfied by the received information 2412. The policy engine 2406 applies a policy to each identified condition within the data set 2426. That application yields an enumeration of resources which the client 2102 may access (Step 2454). The policy engine 2406 then presents that enumeration to the client 2102. In some embodiments, the policy engine 2406 creates a Hypertext Markup Language (HTML) document used to present the enumeration to the client.

In some embodiments, a determination is made as to a type of connection to establish when granting access to a resource responsive to a determination by a policy engine such as the policy engine 2406 described above in FIG. 7A, FIG. 7B and FIG. 7C. In other embodiments, a determination is made as to a method for granting access to a resource, such as a method for execution, responsive to a determination by a policy engine such as the policy engine 2406 described above in FIG. 7A, FIG. 7B and FIG. 7C. In other embodiments, the server 2106 or appliance 2200 receiving the credentials and the request to execute the enumerated application further comprises such a policy engine 2406.

In one embodiment, one of a plurality of types of access is identified, responsive to a policy, each of the plurality of types of access associated with at least one connection characteristic. In one embodiment, the identification is made responsive to an application of a policy to the received credentials associated with the client 2102. In some embodiments, the selection is made by a policy engine such as the policy engine 2406 described above in FIG. 7A, FIG. 7B and FIG. 7C. In other embodiments, the server 2106 or appliance 2200 receiving the credentials and the request to execute the enumerated application further comprises such a policy engine 2406.

In some embodiments, after a server 2106 or appliance 2200 authorizes access to a resource, a client 2102 performs a pre-launch analysis of the client 2102. In one of these embodiments, the client 2102 performs the pre-launch analysis to confirm authorization to access a resource, or to complete the authorization process. In other embodiments, the client 2102 performs a pre-launch analysis of the client 2102 prior to the authorization decision. In still other embodiments, the client 2102 performs a pre-launch analysis of the client 2102 after receiving authorization to access a resource but prior to the establishment of a connection to the resource. In one of these embodiments, the client 2102 performs a pre-launch analysis of the client 2102 after receiving authorization to access a resource but prior to an identification of a type of connection authorized for use in accessing the resource.

In one embodiment, the client 2102 performs the pre-launch analysis prior to retrieving and executing a resource, such as a plurality of application files comprising an application program. In another embodiment, the client 2102 performs the pre-launch analysis responsive to a received indication that the pre-launch analysis is a requirement for authorization to access a resource, such as the plurality of application files comprising an application program. In still another embodiment, the client 2102 retrieves at least one characteristic required for execution of an application program. In yet another embodiment, the client 2102 receives access information indicating a location of a file for retrieval by the client 2102, the file enumerating the at least one characteristic. In some embodiments, the client 2102 performs the pre-launch analysis after a server 2106 or appliance 2200 selects a method of providing access to a resource and identifying a type of connection to establish between the client and the resource.

The client 2102 determines the existence of the at least one characteristic on the client 2102. In some embodiments, the client 2102 makes this determination as part of the pre-launch analysis. In one embodiment, determining the existence of the at least one characteristic on the client 2102 includes determining whether a device driver is installed on the client 2102. In another embodiment, determining the existence of the at least one characteristic on the client 2102 includes determining whether an operating system is installed on the client 2102. In still another embodiment, determining the existence of the at least one characteristic on the client 2102 includes determining whether a particular operating system is installed on the client 2102. In yet another embodiment, determining the existence of the at least one characteristic on the client 2102 includes determining whether a particular revision level of an operating system is installed on the client 2102.

In some embodiments, determining the existence of the at least one characteristic on the client 2102 includes determining whether the client 2102 has acquired authorization to execute an enumerated application. In one of these embodiments, a determination is made by the client 2102 as to whether the client 2102 has received a license to execute the enumerated application.

In another of these embodiments, a determination is made by the client 2102 as to whether the client 2102 has received a license to receive across an application streaming session a plurality of application files comprising the enumerated application. In other embodiments, determining the existence of the at least one characteristic on the client 2102 includes determining whether the client 2102 has sufficient bandwidth available to retrieve and execute an enumerated application.

In some embodiments, determining the existence of the at least one characteristic on the client 2102 includes execution of a script on the client 2102. In other embodiments, determining the existence of the at least one characteristic on the client 2102 includes installation of software on the client 2102. In still other embodiments, determining the existence of the at least one characteristic on the client 2102 includes modification of a registry on the client 2102. In yet other embodiments, determining the existence of the at least one characteristic on the client 2102 includes transmission of a collection agent 2404 to the client 2102 for execution on the client 2102 to gather credentials associated with the client 2102.

In some embodiments, the client 2102 makes a request for authorization to execute an application responsive to a determination that at least one characteristic exists on the client 2102. In one of these embodiments, the client 2102 determines that a plurality of characteristics exist on the client 2102, the plurality of characteristics associated with an enumerated application and received responsive to a request to execute the enumerated application. In another of these embodiments, whether the client 2102 receives authorization for execution of the enumerated application files depends upon existence of the at least one characteristic on the client 2102. In one embodiment, the client 2102 received an enumeration of application programs, requested execution of an enumerated application, and received access information including the at least one characteristic and a launch ticket authorizing the execution of the enumerated application upon the determination of the existence of the at least one characteristic on the client 2102. In some embodiments, the client 2102 executes a second client agent 2120', the second client agent 2120' requesting execution of an application on a server 2106, responsive to a determination that the client 2102 lacks the at least one characteristic.

Figure 8:
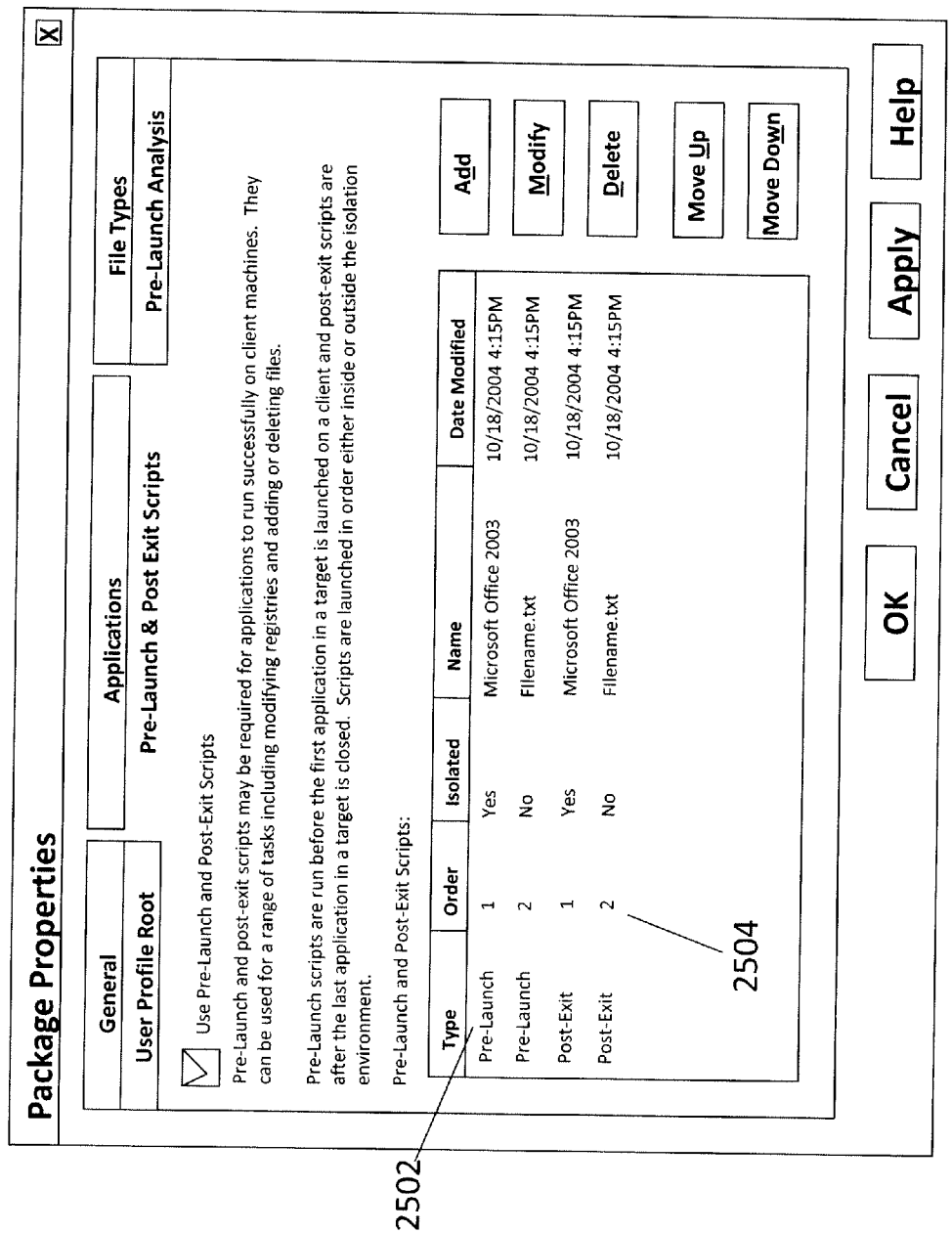
FIG. 8 is a screen shot depicting one embodiment of an enumeration of scripts to be executed on the client.

Referring now to FIG. 8, a screen shot depicts one embodiment of an enumeration of scripts to be executed on the client. In one embodiment, at least one execution pre-requisite is associated with at least one installed application file responsive to an application of a policy to the at least one installed application file or to a characteristic of the installed application file. In another embodiment, a script is associated with the at least one installed application file, the script comprising an executable program determining the existence of at least one execution pre-requisite on a client. A type of script 2502 indicates when the script should be executed, for example, either before the execution of the application, or after termination of execution of the application. An isolation indicator 2504 indicates whether the script should be executed in an isolation environment on the client 2102. As shown in FIG. 8, in some embodiments, the script was associated with the application program at the time a plurality of application files were packaged together and stored on a server 2106 hosting the plurality of application files.

In some embodiments, an instruction is associated with the at least one application file, the instruction indicating a second installed application file for use by a client failing to satisfy the at least one execution pre-requisite. In other embodiments, an instruction is associated with the at least one installed application file, the instruction indicating a second execution method for execution of the at least one installed application file on a client failing to satisfy the at least one execution pre-requisite. In one of these embodiments, an execution method is associated with the at least one installed application file, the execution method authorizing streaming of a plurality of application files comprising the second application to a client 2102 for execution on the client. In another of these embodiments, an evaluation of a client 2102 identifies at least one characteristic associated with the at least one installed application file not included on the client. In still another of these embodiments, authorization for execution of the plurality of application files is revoked. In yet another of these embodiments, a second execution method is provided for executing the plurality of application files, the second execution method enabling execution of the plurality of application files on a server 2106 and transmission of application output data from the server 2106 to the client.

In another embodiment, the at least one characteristic is added to the client 2102 after the pre-launch analysis determines that the client 2102 lacks the at least one characteristic. In still another embodiment, the at least one characteristic is included in a server 2106 hosting an application program and failure of the client 2102 to include the at least one characteristic will prevent execution of the application program. In yet another embodiment, the application program requires existence of the at least one characteristic on the client 2102 for execution.

In some embodiments, a packaging mechanism enables identification of at least one characteristic for use in a pre-launch analysis on the client. In other embodiments, the packaging mechanism enables association of at least one characteristic with an application program available for execution on the client. In still other embodiments, the packaging mechanism enables association of an executable script with an application program, the client 2102 executing the executable script to complete the pre-launch analysis. In yet other embodiments, the at least one characteristic is required to exist on the client 2102 after the execution of the application program.

Figure 9:
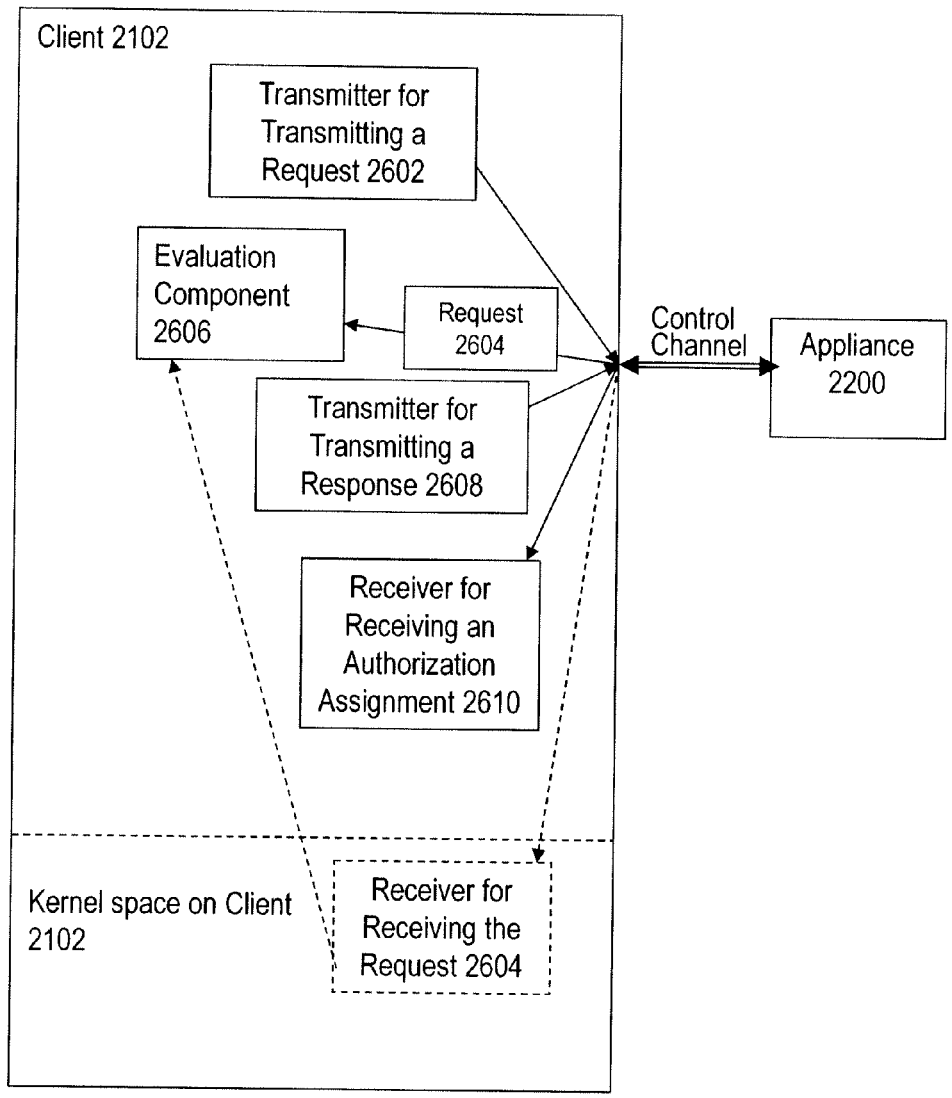
FIG. 9 is a flow diagram depicting one embodiment of the steps taken in a method for authorizing a level of access of a client to a virtual private network connection based on a client-side attribute.

Referring now to FIG. 9, a block diagram depicts one embodiment of a system for authorizing a level of access of a client to a virtual private network connection based on a client-side attribute. In brief overview, the system includes a client 2102, a means for transmitting a request 2602, a request 2604, an evaluation component 2606, a means for transmitting a response 2608, a means for receiving an authorization assignment 2610, and an appliance 2200.

The means for transmitting a request 2602 transmits from the client 2102 to the appliance 2200 the request for a virtual private network connection to a network. In one embodiment, the means for transmitting a request 2602 comprises a transmitter. In another embodiment, the means for transmitting a request 2602 resides in the client agent 2120. In one embodiment, the means for transmitting a request 2602 transmits a request for access to a resource, such as an application or server 2106, residing on the network. In another embodiment, the means for transmitting a request 2602 transmits a request for a network address on the virtual private network. In still another embodiment, the means for transmitting a request 2602 transmits the request for the virtual private network connection after authenticating the client 2102 to the appliance 2200. In yet another embodiment, the means for transmitting a request 2602 transmits the request prior to the establishment of a control connection. In a further embodiment, the appliance 2200 establishes the control connection responsive to receiving the request from the client 2102.

The request 2604 is received by the client 2102, via a control connection between the client 2102 and the appliance 2200, for evaluation of at least one clause of a security string, the at least one clause identifying an object for evaluation, an attribute of the object, and a pre-requisite associated with the attribute. In one embodiment, the request 2604 includes at least one clause of a security string, the at least one clause identifying the client as an object for evaluation. In another embodiment, the request 2604 includes at least one clause of a security string, the at least one clause identifying a presence of an application program on the client as an attribute of the object. In still another embodiment, the request 2604 includes at least one clause of a security string, the at least one clause identifying an absence of an application program on the client as an attribute of the object. In yet another embodiment, the request 2604 includes at least one clause of a security string, the at least one clause identifying a presence of a version of an application program on the client as an attribute of the object.

In one embodiment, the request 2604 includes at least one clause of a security string, the at least one clause identifying an absence of a version of an application program on the client as an attribute of the object. In another embodiment, the request 2604 includes at least one clause of a security string, the at least one clause identifying a presence of a required version of an application program on the client as a pre-requisite. In still another embodiment, the request includes at least one clause of a security string, the at least one clause identifying a presence of an application program on the client as a pre-requisite. In yet another embodiment, the request includes at least one clause of a security string, the at least one clause identifying an absence of an application program on the client as a pre-requisite. In some embodiments, the request 2604 is sent to the client 2102 over the control connection in response to a request by the client for access to a resource or initiation of a connection.

In some embodiments, the kernel on the client 2102 receives a security string. In one of these embodiments, the kernel identifies one or more atomic expressions within the security string. In another of these embodiments, the atomic expressions within the security string are separated by logical operators. The logical operators may be expressed by, for example, double ampersands indicating that the expressions are conjunctive or double slashes indicating that the expressions are disjunctive. In still another of these embodiments, the at least one clause of the security string is an atomic expression within the security string separated from other expressions in the security string by logical operators. In other embodiments, and as shown in shadow in FIG. 9, the kernel on the client 2102 comprises receiver for receiving the request 2604 from the appliance 2200 over the control channel. In one of these embodiments, the kernel transmits all or part of the request to the evaluation component 2606.

In one embodiment, a user of an appliance 2200 generates the security string. In another embodiment, the appliance 2200 adds a generated security string as a policy. In still another embodiment, the appliance 2200 adds a generated security string as a policy within an authorization server, a policy engine, a firewall, a virtual private network server, or other security appliance. In some embodiments, the appliance 2200 transmits the generated security string to the client 2102 in its entirety and without re-formatting from the form in which the security string was generated. In other embodiments, the appliance 2200 transmits only portions of the security string to the client 2102, such as one clause or atomic expression at a time. In still other embodiments, the appliance 2200 transmits the generated security string to a kernel on the client 2102 for formatting and parsing into atomic expressions.

In one embodiment, a security string is associated with an authorization group. In another embodiment, if a client 2102 satisfies a requirement expressed by the security string, the client 2102 is assigned to the authorization group. In still another embodiment, if a client 2102 fails to satisfy a requirement expressed by the security string, the client 2102 is assigned to the authorization group. In some embodiments, if no security string is assigned to an authorization group, the client 2102 request is granted without the need for evaluation of a security string. In other embodiments, if no authorization group is assigned to a security string, but evaluation of the security string is required by the appliance 2200, the client 2102 request is denied.

In one embodiment, a security string is an expression of a policy. In another embodiment, and as an example, if a policy requires a client 2102 to execute a particular personal firewall program or a particular antivirus program before accessing a resource or a establishing a type of connection, and if the policy assigns the client to a particular authorization group if the client fails to satisfy the policy, a security string expressing the policy may be of the form: "pf_1_ZoneAlarm_4.0.012.013||pf_1_TrendMicro_11.0.0"-clientsecurityAuthGroup ag2." In still another embodiment, and as a second example, a policy may require a particular revision level of an antivirus program and a particular process running, and if the policy assigns the client to a particular authorization group if the client fails to satisfy the policy, a security string expressing the policy may be of the form: "av_0_mcafeevirusscan_4.88 && svc_0_svchost"-cliensecurityAuthGroup ag1."

In some embodiments, a priority level may be assigned to the security string. In one of these embodiments, the appliance 2200 may transmit the security string having the highest priority to the client 2102. In another of these embodiments, and as an example, if the appliance 2200 identifies the following two security strings:

sa1-clientsecurity "av_0_mcafeevirusscan_4.88 && svc_0_svchost"-cliensecurityAuthGroup ag1
sa2-clientsecurity "pf_1_ZoneAlarm_4.0.012.013||pf_1_TrendMicro_11.0.0"-clientsecurityAuthGroup ag2, the appliance 2200 may select the higher priority security string (sa1) over the lower priority string (sa2). In still another of these embodiments, when a client 2102 connects to a vServer 2275 on the appliance 2200, the appliance 2200 evaluates applicable security strings and identifies the security string to transmit to the client 2102.

In other embodiments, a security string may be expressed in the form "object.attribute.prerequisite." In one of these embodiments, and for example, the security string may be an expression identifying the client 2102, a particular application program associated with the client 2102 and a prerequisite associated with the program, the expression having the following form:

client.application[mcafeevirusscan].version>=4.88 && client.svc[svchost]RUNNING

In this embodiment, the object is the client 2102 (client), the attribute is an antivirus program (application[mcafeevirusscan]), and the pre-requisite is that the application be of at least a particular version level (version>=4.88). In this embodiment, the security string comprises two clauses and the second clause identifies the client 2102, a process on the client (a service called svchost), and a pre-requisite associated with the process (that the svchost process be executing, or running, on the client). In this embodiment, the double ampersand indicates that the client must satisfy both of the clauses to satisfy the security string.

In another of these embodiments, and as a second example, the security string may comprise an expression having two disjunctive clauses in which the client 2102 may satisfy one clause or the other to satisfy the security string. In one example of this embodiment, the expression may be of the following form:

client.application.pf[ZoneAlarm].version>=4.0.012.013||
client.application.pf[TrendMicro].version>=11.0.0.

In this embodiment, the client 2102 will satisfy the security string if the client 2102 executes a particular level of a particular personal firewall (ZoneAlarm version 4.0.012.013 or greater) or if the client 2102 executes a particular level of a particular antivirus program (TrendMicro version 11.0.0 or greater).

The evaluation component 2606 resides on the client 2102, identifies the attribute, determines whether the attribute satisfies the pre-requisite, and evaluates the at least one clause. In some embodiments, the evaluation component 2606 resides in the client agent 2120. In other embodiments, the kernel of the client 2102 provides the functionality of the evaluation component 2606. In still other embodiments, the kernel of the client 2102 validates a response provided by the evaluation component 2606.

In one embodiment, the evaluation component 2606 executes a script to evaluate the at least one clause. In another embodiment, the evaluation component 2606 is transmitted to the client 2102 from the appliance 2200. In still another embodiment, the evaluation component 2606 is a collection agent, such as a collection agent 2404 described above in connection with FIGS. 7A, 7B, and 7C, the collection agent gathering information associated with the attribute. In yet another embodiment, the evaluation component 2606 evaluates the at least one clause responsive to the information gathered about the client 2102.

In some embodiments, the evaluation component 2606 identifies attributes of the client 2102. In one of these embodiments, the attributes include, but are not limited to, any of the following: client operating system, presence of service packs, presence of hot fixes on the client, executing services, executing processes, presence of certain files, antivirus software, personal firewall software, anti-spam software, internet security software, and registry configuration. In another of these embodiments, the attributes of the client 2102 include information associated with the client, such as the information described in connection with the collection agent 2404, described above in connection with FIG. 7A and FIG. 7B. In still another of these embodiments, the attributes of the client 2102 include information associated with the client and gathered as part of a pre-launch analysis, as described above.

In one embodiment, the evaluation component 2606 identifies an attribute indicating a presence on the client of one of the following: a version of an operating system, a service pack of the operating system, a running service, a running process, and a file. In another embodiment, the evaluation component 2606 identifies an attribute indicating a presence on the client of one of the following: antivirus software, personal firewall software, anti-spam software, and internet security software. In still another embodiment, the evaluation component 2606 identifies an attribute identifying a version of one of the following: antivirus software, personal firewall software, anti-spam software, and internet security software. In yet another embodiment, the evaluation component 2606 determines that the attribute satisfies the pre-requisite responsive to the identification of the attribute.

In some embodiments, as described above, the client 2102 performs the pre-launch analysis after a server 2106 or appliance 2200 selects a method of providing access to a resource and identifying a type of connection to establish between the client and the resource. In other embodiments, the client 2102 performs a pre-launch analysis of the client 2102 prior to an authorization decision by the appliance 2200. In other embodiments, the client 2102 performs a pre-launch analysis of the client 2102 after receiving authorization to access a resource but prior to the establishment of a connection to the resource. In one of these embodiments, the client 2102 performs a pre-launch analysis of the client 2102 after receiving authorization to access a resource but prior to an identification of a type of connection authorized for use in accessing the resource.

Figure 10:
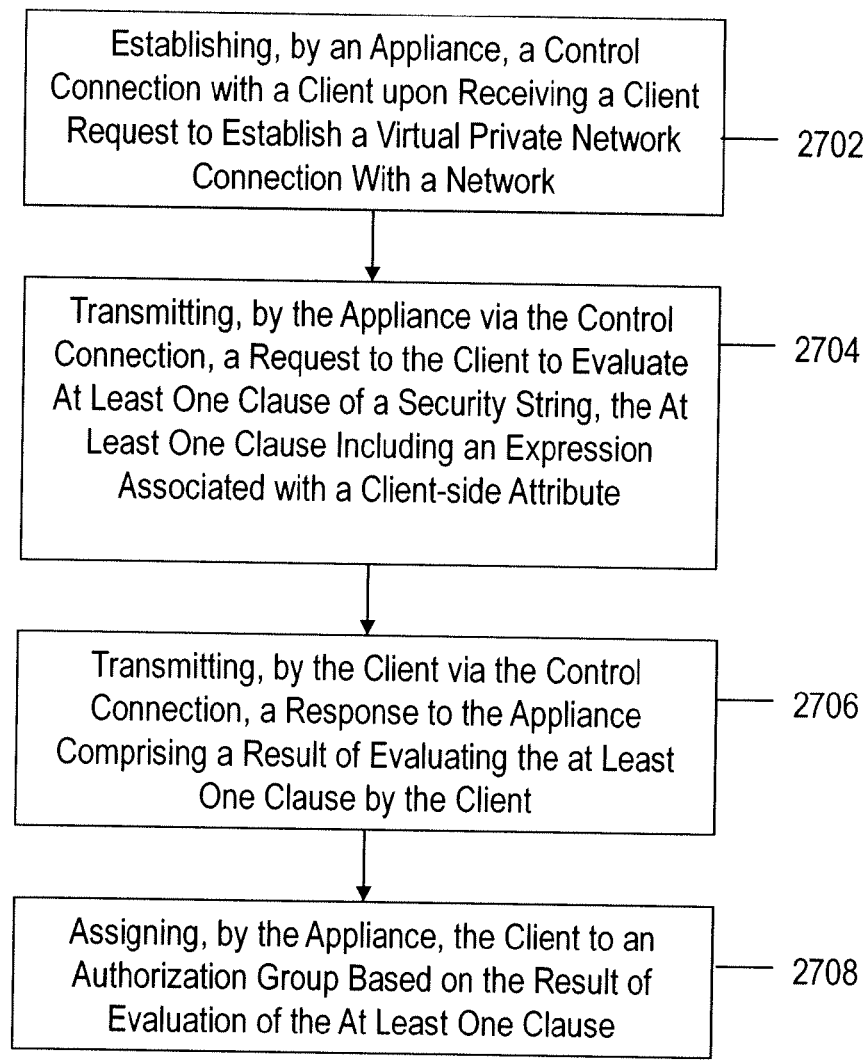
FIG. 10 is a block diagram depicting one embodiment of a system for authorizing a level of access of a client to a virtual private network connection based on a client-side attribute.

In some embodiments depicted by FIG. 9 and FIG. 10, the client 2102 performs a pre-launch analysis prior to the identification of a type of connection to establish between the client and the resource. In one of these embodiments, the client 2102 transmits a result of the pre-launch analysis to the appliance 2200. In another of these embodiments, the appliance 2200 makes an access control decision, including an identification of a type of connection to establish between the client 2102 and a requested resource, responsive to a received result of a pre-launch analysis. In other embodiments, the client 2102 evaluates a security string as part of a pre-launch analysis. In still other embodiments, the client 2102 transmits a result of a pre-launch analysis to a kernel on the client 2102. In yet other embodiments, the kernel evaluates a security string responsive to a received result of the pre-launch analysis.

In some embodiments, the kernel on the client 2102 receives the security string. In one of these embodiments, the kernel identifies a plurality of clauses in the security string, the clauses separated by logical operators. In another of these embodiments, the clauses within the string are atomic expressions. In still another of these embodiments, the kernel transmits at least one clause to the evaluation component 2606 for evaluation, the at least one clause comprising an atomic expression. In yet another of these embodiments, the evaluation component 2606 transmits a result of evaluating the atomic expression to the kernel.

In other embodiments, the kernel on the client 2102 receives a result of an evaluation of at least one clause in the security string from the evaluation component 2606. In one of these embodiments, the kernel on the client 2102 evaluates a security string comprising a plurality of clauses responsive to receiving a plurality of results from the evaluation component 2606. In another of these embodiments, the kernel on the client 2102 comprises the means for transmitting a response 2608. In still another of these embodiments, the kernel on the client 2102 transmits a result of an evaluation of an entire security string, comprising a plurality of clauses, to the appliance 2200.

The means for transmitting a response 2608 transmits from the client 2102 to the appliance 2200, via the control connection, a response comprising a result of the evaluation of the at least one clause by the evaluation component 2606. In one embodiment, the means for transmitting a response 2608 transmits a packet to the appliance 2200 with the result of the evaluation. In another embodiment, the means for transmitting a response 2608 transmits a "1" if the client satisfies the at least one clause or a "0" if the client does not satisfy the at least one clause. In some embodiments, the means for transmitting a response 2608 resides on the evaluation component 2606. In other embodiments, the means for transmitting a response 2608 resides in the client agent 2120. In still other embodiments, the means for transmitting a response 2608 comprises a transmitter residing in the client agent 2120 and sending packets over the control channel.

The means for receiving an authorization assignment 2610 receives from the appliance 2200 at the client 2102 an assignment to an authorization group, the assignment determined based on the evaluation of the at least one clause. In one embodiment, the means for receiving the authorization assignment 2610 receives an assignment made responsive to the result of evaluation of a second clause by the appliance 2200. In another embodiment, the means for receiving the authorization assignment 2610 receives an assignment made responsive to a determination by the appliance 2200 that the client 2102 lacks a desired attribute. In still another embodiment, the means for receiving the authorization assignment 2610 receives an assignment to an authorization group providing quarantined access to the network via the appliance 2200.

In some embodiments, the means for receiving an authorization assignment 2610 comprises a component residing in the client agent 2120. In other embodiments, the means for receiving an authorization assignment 2610 resides in a kernel on the client 2102. In still other embodiments, the means for receiving an authorization assignment 2610 comprises a receiver in communication with the appliance 2200.

In some embodiments, an authorization group to which a user of a client 2102 belongs is identified by an evaluation of the client 2102 and of attributes of the client 2102. In one of these embodiments, a user of a client 2102 requesting access to a network or other resource, or requesting a connection to a network or a resource on the network, is a member of a group of users, each member in the group authorized to access particular resources via particular types of connections. In another of these embodiments, a user of a client 2102 belongs to a default authorization group. In still another of these embodiments, the appliance 2200 evaluates the client 2102 and determines that although the user of the client 2102 is a member of a particular authorization group, the user does not currently satisfy the requirements for membership in the group, and is therefore not authorized to access the resources that the user is typically authorized to use. Alternatively, the appliance 2200 may evaluate the client 2102 and determine that although the user is not authorized to access particular resources via one type of connection, the client 2102 may connect via a different type of connection. In yet another embodiment, the appliance 2200 may evaluate the client 2102 and determine that although the user is not authorized to access a particular set of resources, the client 2102 may access a subset of those resources via a particular type of connection, such as via a secure connection to a quarantined network. In some embodiments, an authorization group may be created for the user of the client 2102 upon the evaluation of the attributes of the client 2102. In other embodiments, the client 2102 satisfies the requirements of the applicable security strings and a connection is established according to the rules or policies of the client 2102's default authorization group.

In one embodiment, the means for receiving the authorization assignment 2610 receives a denial, from the appliance 2200, of the client request if the security string is not associated with an authorization group. In another embodiment, the means for receiving the authorization assignment 2610 receives a denial, from the appliance 2200, of the client request if a pre-requisite in the security string is not satisfied. In still another embodiment, the means for receiving the authorization assignment 2610 receives an assignment made responsive an evaluation, by the appliance 2200, of a second clause of the security string comprising one or more logical operations.

Referring now to FIG. 10, a flow diagram depicts one embodiment of the steps taken in a method for authorizing a level of access of a client to a virtual private network connection based on a client-side attribute. In brief overview, an appliance establishes a control connection with a client upon receiving a client request to establish a virtual private network connection with a network (step 2702). The appliance transmits, via the control connection, a request to the client to evaluate at least one clause of a security string, the at least one clause including an expression associated with a client-side attribute (step 2704). The client transmits, via the control connection, a response to the appliance comprising a result of evaluating the at least one clause by the client (step 2706). The appliance assigns the client to an authorization group based on the result of evaluation of the at least one clause (step 2708).

Referring now to FIG. 10, and in greater detail, an appliance establishes a control connection with a client upon receiving a client request to establish a virtual private network connection with a network (step 2702). In one embodiment, the appliance receives a request from the client to access a resource on a network, such as a file or application. In another embodiment, the appliance receives a request from the client to access a server 2106. In still another embodiment, the appliance receives a request for an association between the client and a network address associated with the virtual private network. In yet another embodiment, the client initiates establishment of the control connection. In some embodiments, the appliance is an appliance 2200 as described above.

The appliance transmits, via the control connection, a request to the client to evaluate at least one clause of a security string, the at least one clause including an expression associated with a client-side attribute (step 2704). In one embodiment, the appliance transmits the request to a collection agent on the client, such as a collection agent 2404 described above, the collection agent gathering information associated with the client-side attribute and evaluating the at least one clause. In another embodiment, the appliance transmits a script to the client for execution. In still another embodiment, the appliance transmits a collection agent to the client, the collection agent evaluating the at least one clause.

The client transmits, via the control connection, a response to the appliance comprising a result of evaluating the at least one clause by the client (step 2706). In one embodiment, the client evaluates the at least one clause. In another embodiment, a collection agent or evaluation component on the client evaluates the at least one clause. In still another embodiment, the client evaluates the at least one clause by executing a script. In yet another embodiment, the client gathers information associated with the client-side attribute. In a further embodiment, the client evaluates the at least one clause responsive to the gathered information.

In one embodiment, the client identifies a client-side attribute indicating a presence on the client of one of the following: a version of an operating system, a service pack of the operating system, a running service, a running process, and a file. In another embodiment, the client identifies a client-side attribute indicating a presence on the client of one of the following: antivirus software, personal firewall software, anti-spam software, and internet security software. In still another embodiment, the client identifies a client-side attribute indicating a version on the client of one of the following: antivirus software, personal firewall software, anti-spam software, and internet security software.

In one embodiment, the appliance evaluates a second clause of the security string. In another embodiment, the appliance evaluates a clause of the security string comprising one or more logical operations. In some embodiments, the appliance receives gathered information associated with the client. In one of these embodiments, the appliance receives the gathered information from a collection agent, such as a collection agent 2404 executing on the client 2102 as described above. In another of these embodiments, the appliance evaluates the second clause of the security string responsive to the gathered information.

The appliance assigns the client to an authorization group based on the result of evaluation of the at least one clause (step 2708). In one embodiment, the appliance determines that the client lacks a desired client-side attribute, responsive to the result of the evaluation of the at least one clause. In another embodiment, the appliance assigns the client to an authorization group providing quarantined access to the network via the appliance. In still another embodiment, the appliance configures an authorization policy comprising the security string. In yet another embodiment, the appliance assigns the authorization policy to the authorization group.

In one embodiment, the appliance denies a login request from a client if the security string is not associated with the authorization group. In another embodiment, the appliance establishes a virtual private network connection with the client in accordance with the authorization group. In still another embodiment, the appliance establishes a virtual private network connection between the client and a server residing on a virtual private network.

In one embodiment, the appliance assigns the client to an authorization group based on an application of a policy to the result of evaluation of the at least one clause. In another embodiment, the appliance transmits the response comprising the result of the evaluation to a policy engine. In still another embodiment, the appliance assigns the client to an authorization group based on an application of a policy by the policy engine.

As one skilled in the art appreciates and understands in view of the embodiments of the client, network appliance, gateway and servers described herein, any of these embodiments of the client, appliance, gateway and servers may be configured and implemented to perform any combination of the methods described herein. Any of the embodiments of the methods described in connection with FIG. 3 may work in conjunction with, integrated with or be performed concurrently with any of the embodiments of the methods described in connection with FIGS. 9-10.

The systems and methods described above may be provided as one or more computer-readable programs embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, LISP, PERL, C, C++, PROLOG, or any byte code language such as JAVA. The software programs may be stored on or in one or more articles of manufacture as object code.

In some aspects, the methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Having described certain embodiments of systems and methods for authorizing a level of access of a client to a virtual private network connection based on a client-side attribute, it will now become apparent to one of skill in the art that other embodiments incorporating the concepts of the invention may be used. Therefore, the invention should not be limited to certain embodiments, but rather should be limited only by the spirit and scope of the following claims.

In the preceding specification, the invention has been described with reference to specific exemplary embodiments. It will however, be evident that various modifications and changes may be made without departing from the broader spirit and scope of the invention as set forth in the claims that follow. The specification and drawings are accordingly to be regarded as illustrative rather than restrictive sense. Other embodiments of the invention may be apparent to those skilled in the art from consideration of the specification and practice of the invention disclosed herein.

What is claimed:

1. A method for adjusting tuning settings based on an attribute of a client, the method comprising:
    (a) identifying, by a device intermediary to a client and a content server, a policy for evaluating the client responsive to a first request of the client to access the content server, the policy specifying an expression comprising a clause to be evaluated by the client to identify an attribute of the client, the attribute identifying at least one of an application of the client, network data, a characteristic of a network to which the client is connected or user preferences;
    (b) transmitting, by the device to the client, responsive to identifying the policy for evaluating the client, a second request to the client to have the client evaluate the clause to identify the attribute of the client;
    (c) receiving, by the device from the client, a response to the second request, the response comprising the attribute of the client;
    (d) receiving, by a server intermediary to at least the client and the content server, the attribute of the client from the device, the server comprising tuning settings for improving performance of communications of response data from the content server to the client; and
    (e) adjusting, by the server, the tuning settings based on the attribute of the client to improve the performance of communications of the response data from the content server to the client.

2. The method of claim 1, wherein the expression comprises a plurality of clauses joined by one or more logical operators, each clause of the plurality of clauses to be evaluated by the client to identify a different attribute of the client.

3. The method of claim 1, wherein (e) further comprises adjusting the tuning settings that correspond to the network data.

4. The method of claim 1, wherein (e) further comprises adjusting the tuning settings that correspond to the network data.

5. The method of claim 1, wherein (e) further comprises adjusting the tuning settings that correspond to the characteristic of the network.

6. The method of claim 1, wherein (e) further comprises adjusting, by the server, the tuning settings based on the user preferences.

7. The method of claim 1, further comprising manipulating, by the server, response data from the content server based on techniques corresponding to the adjusted tuning settings.

8. A system for adjusting tuning settings based on an attribute of a client, the system comprising:
    a device intermediary to a client and a content server, the device configured to identify a policy for evaluating the client responsive to a first request of the client to access the content server, the policy specifying an expression comprising a clause to be evaluated by the client to identify an attribute of the client, the attribute identifying at least one of an application of the client, network data, a characteristic of a network to which the client is connected or user preferences;
    a server intermediary to at least the client and the content server, the server comprising tuning settings for improving performance of communications of response data from the content server to the client;
    wherein the device is configured to transmit, responsive to identifying the policy for evaluating the client, a second request to the client to have the client evaluate the clause and receive from the client, a response to the second request, the response comprising the attribute of the client; and
    wherein the server is configured to receive the attribute of the client from the device and adjust the tuning settings based on the attribute of the client to improve the performance of communications of the response data from the content server to the client.

9. The system of claim 8, wherein the expression comprises a plurality of clauses joined by one or more logical operators, each clause of the plurality of clauses to be evaluated by the client to identify a different attribute of the client.

10. The system of claim 8, wherein the server is configured to adjust the tuning settings that correspond to the application.

11. The system of claim 8, wherein the server is configured to adjust the tuning settings that correspond to the network data.

12. The system of claim 8, wherein the server is configured to adjust the tuning settings that correspond to the characteristic of the network.

13. The system of claim 8, wherein the server is configured to adjust the tuning settings based on the user preferences.

14. The system of claim 8, wherein the server is configured to manipulate response data from the content server based on techniques corresponding to the adjusted tuning settings.

* * * * *